United States Patent
Svennebring et al.

(10) Patent No.: US 12,407,434 B2
(45) Date of Patent: Sep. 2, 2025

(54) LINK PERFORMANCE PREDICTION USING SPATIAL LINK PERFORMANCE MAPPING

(71) Applicant: Intel Corporation, Santa Clara, CA (US)

(72) Inventors: Jonas Svennebring, Sollentuna (SE); Theoharis Charitidis, Stockholm (SE)

(73) Assignee: Intel Corporation, Santa Clara, CA (US)

( * ) Notice: Subject to any disclaimer, the term of this patent is extended or adjusted under 35 U.S.C. 154(b) by 350 days.

(21) Appl. No.: 18/023,699

(22) PCT Filed: Sep. 24, 2021

(86) PCT No.: PCT/US2021/052093
§ 371 (c)(1),
(2) Date: Feb. 27, 2023

(87) PCT Pub. No.: WO2022/067126
PCT Pub. Date: Mar. 31, 2022

(65) Prior Publication Data
US 2023/0308199 A1 Sep. 28, 2023

Related U.S. Application Data

(60) Provisional application No. 63/083,256, filed on Sep. 25, 2020.

(51) Int. Cl.
*H04B 17/391* (2015.01)
*H04B 17/373* (2015.01)
*H04W 16/22* (2009.01)

(52) U.S. Cl.
CPC ....... *H04B 17/3913* (2015.01); *H04B 17/373* (2015.01); *H04W 16/22* (2013.01)

(58) Field of Classification Search
CPC . H04B 17/3913; H04B 17/373; H04W 16/22; H04W 24/04; H04W 24/10
See application file for complete search history.

(56) References Cited

U.S. PATENT DOCUMENTS

2004/0192341 A1* 9/2004 Wang .................... H04W 28/26
455/456.1
2010/0118856 A1 5/2010 Krishnamurthy et al.
(Continued)

FOREIGN PATENT DOCUMENTS

WO 2008078312 A2 7/2008
WO 2018164618 A1 9/2018

OTHER PUBLICATIONS

PCT International Search Report and Written Opinion issued in PCT/US2021/052093, dated Jan. 7, 2022; 8 pages.
(Continued)

*Primary Examiner* — Fred A Casca
(74) *Attorney, Agent, or Firm* — Alliance IP, LLC

(57) ABSTRACT

In one embodiment, a current path of a mobile device is determined based on radio signals between the mobile device and a base station, which indicates a sequence of positions of the mobile device over a current time window. A future path of the mobile device is then predicted based on the current path, which indicates a sequence of predicted future positions of the mobile device over a future time window. A link performance prediction (LPP) is then generated for the mobile device based on the future path of the mobile device and a base station coverage map. The base station coverage map indicates a radio signal quality across a base station coverage area, which is represented as a three-dimensional (3D) coordinate space. Moreover, the LPP indicates a predicted performance of a radio link between the mobile device and the base station during the future time window.

25 Claims, 18 Drawing Sheets

(56) References Cited

U.S. PATENT DOCUMENTS

2015/0312008 A1* 10/2015 Annavajjala ............ H04L 1/206
                                                        370/252
2018/0270024 A1*  9/2018 Neuhaus ............... H04L 1/1845
2019/0319868 A1  10/2019 Svennebring et al.

OTHER PUBLICATIONS

PCT International Preliminary Report on Patentability in PCT International Application Serial No. PCT/SU2021/052093 mailed on Apr. 6, 2023 (7 pages).

* cited by examiner

LINK PERFORMANCE PREDICTION USING SPATIAL LINK PERFORMANCE MAPPING

CROSS-REFERENCE TO RELATED APPLICATION

This Application is a national stage application under 35 U.S.C. § 371 of PCT International Application Serial No. PCT/US2021/052093, filed on Sep. 24, 2021 and entitled LINK PERFORMANCE PREDICTION USING SPATIAL LINK PERFORMANCE MAPPING, which application claims the benefit of the filing date of U.S. Provisional Patent Application Ser. No. 63/083,256, filed on Sep. 25, 2020, and entitled "LINK PERFORMANCE PREDICTION USING SPATIAL LINK PERFORMANCE MAPPING FOR MILLIMETER WAVE SPECTRUM". The disclosures of the prior applications are considered part of and are hereby incorporated by reference in their entirety in the disclosure of this application.

FIELD OF THE SPECIFICATION

This disclosure relates in general to the field of wireless communication, and more particularly, though not exclusively, to link performance prediction using spatial link performance mapping.

BACKGROUND

In an ideal world, a wireless network would always be capable of providing enough capacity for any desired task or service, but that is far from reality, as the network performance and the quality of service can vary significantly depending on the quality of the underlying wireless link. For example, a drop in link quality often decreases the bandwidth or capacity of the wireless link, which may decrease the quality of service—and the user experience—for the particular task or service provided over the link. In particular, while 5G millimeter wave (mmWave) spectrum significantly increases the overall capacity of wireless links compared to other bands of spectrum and wireless technologies, it is extremely volatile and prone to blockage from physical obstructions, which can cause significant fluctuations in link quality and performance.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
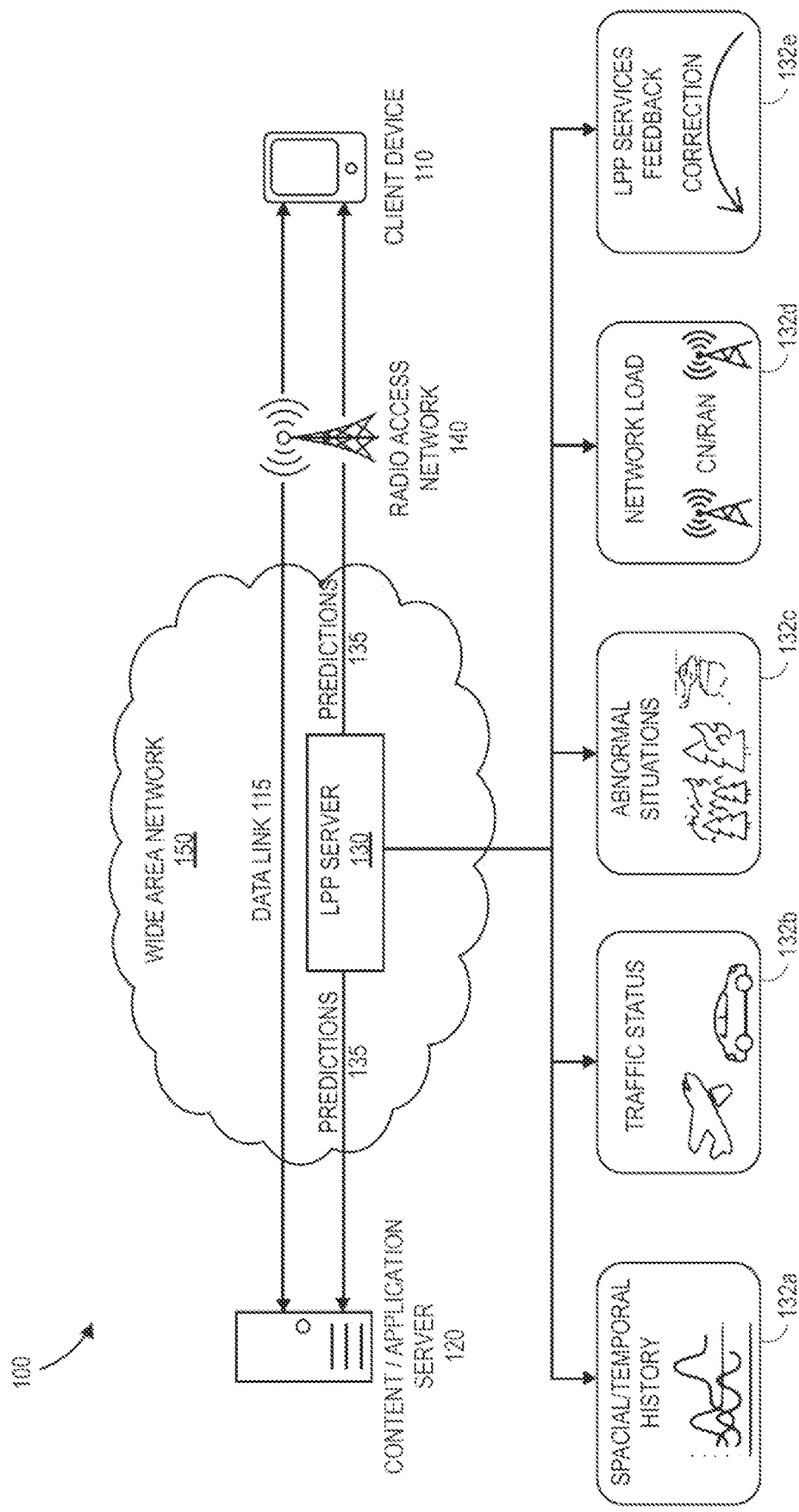
FIG. 1 illustrates an example embodiment of a system that leverages link performance prediction (LPP) technology.

In an ideal world, a wireless network would always be capable of providing enough capacity for any desired task or service, but that is far from reality, as the network performance and the quality of service can vary significantly depending on the quality of the underlying wireless link. For example, a drop in link quality often decreases the bandwidth or capacity of the wireless link, which may decrease the quality of service—and the user experience—for the particular task or service provided over the link. In particular, while 5G millimeter wave (mmWave) spectrum significantly increases the overall capacity of wireless links compared to other bands of spectrum and wireless technologies, it is extremely volatile and prone to blockage from physical obstructions, which can cause significant fluctuations in link quality and performance.

Accordingly, this disclosure presents a solution that leverages link performance prediction (LPP) technology to proactively adapt to variations in link quality for mmWave radio signals before they occur. The described solution can be leveraged for any wireless communication technologies and standards, particularly those that utilize mmWave and/or other extremely high frequency (EHF) radio signals, such as 5G, Wi-Fi, Zigbee, and so forth.

For example, LPP technology uses state of the art machine learning techniques and a comprehensive set of historical and real-time data feeds to dynamically predict the quality of any given radio access network (RAN) link, which enables application-level behavior to be optimized based on the predictions. In this manner, LPP can be used to improve the performance of applications that rely on wireless networks (e.g., 4G/5G cellular networks) by making them more aware of the underlying network behavior (e.g., bandwidth, latency, capacity, coverage holes, and so forth) while also providing forward-looking predictions on how individual connections or links will change over time. For example, LPP can provide estimations of current link capacity and predictions of how that will change in the near-term or mid-term future, and applications and services can then adapt their task behaviors to stay within the given link capacity in order to provide the best possible user experience, such as by taking precautions to compensate for coverage holes or obstructions and/or taking advantage of areas with strong coverage (e.g., areas within range of high-performing 5G millimeter wave (mmWave) cells).

Millimeter wave (mmWave) spectrum has an unprecedented capacity that can significantly boost network performance under proper conditions, but it is also extremely volatile when the radio beams are blocked. Accordingly, this disclosure presents a link performance prediction scheme which will lead to improved utilization of the mmWave cells. The core idea is for the base station itself to characterize the surrounding environment of a mmWave cell by mapping relative locations for which user equipment (UE) experiences good and bad signal coverage, respectively. This is done by leveraging existing feedback mechanisms and UE tracking. With this characterization of signal coverage for the surrounding environment, LPP technology can effectively leverage the information to aid the predictions and improve their accuracy.

By giving the base station itself the ability to spatially track/learn and predict changes in link quality, it becomes possible for the operator and content application for a service to effectively decide how to best adapt to these changes. For example, predicting signal degradation and loss from mmWave cells allows for more accurate predictions of sudden capacity loss, which in turn further improves the overall prediction quality of the service.

The link performance prediction techniques described throughout this disclosure provide numerous advantages. For example, extending LPP technology to provide awareness of local mmWave cells will greatly improve the value of the information and predictions provided to clients, end users, and applications. In addition, the quality of service (QoS) and user experience for services delivered over wireless networks is significantly improved. Moreover, resources are also utilized more efficiently, such as network resources (e.g., bandwidth consumption), content provider and/or cloud service provider resources, and client or end-user device resources (e.g., memory utilization for media buffering, power consumption), thus improving overall performance while also reducing costs.

Link Performance Prediction (LPP) Overview

FIG. 1 illustrates an example embodiment of a system 100 that leverages link performance prediction (LPP) technology. In the illustrated embodiment, system 100 includes a client device 110, a content or application provider server 120, a link performance prediction (LPP) server 130, a radio access network (RAN) 140, and a wide area network 150 (WAN). The client device 110 and the content provider server 120 are connected to each other via a data link 115 established over networks 140 and 150, and data (e.g., media or video content) is streamed from the content provider server 120 to the client device 110 over the data link 115. The LPP server 130 generates predictions 135 regarding the performance of the data link 115 established with the client device 110, and those predictions 135 are then provided to the client device 110 and/or the content provider server 120 in order to optimize performance by proactively adapting to variations in link quality before they occur, as described further below.

In various embodiments, for example, the content/application server 120 may include any type and/or combination of computing components and/or infrastructure used to provide a service over a network (e.g., content delivery, application services, etc.).

For example, a content provider server 120 may stream media content to the client device 110 over the data link 115 established between them, such as video (e.g., television shows, movies, sports, online video content, video games), images, audio, and so forth. For example, the content provider may provide a media streaming service, such as a video streaming service (e.g., YouTube, Netflix), a video game streaming service, an audio or radio streaming service, and so forth.

Moreover, the client device 110 may include any type and/or combination of computing device and/or input/output (I/O) device, such as desktops, laptops, tablets, mobile phones, IoT devices, audio/video (A/V) devices, display devices (e.g., monitors, televisions, smart displays and/or interactive whiteboards, VR/AR glasses or headsets), speakers, and so forth.

In the illustrated embodiment, the data link 115 between the client device 110 and the content provider server 120 is established over a radio access network 140 and a wide area network 150. For example, the radio access network 140 may include a cellular network (e.g., a 2G, 3G, 4G, or 5G cellular network), and the wide area network 150 may include the Internet. The client device 110 may be wirelessly connected to a base station of the cellular network 140, which may then be connected to the Internet 150, and the content provider server 120 may also be connected to the Internet 150. In other embodiments, however, the data link 115 between the client device 110 and the content provider server 120 may be established over any type and/or number of communication networks.

The LPP server 130 generates predictions 135 regarding the performance of the data link 115 established with the client device 110, and those predictions 135 are then provided to the client device 110 and/or the content provider server 120 in order to optimize the performance of the service. For example, based on the link performance predictions 135, the behavior of the underlying service may be proactively tuned or adjusted in order to adapt to variations in link quality before they occur.

In some embodiments, for example, the LPP server 130 may use artificial intelligence to predict the network performance that applications and services will experience over time. In particular, predictions regarding network performance may be generated by processing a comprehensive collection of historical and real-time data feeds using advanced machine learning techniques.

For example, the historical data 132a may include network performance data collected across a wide range of mobile devices, such as the network performance experienced in different locations at specific times on specific days and under specific conditions. The real-time data may include a collection of data associated with real-time conditions, such as live traffic status 132b, abnormal events 132c, network performance 132d (e.g., current network load, radio conditions), client device information (e.g., location, motion, and/or routing information for client or end-user devices), and so forth. The LPP server 130 may also receive feedback 132e from client devices regarding link performance predictions provided by the server (e.g., indicating whether and/or to what extent the predictions were correct), which the LPP server 130 may use to tune or optimize future predictions.

Based on the various types of data 132a-e provided as input (e.g., historical, real-time, and feedback data), the LPP server 130 can predict future link performance for client devices with a high level of confidence and accuracy. For example, the LPP server 130 may generate a prediction 135 regarding the future performance of a network link 115 to a particular client device 110. In some embodiments, a prediction 135 generated by the LPP server 130 may include or indicate a time (e.g., time at which the predicted behavior will occur), a type of prediction (e.g., bandwidth or latency prediction), a predicted value (e.g., predicted amount of bandwidth or latency), an expected deviation (e.g., expected amount of deviation from the predicted bandwidth or latency value), and/or a probability (e.g., the likelihood or confidence of the prediction being correct), among other types of information.

Moreover, in some embodiments, services can subscribe to predictions that have direct relevance to their performance (e.g., applications running on the client device 110 and/or content provider server 120), and the LPP server 130 will then send predictions to those services to inform them of any significant changes in link performance over time. In some embodiments, the LPP server 130 may provide information regarding current link performance as well as forecasted link performance.

Link performance prediction (LPP) technology is described in further detail in the following patent application, the content of which is hereby expressly incorporated by reference: U.S. patent application Ser. No. 15/857,123, filed on Dec. 28, 2017, entitled "RADIO LINK QUALITY PREDICTION."

In the illustrated embodiment, for example, the client device 110 and/or the content provider server 120 may subscribe to predictions 135 from the LPP server 130 regarding the performance of the link 115 to the client device 110. The LPP server 130 then provides relevant predictions 135 to the client device 110 and/or the content provider server 120, which may use the predictions 135 to guide their behavior and optimize the performance and user experience. For example, based on the link performance predictions 135, the behavior of the underlying service may be proactively tuned or adjusted in order to adapt to variations in link quality before they occur.

As an example, based on predictions regarding poor coverage areas that will likely be encountered en-route, media streaming parameters relating to content buffering, resolution, and/or compression may be adjusted to ensure that media playback continues without stalling even while the client device 110 has little or no coverage. Content providers and mobile operators can also leverage link performance predictions to perform optimizations relating to the content distribution network (CDN). For example, based on link performance predictions, required content can be pre-fetched to a mobile edge computing (MEC) node closer to the client device's anticipated point of consumption.

LPP Using Spatial Link Performance Mapping for mmWave Cells

This solution presented throughout this disclosure is two-fold. First, a method is presented for mapping out and characterizing the surrounding environment of a mmWave cell (~>=28 GHz base frequency) by creating a spatial map (in 3 dimensions) of where different degrees of coverage/signal quality can be expected, e.g., a spatial "heat map." Next, a prediction scheme is presented with respect to the spatial map that can predict changes in signal quality based on the UE motion and a local spatial/temporal history of motions.

The need for this solution is rooted in the nature of the physical signal itself given that, unlike previous generations of cellular networks, a physical obstacle obstructs the mmWave signal almost entirely. The solution is described in the context of a 3GPP-based RAN, but it could just as well be applied to any wireless network that utilizes beamforming or similar radio technology.

Surrounding Environment Characterization

Characterizing a mmWave cell's surrounding environment with LPP is a novel idea that will aid predictions concerned with intra-cell mobility features. This is both possible and needed due to the fragile nature of the mmWave radio signals. The signals' physical properties require beamforming to be efficiently transmitted. The beamforming technique works by concentrating a signal beam towards the UE directly. To allow for this the UE is tracked as it moves with high precision. By doing this, however, obstacles have a greater impact on the signal degradation when they end up between the 5G base station (gNB) and the UE. Therefore, characterizing the surrounding environment and predicting when the target UE is going to experience signal loss becomes of interest.

Figure 2A:
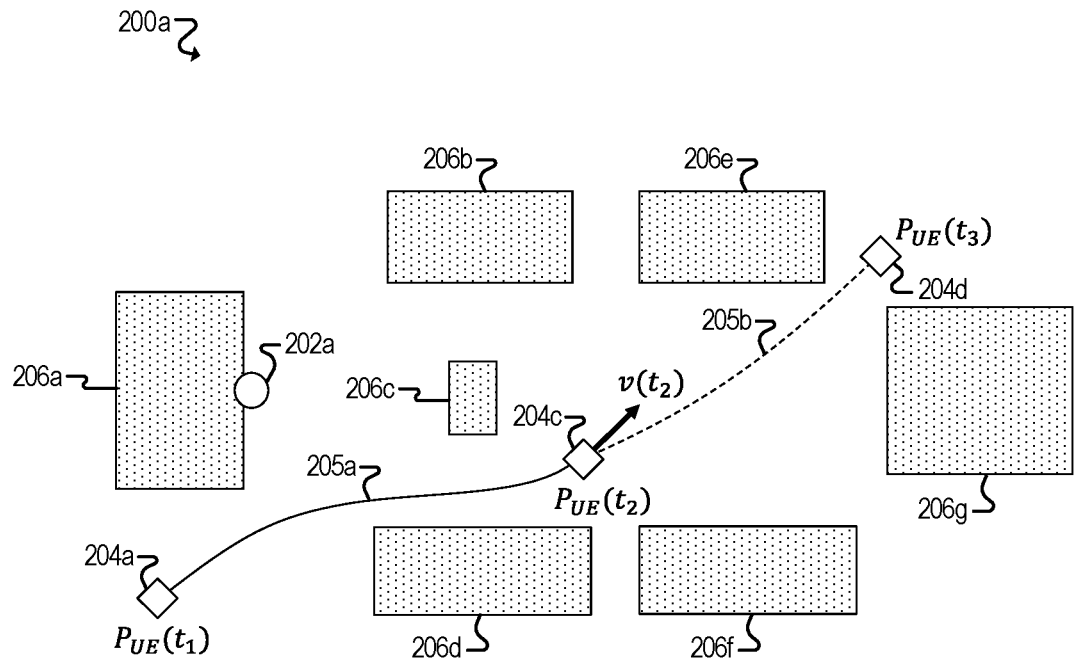
FIGS. 2A-B illustrate examples of various base station coverage scenarios based on the path trajectory of a mobile device.
Figure 2B:
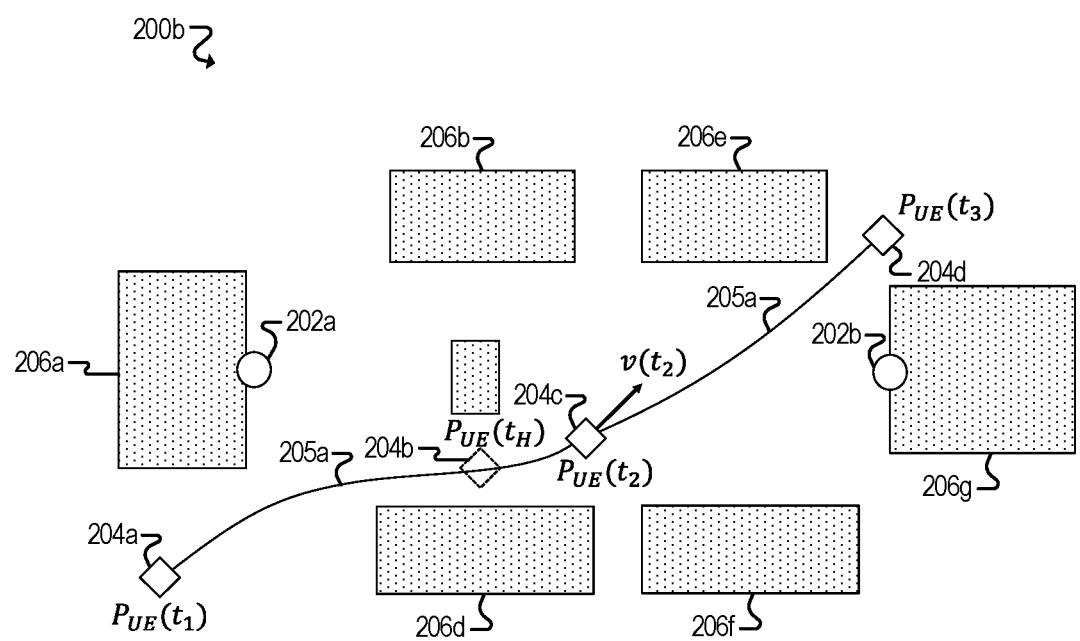

FIGS. 2A-B illustrate examples of various base station coverage scenarios 200a,b based on the path trajectory 205a,b of a mobile device 204 (e.g., a user equipment (UE) device). For simplicity, the described scenarios are presented from a two-dimensional (2D) perspective, but they apply equally to a three-dimensional (3D) perspective.

In these examples, $P_{UE}(t)$ represents the spatial coordinate $(x_{UE}(t), y_{UE}(t))$ where the UE 204a-d resides at time t. Obstacles 206a-g depict any form of obstacle that can obstruct the signal between the UE 204 and base stations 202a,b (e.g., gNodeBs).

In coverage scenario 200a, the UE 204 maintains a connection to the base station 202a during the first portion of the path trajectory 205a (depicted by a solid line), but the UE 204 loses the connection during the second portion of its path trajectory 205b (depicted by a dashed line). In particular, the path 205a taken by the UE 204 from time $t_1$-$t_2$ makes it possible for the base station 202a and the UE 204 to maintain a connection. For the path 205b taken from time $t_2$-$t_3$, however, there is either no signal or a bad signal between the UE 204 and the base station 202a due to an obstruction 206c. This effectively causes degradation in quality of service (QOS) for the end user depending on the current UE activity.

Turning to coverage scenario 200b, in order to maintain high QoS, the client UE 204 needs to be hinted about the eventual signal loss before time $t_2$, with as much advanced notice as possible. With this hint, an informed decision can be made by the client application to mitigate undesired effects in view of the current circumstances.

For example, in coverage scenario 200b, a connection is maintained with one of two base stations 202a,b during the entire path 205a,b of the UE 204 (as depicted by the solid line 205a,b). By providing a hint to the UE 204 about the possibility of an unstable connection with base station 202a at time $t_2$, a handoff can be performed before time $t_2$—at time $t_H$—to handover the UE 204 from base station 202a to base station 202b.

For example, another base station 202b in the area is able to maintain a signal to the UE 204 during the timeframe $t_1 \leq t \leq t_3$ without any issue. However, because the first base station 202a has the strongest signal initially, it will be the UE's 204 first choice.

As the UE 204 approaches $P_{UE}(t_2)$, based on the hint that was provided, the UE 204 will be handed over from base station 202a to base station 202b, which can drastically improve the link performance. In this manner, providing a hint to the UE 204 about the upcoming QoS change allows the UE 204 and/or an application to handle the handover situation at time $t_2$, or if the link is expected to get worse, precautions could be taken before time $t_2$ at time $t_H$.

Spatial Grid

With LPP, spatial information of the target UE can be gathered from a gNB and utilized to predict when there is going to be signal loss. The basis for this is to define a 3-dimensional spatial grid defined by some volumetric shape. Introducing some granularity is necessary to reduce the complexity of a spatial map and provides a framework for prediction, i.e. lower granularity implies less grid elements and vice versa.

The spatial grid can be based on one of several different established coordinate systems, e.g., the Cartesian coordinate system or a spherical coordinate system. Each of these systems can be used to define a spatial grid with the purpose of reducing the problem complexity.

Figure 3A:
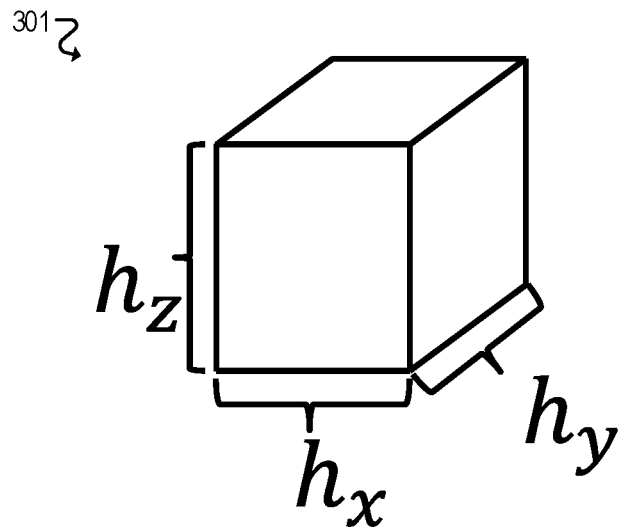
FIGS. 3A-B illustrate examples of three-dimensional (3D) spatial grid elements defined in various coordinate systems.
Figure 3B:
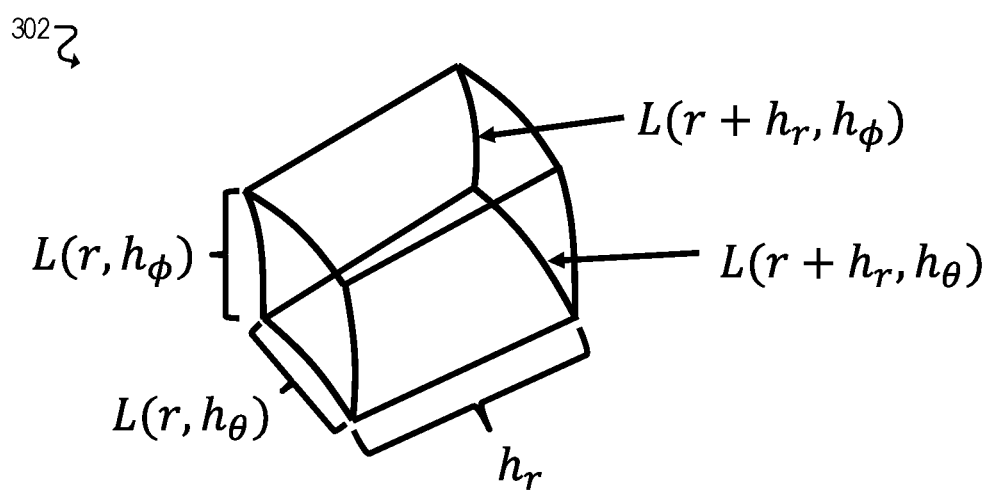

FIGS. 3A-B illustrate examples of three-dimensional (3D) spatial grid elements defined in various coordinate systems. In particular, examples of cubic 301 and spherical 302 grid elements are shown. With respect to the spherical grid element 302, L is a function that defines the arc lengths of each edge of the spherical element.

Figure 4A:
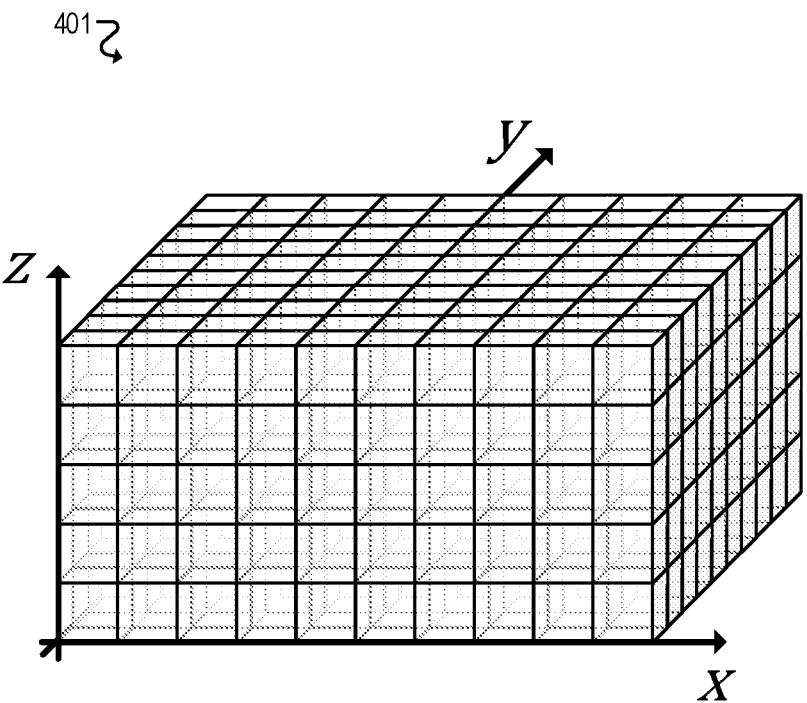
FIGS. 4A-B illustrate examples of 3D coordinate spaces that can be used to map the signal quality across different spatial regions of a base station coverage area.
Figure 4B:
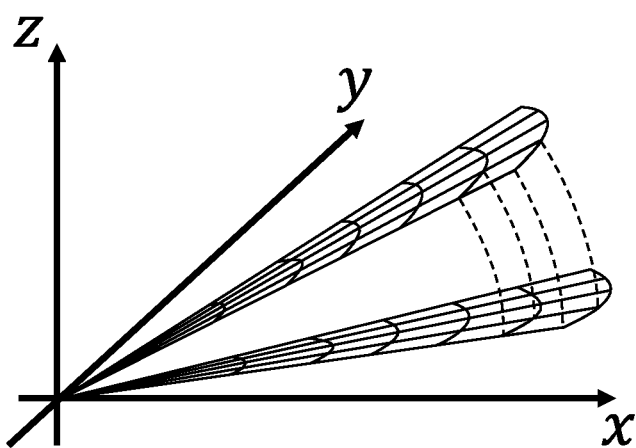

FIGS. 4A-B illustrate examples of three-dimensional (3D) Cartesian 401 and spherical 402 coordinate spaces that can be used to map out the signal quality of different spatial regions across the coverage area (e.g., spatial regions where signal loss can be expected, spatial regions with strong coverage, etc.).

Considering that a propagated signal originating from a base station (e.g., gNodeB) is fixed in space and a target mobile device (e.g., UE) is mobile, the spherical coordinate system 402 provides a more realistic representation of the coverage area, while the Cartesian coordinate system 401 is less complex and easier to implement.

In the spherical coordinate system 402, for example, as a target UE moves further away, according to the grid element definition, each element becomes larger given that the arc lengths are a function of the radial distance r and the grid defining parameters $h_\theta$, $h_\phi$, and $h_r$. This compensates for inaccuracies that occur due to the increasing distance between the target UE and the base station.

Furthermore, in a common deployment scenario, a base station (e.g., gNodeB) can be temporarily tilted by the operator to boost performance for a certain location or region within the coverage area to compensate for a temporary spike in network traffic/load (e.g., when a large event is taking place within the coverage area, or when there is a slight geographical shift between morning traffic versus evening traffic).

As a result, it is beneficial to use a coordinate system that allows the grid to be shifted angularly to account for base station tilt scenarios. This is achievable in a spherical coordinate system 402 by adding shift constants $\theta_{shift}$, $\phi_{shift}$ to each grid element interval, where the shift constants represent the amount of tilt applied to the base station relative to its default position.

Now, assuming the function $p_{UE}(t)=(x_{UE}(t), y_{UE}(t), z_{UE}(t)) \in \mathbb{R}^3$ represents the point in space that the UE resides in at time t, the function $f: \mathbb{R}^3 \mapsto \mathbb{Z}^3$ defines a mapping from $p_{UE}$ to a grid coordinate.

For a Cartesian coordinate system 401, this mapping function can be defined as:

$$f_C(p_{UE}(t)) = (x_g, y_g, z_g) \text{ if } \begin{cases} h_x x_g \leq x_{UE}(t) \leq h_x(x_g+1) \\ h_y y_g \leq y_{UE}(t) \leq h_y(y_g+1) \\ h_z z_g \leq z_{UE}(t) \leq h_z(z_g+1) \end{cases} \quad (1)$$

where $(x_g, y_g, z_g)$ represents the grid coordinates. This implies that the UE resides in a point in space that lies somewhere in the volumetric grid element.

Similarly, in a spherical coordinate system 402, the mapping function is formulated as:

$$f_S(p_{UE}(t)) = (r_g, \theta_g, \phi_g) \text{ if } \begin{cases} h_r r_g \leq r_{UE}(t) \leq h_r(r_g+1) \\ h_\theta \theta_g \leq \theta_{UE}(t) \leq h_\theta(\theta_g+1) \\ h_\phi \phi_g \leq \phi_{UE}(t) \leq h_\phi(\phi_g+1) \end{cases} \quad (2)$$

In the spherical case, it is necessary that $h_\theta$ and $h_\phi$ are some fraction of $2\pi$ and $\pi$, respectively, to ensure even spacing in one revolution (e.g., having $$h_\theta = \frac{2\pi}{4}$$

results in four evenly spaced angular sections in the grid in the θ direction, making one full rotation).

Figure 5B:
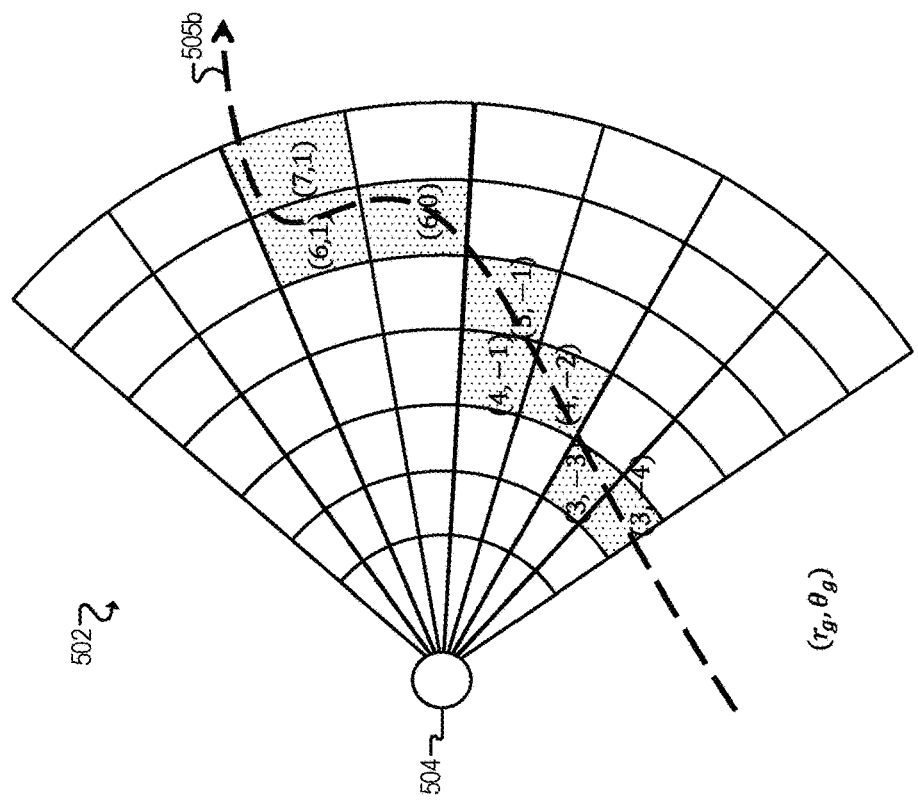
FIGS. 5A-B illustrate examples of mapping a mobile device path to various coordinate spaces used to represent a base station coverage area.
Figure 5A:
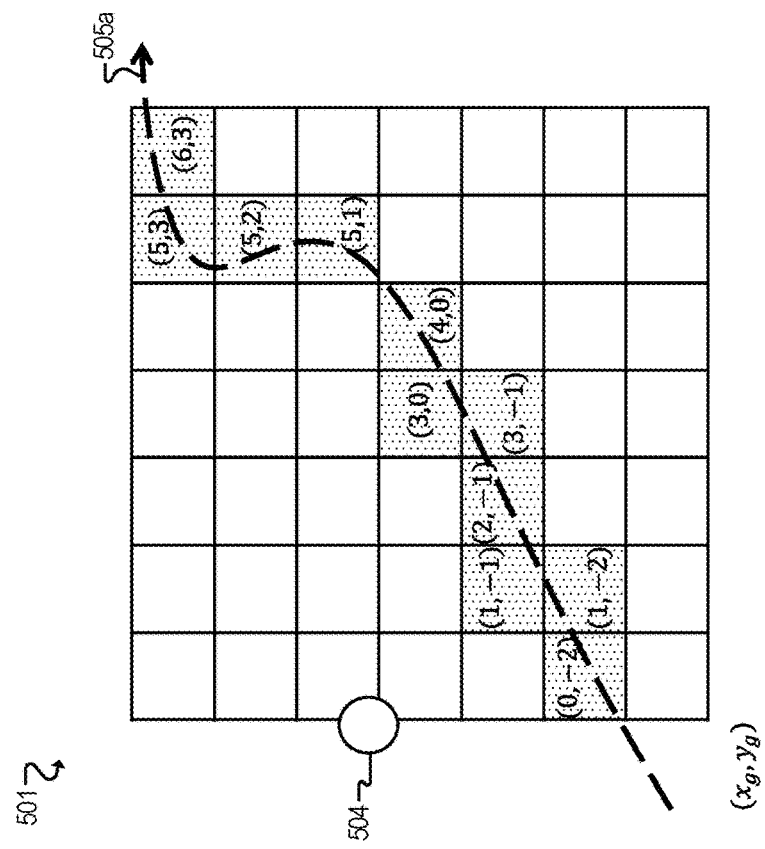

FIGS. 5A-B illustrate examples of how the path of a mobile device (e.g., a UE path) can be mapped to different coordinate spaces used to represent the coverage area of a base station 504 (e.g., a gNodeB). In particular, FIG. 5A illustrates a UE path 505a mapped to a Cartesian coordinate space 501, while FIG. 5B illustrates a UE path 505b mapped to a spherical coordinate space 502. For the sake of simplicity, the illustrated examples are shown in 2D rather than 3D, which corresponds to removing the z component in the Cartesian coordinates and the φ component in the spherical coordinates from equations (1) and (2) above, respectively.

Figure 6:
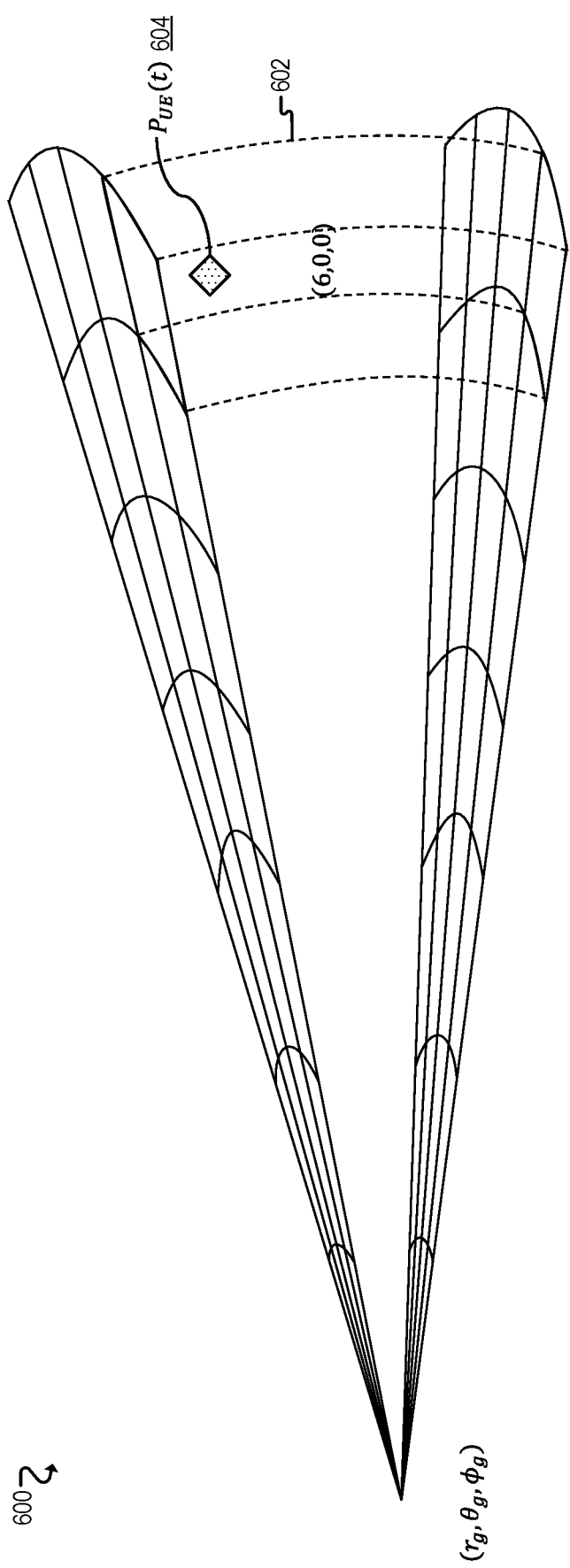
FIG. 6 illustrates an example of a mobile device located at certain coordinates in a spherical coordinate space.

FIG. 6 illustrates an example of a mobile device 604 (e.g., a UE) located at certain coordinates 602 in a spherical coordinate space 600. In particular, the mobile 604 is in the spherical grid coordinate (6,0,0), which translates to the mobile device coordinates being somewhere between the space of $6h_r \leq r_{UE} \leq 7h_r$, $0 \leq \theta_{UE} \leq h_\theta$ and $0 \leq \phi_{UE} \leq h_\phi$.

Spatial Mapping of Link Performance

By using a 3D spatial grid to represent a base station coverage area, each grid element can be classified with a corresponding signal or link quality. In some embodiments, the grid elements are labeled with specific signal conditions, such as power level, signal-noise ratio, and so forth.

Alternatively, or additionally, the grid elements are labeled with simple link quality states, such as:
  (i) $S_0$=unknown/blank (link quality is unknown for the grid element);
  (ii) $S_1$=good/ok link (good link quality is expected at the grid element);
  (iii) $S_{-1}$=bad link/no link (bad link quality, or no link, is expected at the grid element).

For example, assuming no prior link quality data is available, all grid elements may be associated with state $S_0$ initially, which can be updated as link quality data is collected for the various grid elements (e.g., from live mobile devices, test driving, etc.).

For example, by tracking the path of mobile devices/UEs, each path realization provides two key pieces of information (among other examples): (i) time series data, including what grid transitions have been observed to be possible for the mobile devices; and (ii) the link quality of the respective grid elements.

Classifying a grid element as having favorable link quality is straightforward. The grid coordinates that have been observed to provide good link quality in past observations are classified as having the state $S_1$. However, in some embodiments, to classify a grid element as currently having the state $S_{-1}$, the grid element must be observed to lose a connection from several different transitions. In this manner, a stricter standard is required to classify a grid element as having a bad link ($S_{-1}$) versus a good link ($S_1$).

Figure 7:
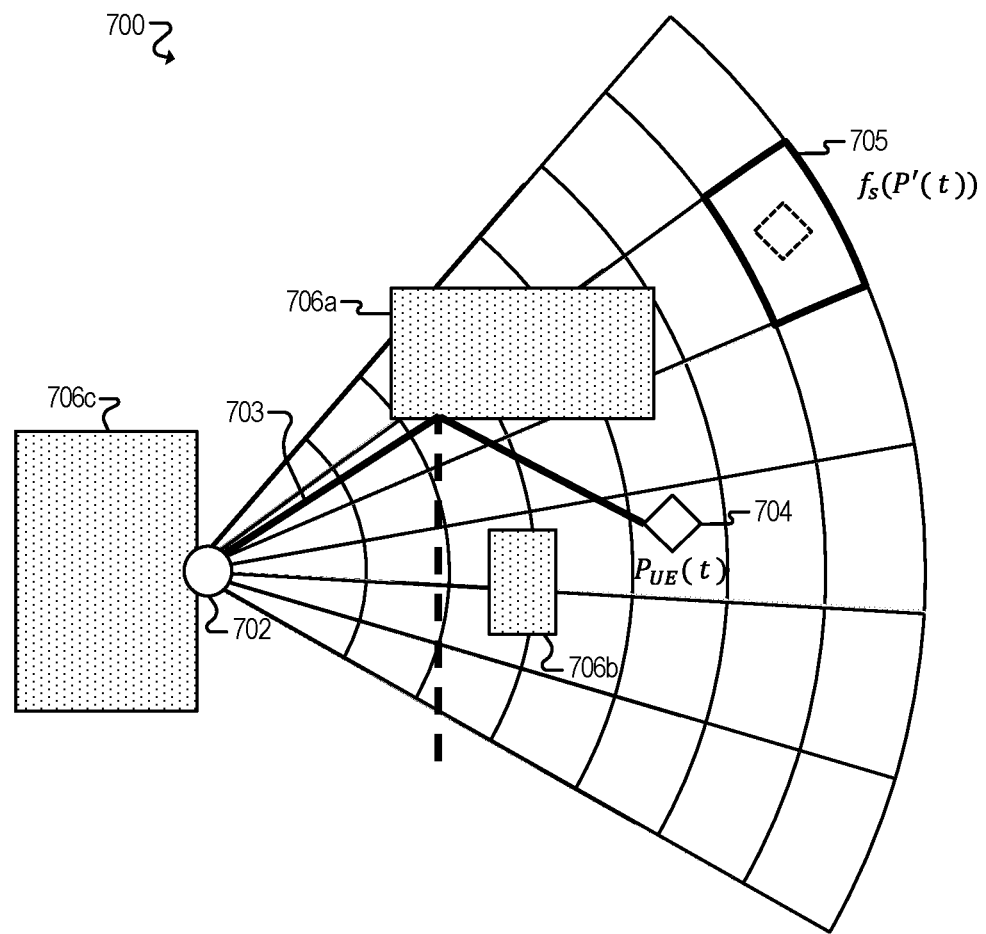
FIG. 7 illustrates an example of a link established between a base station and a mobile device based on a reflected signal.

FIG. 7 illustrates an example 700 of a link established between a base station 702 (e.g., gNodeB) and a mobile device 704 (e.g., UE) based on a reflected signal 703. In the illustrated example, the environment includes various obstructions 706a-c, and the signal 703 from the base station 702 is reflected off one of the obstructions 706a before arriving at the mobile device 704. As a result, the reflected signal 703 causes the mobile device 704 to be interpreted as being in a different location 705—and further away—than its actual physical location.

For example, at time t, the true position of the mobile device 704 is represented as $P_{UE}(t)$, but due to the signal 703 being reflected by an obstacle 706a, the mobile device 704 is perceived as being at a different spherical grid coordinate 705 represented as $f_s(P'(t))$. In this scenario, the perceived radial distance of the mobile device 704 can vary depending on various factors, including the absorption coefficient of the reflective surface (assuming the base station 702 relies on a signal strength metric for distance/location calculations), among other examples.

In short, millimeter wave (mmWave) radio beams exert similar physical characteristics to, for example, light beams, which are known to reflect off buildings and structures. As a result, due to the reflective properties of the propagated signals between a mobile device and a base station, a reflected signal may cause a mobile device to be perceived as being at some location other than its true location. Therefore, the connections between each grid element in a path observed for a mobile device are not always trivial, adjacent connections (e.g., as shown in FIG. 7), which means they need to be mapped out in some manner.

Grid Element Directions

For LPP to fully leverage the information available from a base station (e.g., gNodeB) for prediction, velocity vectors of the mobile device/UE are used, making it possible to determine the relative direction in which the UE is heading. While the exact direction cannot realistically be determined, there are various ways to approximate the direction. In one example, the vector $v_{UE}(t) \in \mathbb{R}^3$ can be approximated using a rolling average defined as:

$$\bar{v}_{UE}(t) = \frac{P_{UE}(t) - P_{UE}(t-T)}{T}, T > 0 \tag{3}$$

where T represents the window length. The resulting vector becomes the basis for determining which direction the UE is headed.

Alternatively, an index window can be used, which considers that the data is discrete and the j most recently received items are relevant, in which case the formula becomes:

$$\bar{v}_{UE}(t_i) = \frac{P_{UE}(t_i) - P_{UE}(t_{i-j})}{t_i - t_{i-j}}, i > j \tag{4}$$

where the indices represent the order of registered data from the incoming data stream.

To determine which face of the respective grid element $\bar{v}_{UE}$ is pointing at, several sectors are defined. These can be used to determine which side of the grid element the UE is moving towards. Naturally, a grid element can be viewed as being connected to all directly adjacent elements, however there are connections that are non-trivial, including the reflected signal scenario presented in FIG. 7. Consequently, the non-trivial connections need to be mapped as observed by the base station.

Figure 8B:
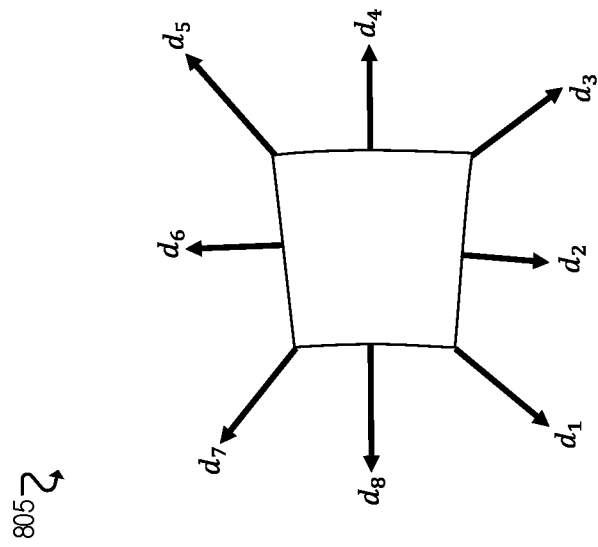
FIGS. 8A-B illustrate an example of a non-trivial mobile device path transition in a polar coordinate space.
Figure 8A:
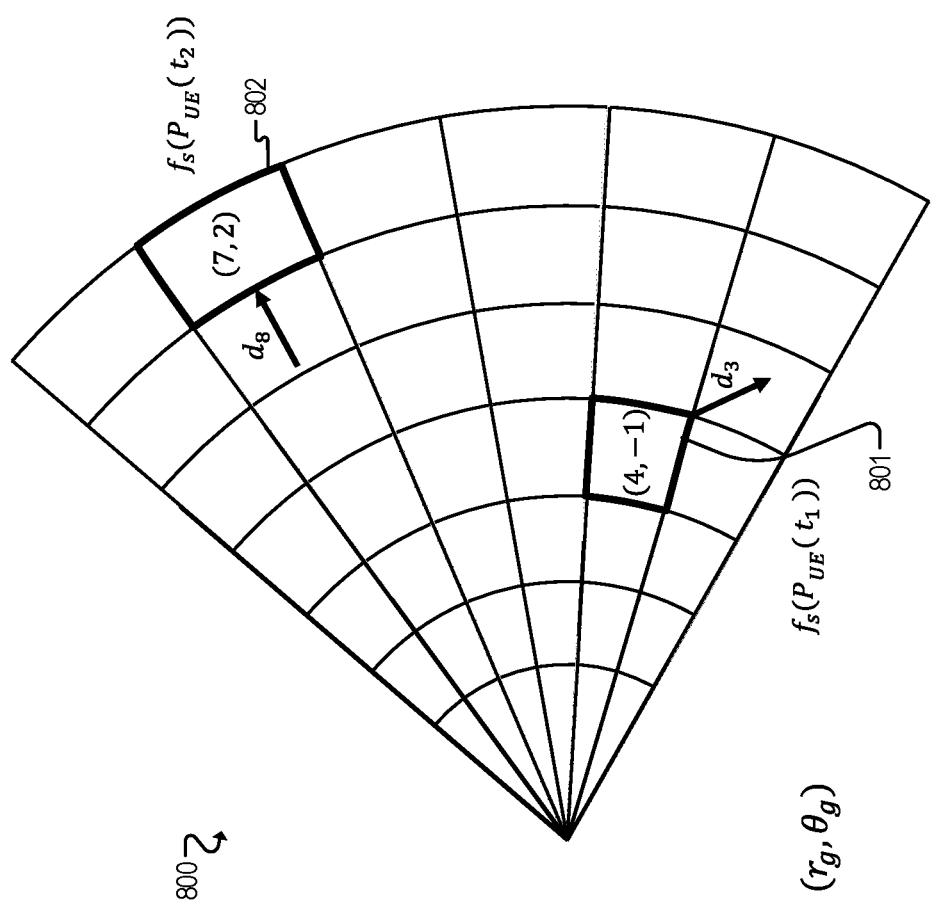

FIGS. 8A-B illustrate an example of a non-trivial UE path transition in a polar coordinate space 800. For simplicity, the illustrated example is presented in 2D rather than 3D. In this example, the potential transitions between grid elements include directly adjacent transitions as well as diagonal transitions, resulting in eight possible transitions ($d_1$-$d_8$) for any given grid element 805, as shown in FIG. 8B. Moreover, in FIG. 8A, at time $t_1$, the UE is seen within grid element 801 at coordinates (4,−1) heading in direction $d_3$, and at time $t_2$, the UE is seen transitioning into grid element 802 at coordinates (7,2) from direction $d_8$ (where $t_1 < t_2$). Given that grid elements 801 and 802 are not adjacent and the UE was seen leaving/entering the grid elements from different directions, this is a non-trivial transition that may be the result of signal reflections or other interference.

This non-trivial transition can be mapped or tracked for purposes of predicting future UE paths. For example, this observed transition may be used to predict that a future UE residing at (4,−1) and heading in direction $d_3$ will transition either to (i) the trivial diagonal/adjacent grid coordinate (5,−2) or (ii) the non-trivial (observed) grid coordinate (7, 2).

Figure 9:
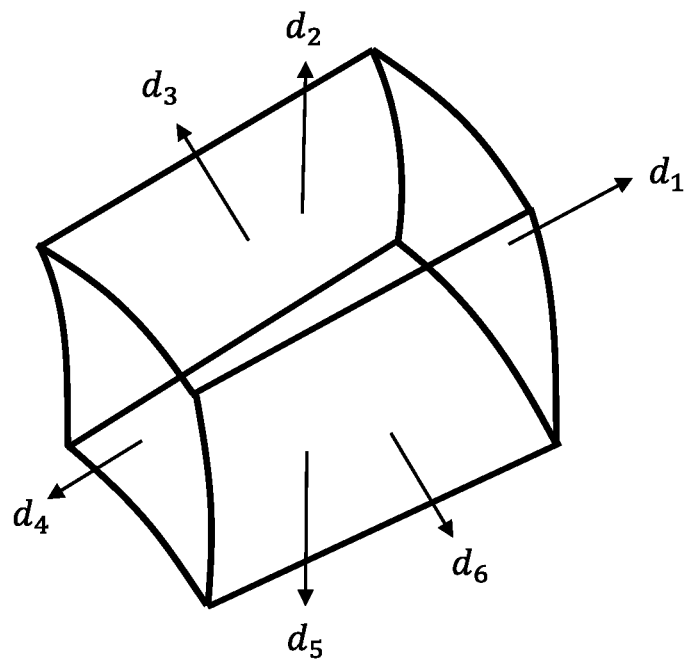
FIG. 9 illustrates a spherical grid element encompassing six directions corresponding to its faces.

FIG. 9 illustrates an example of a spherical grid element 900 encompassing six directions ($d_1$-$d_6$), one for each face of the grid element. In some embodiments, for example, the sectors within each grid element can be defined to only consider directions that lead to non-diagonal transitions in the grid, which results in six possible directions in a three-dimensional space using spherical/Cartesian grids (e.g., compared to eight directions $d_1$-$d_8$ in the example from FIGS. 8A-B). Other transition systems can also be used that utilize a different number of directions.

Figure 10A:
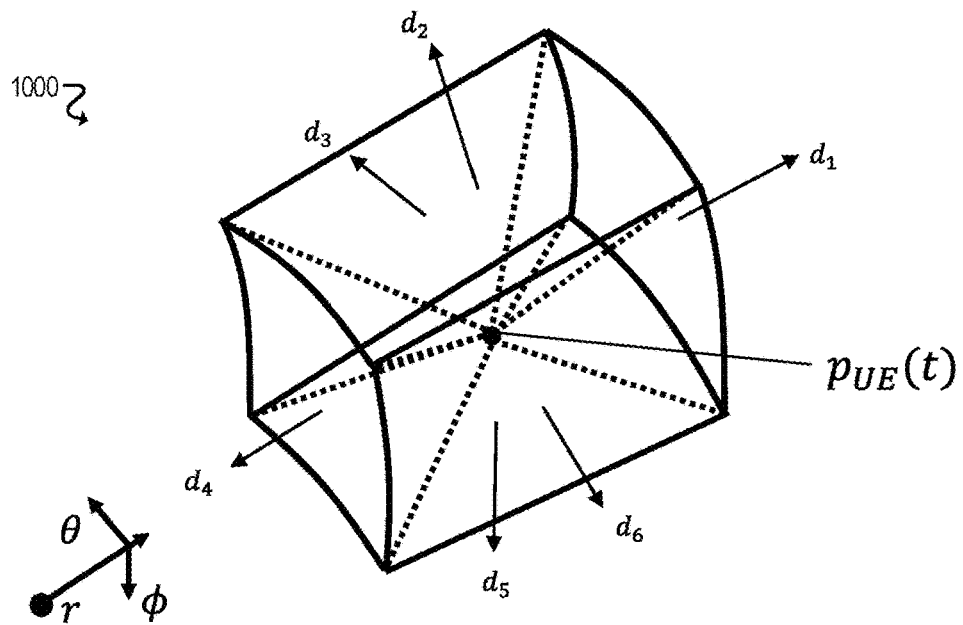
FIGS. 10A-C illustrate an example of a spherical grid element with defined sectors corresponding to each face or direction.
Figure 10B:
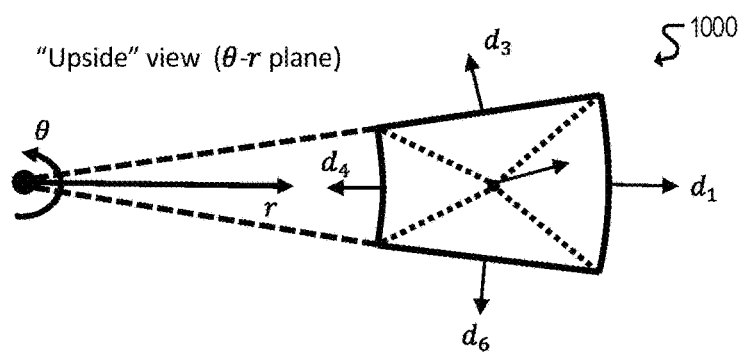
Figure 10C:
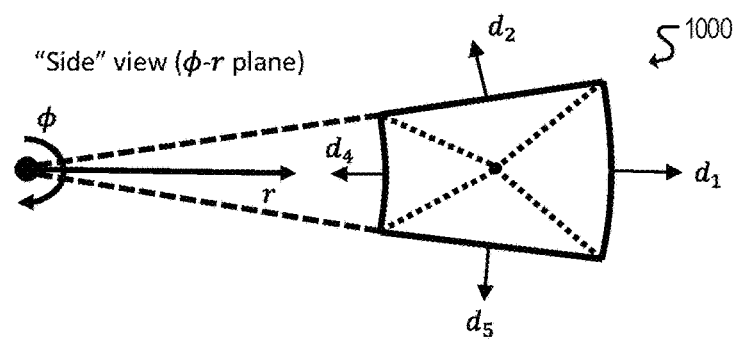

FIGS. 10A-C illustrate an example of a spherical grid element 1000 with defined sectors corresponding to the respective faces, or directions ($d_1$-$d_6$), within the volumetric element, which can be used to determine the direction of a mobile device. In particular, FIGS. 10A-C depict a 3D view, top-down view, and side view of the spherical element 1000, respectively. Construction of sectors within a Cartesian grid element can be achieved in a similar manner.

For example, to determine which direction a UE is moving in the grid element, linear algebraic methods can be used. Thus, by utilizing $p_{UE}(t)$ and the vertices of the grid element that the UE is currently residing in, sectors can be created within the grid element to determine which direction the UE is moving towards given $\bar{v}_{UE}(t)$.

With the necessary spatial points, the creation of the sectors becomes feasible. For the six directional case, a velocity vector directed towards a face of the grid element is within the span of the vectors pointing from $p_{UE}$ to a vertex. As an example, the direction $d_1$ considered if the velocity vector $\bar{v}_{UE}$ is pointing within the volume enclosed by $V_2-p_{UE}$, $V_3-p_{UE}$, $V_6-p_{UE}$ and $V_7-p_{UE}$. The designated volumetric sectors are defined as shown in FIGS. 10A-C.

The construction of the diagonal sectors is based on an offset $\beta \in [0,1]$ from the vertices of the grid elements, which in a sense quantifies the amount of weight put on what is a diagonal direction. Note that $\beta=0$ yields the six directional case. Separate weights can also be used for determining the offset, such as $B_r$, $B_\theta$, and $B_\phi$.

Explicit calculations of determining the sector for $\bar{v}_{UE}(t)$ can be achieved using linear algebra operations. For example, using the vertices available and $p_{UE}(t)$ together with $\bar{v}_{UE}(t)$, it is possible to construct a framework for determining which of the discrete directions a UE is headed.

Prediction Scheme

Figure 11:
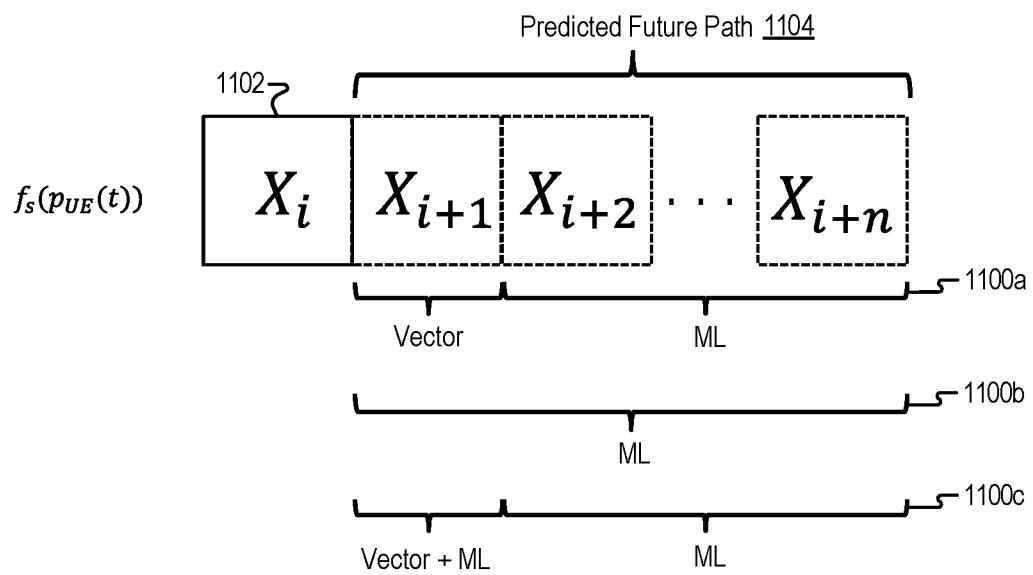
FIG. 11 illustrates examples of various mobile device path prediction schemes.

FIG. 11 illustrates examples of various UE path prediction schemes 1100a-c. In these examples, $X_i$ is the index of the grid element for the current point in time 1102. The framework for analyzing and predicting the movement 1104 of the UE is based on the previously described vector calculations and machine learning (ML) algorithms. The prediction schemes 1100a-c can include any of the following:

1. Vector first, ML after.
2. Only ML.
3. Vector and ML first, ML after.

Each scheme incorporates different ways of implementing the vector framework described in the preceding sections. The implemented ML algorithm should be based on contemporary methods for predicting n steps ahead in a time sequenced dataset. The model can range from the deep learning techniques based on recurrent neural networks, such as long short-term memory (LSTM) networks or other neural network architectures for predicting time series data. Alternatively, the deployed ML technique can be a variant of an All-K-Order Markov algorithm for predicting the next item in the sequence. In other embodiments, however, any prediction model that takes a time series input can be used. In various embodiments, for example, the predictive model may be trained using a variety of different types and combinations of artificial intelligence and/or machine learning, such as recurrent neural networks (RNNs) (e.g., a long short-term memory (LSTM) network), Markov models (e.g., an All-K-Order Markov model), logistic regression, random forest, decision trees, classification and regression trees (CART), gradient boosting (e.g., extreme gradient boosted trees), k-nearest neighbors (kNN), Naïve-Bayes, support vector machines (SVM), deep learning, and/or ensembles thereof (e.g., models that combine the predictions of multiple machine learning models to improve prediction accuracy), among other examples.

The first scheme 1100a implements the vector method described in previous section. For example, all connections are mapped out in the grid that have been observed to be possible from the data. Next, the frequency of the possible transitions in the past is used to determine which transition is ultimately the most probable (e.g., predicting the most frequent transition). In some cases, multiple predictions may be accepted. The remaining transitions are predicted by the chosen ML algorithm.

The second scheme 1100b is solely ML based, implying using historical grid series data together with real-time data to determine the next n outcomes in the sequence. For instance, given a sequence of real-time data describing which grid elements a UE has resided in (e.g., $X_1$, $X_2$, ..., $X_i$), then the next n items in the sequence are determined by the real-time data as input to the chosen ML algorithm, which then provides the requested predictions. One advantage of this approach is lower complexity.

The third scheme 1100c is the most complicated of the three that have been presented. Having vector prediction and machine learning (ML) model(s) narrows the number of possible outcomes. Thus, using the predictions from the vector based method, the next step in the prediction pipeline is a first ML algorithm (ML 1) that accounts for the set of possible transitions the vector predicts are possible, and can thus only possibly predict that the next grid element is contained in that set. The advantage of doing this is that the set of possible outcomes is narrowed compared to if the prediction would be solely based on the first ML algorithm (ML1). The next n-1 future predictions are then made using a second ML algorithm (ML 2).

Communicating the Link Prediction

Once the base station has determined the expected link quality, current and potential forward looking, it needs to communicate that onwards. This could both be with the UE itself, applications running on the UE but also server side of the applications running on the UE as well as intermediate nodes.

The simplest way to bring the link quality forward is to utilize the radio connection with the UE such as the 3GPP Uu interface (air interface). This however requires appropriate standard extensions as well as require that the UE software stack brings the information onwards to the application layer.

Another implementation could bring the information to a node in the operator network that is responsible for such functionality, such as an LPP server. That node could then, potentially by combining with additional information, take the information forward both to the UE and server side. In this case the information could be brought directly to the application level using e.g. LPP protocol or similar control channels.

Example Process Flow

Figure 12:
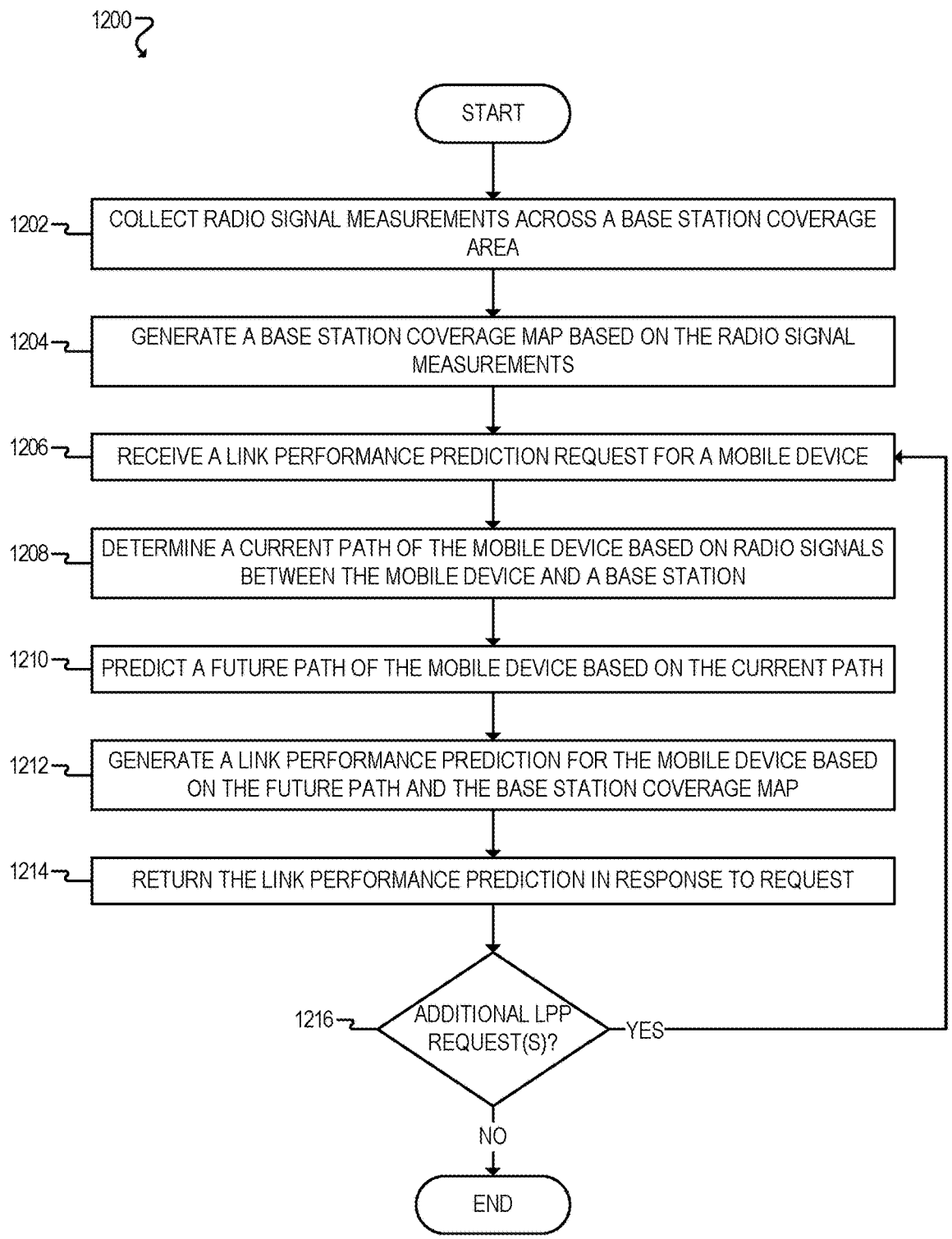
FIG. 12 illustrates a flowchart for generating link performance predictions for mobile devices using spatial link performance mapping in accordance with certain embodiments.

FIG. 12 illustrates a flowchart 1200 for generating link performance predictions for mobile devices using spatial link performance mapping in accordance with certain embodiments. In various embodiments, flowchart 1200 may be implemented and/or performed by or using the computing devices, systems, and networks described throughout this disclosure. For example, in some embodiments, flowchart 1200 may be implemented or performed by a base station (e.g., gNodeB), a mobile device (e.g., UE), a link performance prediction (LPP) server, a network node, an edge computing resource (e.g., multi-access edge computing (MEC) node or server), a cloud computing server, and/or a combination thereof, among other examples.

The flowchart begins at block 1202 by collecting radio signal measurements across a base station coverage area. For example, the base station coverage area may be a geographical area with radio signal coverage provided by one or more base stations, which may be part of a radio access network (RAN) of a communication service provider (CoSP) (e.g., a telecommunication or wireless service provider). In some embodiments, the base stations include millimeter wave (mmWave) base stations, such as mmWave gNodeB base stations in a 5G RAN. Further, the radio signal measurements may be measurements of radio signals transmitted between the base stations and mobile devices, which may be collected across numerous regions of the base station coverage area.

The flowchart then proceeds to block 1204 to generate a base station coverage map based on the radio signal measurements. For example, the radio signal measurements may be used to determine the radio signal quality across the base station coverage area, which in turn may be used to generate the base station coverage map.

In some embodiments, for example, the radio signal measurements are used to determine the corresponding radio signal quality at different three-dimensional (3D) spatial regions within the base station coverage area, and the base station coverage map is then generated with a representation of the radio signal quality at the various 3D spatial regions. In some embodiments, for example, the base station coverage map represents the various 3D regions within the base station coverage area as points within a 3D coordinate space (e.g., based on a Cartesian coordinate system or spherical coordinate system), where each point within the 3D coordinate space represents a corresponding 3D region within the base station coverage area. In addition, the base station coverage map also indicates the corresponding radio signal quality at the various 3D regions.

The flowchart then proceeds to block 1206, where a link performance prediction (LPP) request is received for a mobile device. For example, the mobile device may be a user or endpoint device in a wireless network, such as a user equipment (UE) device or mobile station in a 5G RAN. Moreover, the LPP request may be received from the mobile device itself, from another service provider of the mobile device (e.g., an application server, content provider server), and/or from within the wireless network (e.g., another node in the CoSP network/RAN), among other examples.

The flowchart then proceeds to block 1208 to determine a current path of the mobile device over a current time window. In various embodiments, the current time window may refer to a time window that takes place in or near real time, or the current time window may simply refer to a particular time window relative to other previous and/or future time windows.

Moreover, the current path of the mobile device may be determined by tracking the position of the mobile device over the current time window (e.g., a rolling window that extends backwards in time by a certain length of time).

In some embodiments, the position of the mobile device is determined or tracked using the existing tracking capabilities of the radio network, such as the UE tracking capabilities in a 5G RAN.

In some embodiments, for example, the position of the mobile device is determined relative to a base station based on measurements of radio signals transmitted between the mobile device and one or more base stations (e.g., round trip time (RTT), time of arrival (ToA), time difference of arrival (TDOA), angle of arrival (AoA), signal strength, and/or signal phase measurements). For example, with respect to a 5G mmWave gNodeB, the gNodeB sends and receives signals to and from the mobile device via a multiple-input and multiple-output (MIMO) antenna with many antenna elements. Thus, in some embodiments, the position of a mobile device may be determined based on measurements of signals received from the mobile device via the gNodeB's MIMO antennas. Alternatively, or additionally, in some embodiments, the position of a mobile device may be determined based on measurements of signals received from the mobile device by multiple base stations—or signals received by the mobile device from multiple base stations—using triangulation/trilateration techniques.

Additionally, or alternatively, the position of the mobile device may be determined using a satellite-based position system (e.g., global positioning system (GPS), global navigation satellite system (GLONASS)), Wi-Fi-based positioning system, and/or any other suitable positioning system or combination of positioning systems.

In this manner, the position of the mobile device may be determined one or more times over the current time window to determine the current path of the mobile device. The current path may indicate a sequence of positions of the mobile device over the current time window—including the current position of the mobile device and optionally one or more preceding positions of the mobile device during the current time window—along with a current direction of travel of the mobile device.

In some embodiments, for example, the current path of the mobile device is represented using the same 3D coordinate space as the base station coverage map. For example, the current path may include a sequence of points in the 3D coordinate space, including a current point indicating the current position of the mobile device, and optionally one or more other points representing preceding positions of the mobile device during the current time window. The current path may also include a direction vector within the 3D coordinate space, which indicates the current direction of travel of the mobile device.

The flowchart then proceeds to block 1210 to predict a future path of mobile device based on the current path. For example, the future path may indicate a sequence of predicted future positions of the mobile device over a future time window, such as its immediate next position (e.g., such that the mobile device is predicted to transition from the current position to the next position) and optionally one or more subsequent positions over the future time window.

In some embodiments, for example, the future path of the mobile device is represented using the same 3D coordinate space as the base station coverage map and the current path. For example, the future path may include a sequence of points in the 3D coordinate space, which may include a next point indicating the next position of the mobile device and optionally one or more subsequent points indicating subsequent positions of the mobile device during the future time window.

Moreover, in some embodiments, the future path of the mobile device is predicted based on the current path and the direction of travel of the mobile device. For example, the sequence of points representing the future path may be predicted or derived from the sequence of points representing the current path along with the direction vector representing the direction of travel.

In some embodiments, for example, a predictive model is used to predict the sequence of points in the future path. In particular, the predictive model may have been trained to predict a mobile device path based on a set of previous mobile device paths that were tracked or observed through the base station coverage area. As a result, the trained predictive model may be used to infer the sequence of points in the future path of the mobile device based on the sequence of points in its current path and the direction vector. In some embodiments, the predictive model may include a recurrent neural network (RNN) model, such as a long short-term memory (LSTM) model, or any other suitable type of artificial intelligence, machine learning, or statistical/predictive model.

Alternatively, in some embodiments, the first point in the future path of the mobile device is predicted based on the current point (indicating the current position of the mobile device) and the direction vector (indicating the direction of travel). This first point may also be referred to as the "next point" given that it corresponds to the immediate next position of the mobile device relative to the current position (e.g., the mobile device is predicted to transition from the current position/point to the next position/point).

In some embodiments, for example, the current point and the direction vector are used to determine a set of potential transition points for the mobile device in the 3D coordinate space, and the next point is then predicted from the set of potential transition points.

The set of potential transition points represents points in the 3D coordinate space that the mobile device could potentially transition to from the current point. Moreover, the set of potential transition points can include points that are adjacent to the current point (adjacent points) as well as points that are not adjacent to the current point (non-adjacent points).

For example, the direction vector may be used to identify a subset of adjacent points that qualify as potential transition points. In particular, adjacent points that are within the vicinity of the direction vector may be identified as potential transition points. On the other hand, adjacent points that the direction vector is facing away from (e.g., that are not within some margin of intersecting with the direction vector) may be excluded on the basis the mobile device is not traveling towards those points.

Further, in some cases, one or more non-adjacent points relative to the current point may also be identified as potential transition points. For example, data regarding paths that mobile devices have taken in the past may reveal previous transitions from the current point to one or more non-adjacent points. This is typically the result of reflected signals and/or other signal interference, which may cause the network to mistakenly determine that a mobile device is located somewhere other than its actual physical location.

Once the set of potential transition points has been identified, the next point may be predicted from that set of points. In some embodiments, a predictive model is used to predict the next point from the set of potential transition points. In particular, the predictive model may have been trained to predict the next point based on a set of previous mobile device paths that were tracked or observed through the base station coverage area. As a result, the trained predictive model may be used to infer the next point of the mobile device based on the current point and the set of potential transition points. In some embodiments, the predictive model may include a Markov model, such as an All-K-Order Markov model, or any other suitable type of artificial intelligence, machine learning, or statistical/predictive model. Moreover, the remaining points in the future path may be predicted in a similar manner.

The flowchart then proceeds to block 1212 to generate a link performance prediction (LPP) for the mobile device based on the future path and the base station coverage map. For example, the LPP may indicate a predicted performance of a radio link between the mobile device and the base station during the future time window.

In some embodiments, for example, the base station coverage map is used to determine the corresponding radio signal quality along the future path of the mobile device. In this manner, the link performance prediction is generated based on the radio signal quality along the future path of the mobile device (e.g., optionally in conjunction with other information, such as time of day, day of week, weather, traffic, current network load, etc.).

The flowchart then proceeds to block 1214 to return the link performance prediction (LPP) in response to the LPP request that was received at block 1206. For example, the LPP may be sent to the requesting entity or any other suitable destination, such as the mobile device, another service provider of the mobile device (e.g., an application server, content provider server), a node or server within the wireless network (e.g., another node in the CoSP network/RAN), and so forth.

In some cases, the recipient of the LPP may take certain actions in response to the predicted link performance, such as proactively compensating for an expected signal quality reduction and/or taking advantage of an upcoming high-speed coverage area. In response to an expected reduction in link performance, for example, certain proactive measures may be taken, such as performing a handoff to another base station, re-routing the mobile device through a better coverage area, adjusting video/media streaming parameters (e.g., resolution, frame rate, pre-buffer length), and so forth.

The flowchart then proceeds to block 1216 to determine whether to continue processing additional LPP request(s). For example, if there are other pending LPP request(s) that need to be processed, the flowchart repeats blocks 1206-1214 to receive and process the next LPP request. If no other LPP requests are pending, the flowchart may be complete.

At this point, the flowchart may be complete. In some embodiments, however, the flowchart may restart and/or certain blocks may be repeated. For example, in some embodiments, the flowchart may restart at block 1202 to continue generating and/or updating the base station coverage map and/or block 1206 to continue receiving and processing link performance prediction (LPP) requests.

Example Computing Embodiments

The following sections present various examples of computing devices, platforms, systems, and environments that may be used to implement the link performance prediction functionality described throughout this disclosure.

Edge Computing Environments

Figure 13:
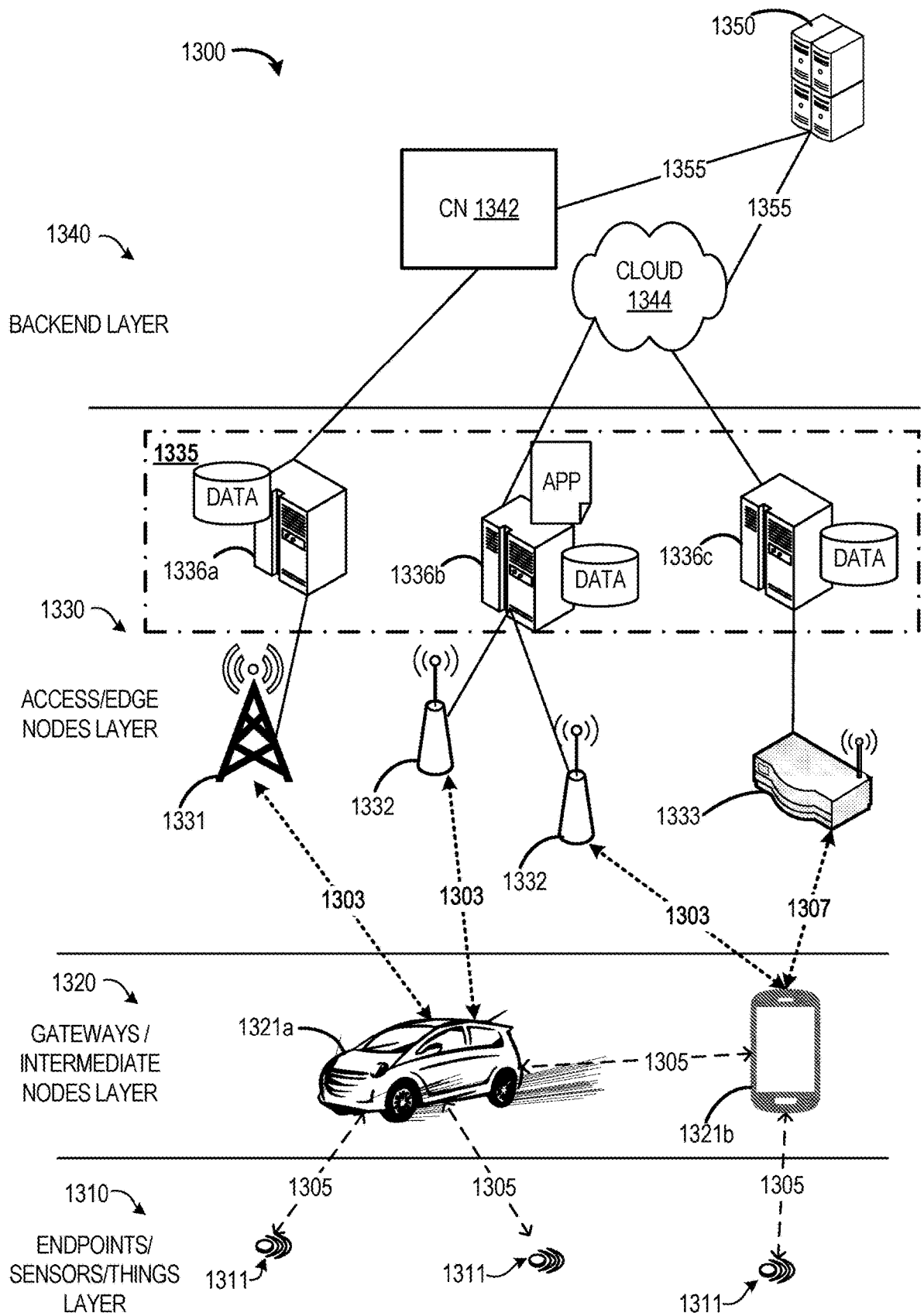
FIG. 13 illustrates an example edge computing environment in accordance with various embodiments.

FIG. 13 illustrates an example edge computing environment 1300 in accordance with various embodiments. FIG. 13 specifically illustrates the different layers of communication occurring within the environment 1300, starting from endpoint sensors or things layer 1310 (e.g., operating in an Internet of Things (IoT) network topology) comprising one or more IoT devices 1311 (also referred to as edge endpoints 1310 or the like); increasing in sophistication to gateways or intermediate node layer 1320 comprising one or more user equipment (UEs) 1321*a* and 1321*b* (also referred to as intermediate nodes 1320 or the like), which facilitate the collection and processing of data from endpoints 1310; increasing in processing and connectivity sophistication to access node layer 1330 (or "edge node layer 1330") comprising a plurality of network access nodes (NANs) 1331, 1332, and 1333 (collectively referred to as "NANs 1331-1333" or the like) and a plurality of edge compute nodes 1336*a-c* (collectively referred to as "edge compute nodes 1336" or the like) within an edge computing system 1335; and increasing in connectivity and processing sophistication to a backend layer 1310 comprising core network (CN) 1342 and cloud 1344. The processing at the backend layer 1310 may be enhanced by network services as performed by a remote application server 1350 and/or other cloud services.

Some or all of these elements may be equipped with or otherwise implement some or all aspects of the LPP embodiments discussed infra.

The environment 1300 is shown to include end-user devices, such as intermediate nodes 1320 and endpoints 1310, which are configured to connect to (or communicatively couple with) one or more multiple communication networks (also referred to as "access networks," "radio access networks," or the like) based on different access technologies (or "radio access technologies" or "RATs") for accessing application services. These access networks may include one or more of NANs 1331, 1332, and/or 1333. The NANs 1331-1333 are arranged to provide network connectivity to the end-user devices via respective links 1303, 1307 between the individual NANs and the one or more UEs 1311, 1321.

As examples, the communication networks and/or access technologies may include cellular technology such as LTE, MuLTEfire, and/or NR/5G (e.g., as provided by Radio Access Network (RAN) node 1331 and/or RAN nodes 1332), WiFi or wireless local area network (WLAN) technologies (e.g., as provided by access point (AP) 1333 and/or RAN nodes 1332), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), User Datagram Protocol (UDP), QUIC (sometimes referred to as "Quick UDP Internet Connections"), Stream Control Transmission Protocol (SCTP), Resource Reservation Protocol (RSVP), Virtual Private Network (VPN), Multi-Path TCP (MPTCP), Bidirectional-streams Over Synchronous HTTP (BOSH), Generic Routing Encapsulation (GRE), GeoNetworking protocol, Basic Transport Protocol (BTP), etc.).

The intermediate nodes 1320 include UE 1321a and UE 1321b (collectively referred to as "UE 1321" or "UEs 1321"). In this example, the UE 1321a is illustrated as a vehicle UE, and UE 1321b is illustrated as a smartphone (e.g., handheld touchscreen mobile computing device connectable to one or more cellular networks). However, these UEs 1321 may comprise any mobile or non-mobile computing device, such as tablet computers, wearable devices, PDAs, pagers, desktop computers, laptop computers, wireless handsets, unmanned vehicles or drones, and/or any type of computing device including a wireless communication interface.

The endpoints 1310 include UEs 1311, which may be IoT devices (also referred to as "IoT devices 1311"), which are uniquely identifiable embedded computing devices (e.g., within the Internet infrastructure) that comprise a network access layer designed for low-power IoT applications utilizing short-lived UE connections. The IoT devices 1311 are any physical or virtualized, devices, sensors, or "things" that are embedded with hardware and/or software components that enable the objects, devices, sensors, or "things" capable of capturing and/or recording data associated with an event, and capable of communicating such data with one or more other devices over a network with little or no user intervention. As examples, IoT devices 1311 may be abiotic devices such as autonomous sensors, gauges, meters, image capture devices, microphones, light emitting devices, audio emitting devices, audio and/or video playback devices, electro-mechanical devices (e.g., switch, actuator, etc.), EEMS, ECUs, ECMs, embedded systems, microcontrollers, control modules, networked or "smart" appliances, MTC devices, M2M devices, and/or the like. The IoT devices 1311 can utilize technologies such as M2M or MTC for exchanging data with an MTC server (e.g., a server 1350), an edge server 1336 and/or edge computing system 1335, or device via a PLMN, ProSe or D2D communication, sensor networks, or IoT networks. The M2M or MTC exchange of data may be a machine-initiated exchange of data.

The IoT devices 1311 may execute background applications (e.g., keep-alive messages, status updates, etc.) to facilitate the connections of the IoT network. Where the IoT devices 1311 are, or are embedded in, sensor devices, the IoT network may be a WSN. An IoT network describes an interconnecting IoT UEs, such as the IoT devices 1311 being connected to one another over respective direct links 1305. The IoT devices may include any number of different types of devices, grouped in various combinations (referred to as an "IoT group") that may include IoT devices that provide one or more services for a particular user, customer, organizations, etc. A service provider (e.g., an owner/operator of server 1350, CN 1342, and/or cloud 1344) may deploy the IoT devices in the IoT group to a particular area (e.g., a geolocation, building, etc.) in order to provide the one or more services. In some implementations, the IoT network may be a mesh network of IoT devices 1311, which may be termed a fog device, fog system, or fog, operating at the edge of the cloud 1344. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 1344 to Things (e.g., IoT devices 1311). The fog may be established in accordance with specifications released by the OFC, the OCF, among others. In some embodiments, the fog may be a tangle as defined by the IOTA foundation.

The fog may be used to perform low-latency computation/aggregation on the data while routing it to an edge cloud computing service (e.g., edge nodes 1330) and/or a central cloud computing service (e.g., cloud 1344) for performing heavy computations or computationally burdensome tasks. On the other hand, edge cloud computing consolidates human-operated, voluntary resources, as a cloud. These voluntary resource may include, inter-alia, intermediate nodes 1320 and/or endpoints 1310, desktop PCs, tablets, smartphones, nano data centers, and the like. In various implementations, resources in the edge cloud may be in one to two-hop proximity to the IoT devices 1311, which may result in reducing overhead related to processing data and may reduce network delay.

In some embodiments, the fog may be a consolidation of IoT devices 1311 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks or workloads offloaded by edge resources.

In embodiments, the fog may operate at the edge of the cloud 1344. The fog operating at the edge of the cloud 1344 may overlap or be subsumed into an edge network 1330 of the cloud 1344. The edge network of the cloud 1344 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes 1336 or edge devices). The Fog layer resides on top of the edge layer and is a consolidation of networking devices such as the intermediate nodes 1320 and/or endpoints 1310 of FIG. 13.

Data may be captured, stored/recorded, and communicated among the IoT devices 1311 (or, for example, among the intermediate nodes 1320 and/or endpoints 1310 that have direct links 1305 with one another as shown by FIG. 13). Analysis of the traffic flow and control schemes may be implemented by aggregators that are in communication with the IoT devices 1311 and each other through a mesh network. The aggregators may be a type of IoT device 1311 and/or network appliance. In the example of FIG. 13, the aggregators may be edge nodes 1330, or one or more designated intermediate nodes 1320 and/or endpoints 1310. Data may be uploaded to the cloud 1344 via the aggregator, and commands can be received from the cloud 1344 through gateway devices that are in communication with the IoT devices 1311 and the aggregators through the mesh network. Unlike the traditional cloud computing model, in some implementations, the cloud 1344 may have little or no computational capabilities and only serves as a repository for archiving data recorded and processed by the fog. In these implementations, the cloud 1344 centralized data storage system and provides reliability and access to data by the computing resources in the fog and/or edge devices. Being at the core of the architecture, the Data Store of the cloud 1344 is accessible by both Edge and Fog layers of the aforementioned edge-fog network.

As mentioned previously, the access networks provide network connectivity to the end-user devices 1320, 1310 via respective NANs 1331-1333. The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. In some embodiments, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. In these embodiments, the CRAN, CR, or vBBUP may implement a RAN function split, wherein one or more communication protocol layers are operated by the CRAN/CR/vBBUP and other communication protocol entities are operated by individual RAN nodes 1331, 1332. This virtualized framework allows the freed-up processor cores of the NANs 1331, 1332 to perform other virtualized applications, such as virtualized applications for LPP embodiments discussed herein.

The UEs 1321, 1311 may utilize respective connections (or channels) 1303, each of which comprises a physical communications interface or layer. The connections 1303 are illustrated as an air interface to enable communicative coupling consistent with cellular communications protocols, such as 3GPP LTE, 5G/NR, Push-to-Talk (PTT) and/or PTT over cellular (POC), UMTS, GSM, CDMA, and/or any of the other communications protocols discussed herein. In some embodiments, the UEs 1311, 1321 and the NANs 1331-1333 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). To operate in the unlicensed spectrum, the UEs 1311, 1321 and NANs 1331-1333 may operate using LAA, enhanced LAA (eLAA), and/or further eLAA (feLAA) mechanisms. The UEs 1321, 1311 may further directly exchange communication data via respective direct links 1305, which may be LTE/NR Proximity Services (ProSe) link or PC5 interfaces/links, or WiFi based links or a personal area network (PAN) based links (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/Bluetooth Low Energy (BLE) protocols).

The UEs 1311, 1321 are capable of measuring various signals or determining/identifying various signal/channel characteristics. Signal measurement may be performed for cell selection, handover, network attachment, testing, and/or other purposes. The measurements collected by the UEs 1311, 1321 may include one or more of the following: a bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate, packet reception rate (PRR), signal-to-noise ratio (SNR), signal-to-noise and interference ratio (SINR), signal-plus-noise-plus-distortion to noise-plus-distortion (SINAD) ratio, peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between a NAN 1331-1333 reference time and a GNSS-specific reference time for a given GNSS), GNSS code measurements (e.g., The GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, FILS discovery frames, or probe response frames for IEEE 802.11 WLAN/WiFi networks. Other measurements may be additionally or alternatively used, such as those discussed in 3GPP TS 36.214 v15.4.0, 3GPP TS 38.215, IEEE 802.11, Part 11: "Wireless LAN Medium Access Control (MAC) and Physical Layer (PHY) specifications, IEEE Std.", and/or the like. The same or similar measurements may be measured or collected by the NANs 1331-1333.

The UE 1321b is shown to be configured to access an access point (AP) 1333 via a connection 1307. In this example, the AP 1333 is shown to be connected to the Internet without connecting to the CN 1342 of the wireless system. The connection 1307 can comprise a local wireless connection, such as a connection consistent with any IEEE 802.11 protocol, wherein the AP 1333 would comprise a wireless fidelity (WiFi®) router. In embodiments, the UEs 1321 and IoT devices 1311 can be configured to communicate using suitable communication signals with each other or with any of the AP 1333 over a single or multicarrier communication channel in accordance with various communication techniques, such as, but not limited to, an orthogonal frequency division multiplexing (OFDM) communication technique, a single-carrier frequency division multiple access (SC-FDMA) communication technique, and/or the like, although the scope of the embodiments is not limited in this respect. The communication technique may include a suitable modulation scheme such as Complementary Code Keying (CCK); Phase-Shift Keying (PSK) such as Binary PSK (BPSK), Quadrature PSK (QPSK), Differential PSK (DPSK), etc.; or Quadrature Amplitude Modulation (QAM) such as M-QAM; and/or the like.

The one or more NANs 1331 and 1332 that enable the connections 1303 may be referred to as "RAN nodes" or the like. The RAN nodes 1331, 1332 may comprise ground stations (e.g., terrestrial access points) or satellite stations providing coverage within a geographic area (e.g., a cell). The RAN nodes 1331, 1332 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 1331 is embodied as a NodeB, evolved NodeB (eNB), or a next generation NodeB (gNB), and the RAN nodes 1332 are embodied as relay nodes, distributed units, or Road Side Unites (RSUs). Any other type of NANs can be used.

Any of the RAN nodes 1331, 1332 can terminate the air interface protocol and can be the first point of contact for the UEs 1321 and IoT devices 1311. In some embodiments, any of the RAN nodes 1331/1332 can fulfill various logical functions for the RAN including, but not limited to, RAN function(s) (e.g., radio network controller (RNC) functions and/or NG-RAN functions) for radio resource management, admission control, uplink and downlink dynamic resource allocation, radio bearer management, data packet scheduling, etc. In embodiments, the UEs 1311, 1321 can be configured to communicate using OFDM communication signals with each other or with any of the NANs 1331, 1332 over a multicarrier communication channel in accordance with various communication techniques, such as, but not limited to, an OFDMA communication technique (e.g., for downlink communications) and/or an SC-FDMA communication technique (e.g., for uplink and ProSe or sidelink communications), although the scope of the embodiments is not limited in this respect.

For most cellular communication systems, the RAN function(s) operated by the RAN or individual NANs 1331-1332 organize downlink transmissions (e.g., from any of the RAN nodes 1331, 1332 to the UEs 1311, 1321) and uplink transmissions (e.g., from the UEs 1311, 1321 to RAN nodes 1331, 1332) into radio frames (or simply "frames") with 10 millisecond (ms) durations, where each frame includes ten 1 ms subframes. Each transmission direction has its own resource grid that indicate physical resource in each slot, where each column and each row of a resource grid corresponds to one symbol and one subcarrier, respectively. The duration of the resource grid in the time domain corresponds to one slot in a radio frame. The resource grids comprises a number of resource blocks (RBs), which describe the mapping of certain physical channels to resource elements (REs). Each RB may be a physical RB (PRB) or a virtual RB (VRB) and comprises a collection of REs. An RE is the smallest time-frequency unit in a resource grid. The RNC function(s) dynamically allocate resources (e.g., PRBs and modulation and coding schemes (MCS)) to each UE 1311, 1321 at each transmission time interval (TTI). A TTI is the duration of a transmission on a radio link 1303, 1305, and is related to the size of the data blocks passed to the radio link layer from higher network layers.

The area or region to be supplied with wireless network service or connectivity by the NAN 1331-1333 is divided into cells, each of which have a pattern dependent on the physical characteristics (e.g., terrain, physical objects or obstacles, etc.) and radio transmission/reception characteristics. The cell patterns may be in the form of shapes, such as circles, hexagons, squares, or the like, having a size that varies depending, in part, on the radio transmission/reception characteristics. Each of these cells is assigned with multiple channels or frequency carriers that are provided by a respective NAN 1331, 1332, 1333. The channels or frequencies used in one cell can be reused in other cells, provided that the same frequencies are not reused in adjacent cells, which would cause co-channel interference. For example, a first NAN 1331 may provide an LTE cell in a frequency band (or overall cell bandwidth) of 600 MHz to 6 gigahertz (GHz) with channel BWs (or carrier BWs) of 1.4, 3, 5, 10, 15, or 20 megahertz (MHz) (depending on the duplex mode of the frequency band), which may be aggregated together to create a channel BW up to 100 MHz (in LTE-Advance) or up to 640 MHZ (in LTE-Advanced Pro). In a second example, a second NAN 1331 may provide a 5G/NR cell with a maximum carrier BW (or channel BW) of 100 MHz in frequency range 1 (FR1: 450 MHz to 6 GHz) or a maximum carrier BW (or channel BW) of 400 MHz in frequency range 2 (FR2: 24.25 GHz to 52.6 GHz) that can be aggregated with a maximum bandwidth of 800 MHZ. In each of the aforementioned examples, the exact frequency band and the channel BWs that can be used may depend on the country and/or regulatory regime in which the NAN 1333 is located.

A given cell has a certain amount of radio resources within its frequency band that can be allocated to individual UEs 1311, 1321. The amount of resources per cell may be expressed a number of PRBs per TTI, and the amount of available resources (e.g., non-occupied PRBs) depends on the traffic load of a cell. The amount of data that can be transmitted in a PRB depends in part on radio link quality. Radio link quality may also change based on UE 1321, 1311 mobility within a particular cell (referred to as "intra-cell mobility" or the like) and mobility between cells (referred to as "inter-cell mobility" or the like). Additionally, radio signal properties/characteristics are affected by interference from other radio signals and physical obstacles (e.g., tress, buildings, statues, etc.) blocking a line-of-sight (LoS) of radio transmitters or receivers. The amount of data that can be transmitted in a PRB affects the realized and/or perceived performance of a wireless network or a given link 1303, 1305, 1307. In other words, the radio signal performance properties/characteristics impact the BW and/or network services that can be provided by individual cells and/or individual NANs 1331-1333, as well as the resource consumption of the UEs 1311, 1321 and the NANs 1331-1333 themselves. As discussed in more detail infra, the LPP technology discussed herein is used to predict future performance and/or characteristics of the wireless interfaces 1303, 1305, 1307 based on various criteria.

The NANs 1331/1332 may be configured to communicate with one another via respective interfaces or links (not shown), such as an X2 interface for LTE implementations (e.g., when CN 1342 is an Evolved Packet Core (EPC)), an Xn interface for 5G or NR implementations (e.g., when CN 1342 is an Fifth Generation Core (5GC)), or the like. The NANs 1331 and 1332 are also communicatively coupled to CN 1342. In embodiments, the CN 1342 may be an evolved packet core (EPC) network, a NextGen Packet Core (NPC) network, a 5G core (5GC), or some other type of CN. The CN 1342 may comprise a plurality of network elements, which are configured to offer various data and telecommunications services to customers/subscribers (e.g., users of UEs 1321 and IoT devices 1311) who are connected to the CN 1342 via a RAN. The components of the CN 1342 may be implemented in one physical node or separate physical nodes including components to read and execute instructions from a machine-readable or computer-readable medium (e.g., a non-transitory machine-readable storage medium). In some embodiments, Network Functions Virtualization (NFV) may be utilized to virtualize any or all of the above-described network node functions via executable instructions stored in one or more computer-readable storage mediums (described in further detail infra). A logical instantiation of the CN 1342 may be referred to as a network slice, and a logical instantiation of a portion of the CN 1342 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 1342 components/functions.

The CN 1342 is shown to be communicatively coupled to an application server 1350 and a network 1350 via an IP communications interface 1355. the one or more server(s) 1350 comprise one or more physical and/or virtualized systems for providing functionality (or services) to one or more clients (e.g., UEs 1321 and IoT devices 1311) over a network (e.g., cloud 1344). The server(s) 1350 may include various computer devices with rack computing architecture component(s), tower computing architecture component(s), blade computing architecture component(s), and/or the like. The server(s) 1350 may represent a cluster of servers, a server farm, a cloud computing service, or other grouping or pool of servers, which may be located in one or more datacenters. The server(s) 1350 may also be connected to, or otherwise associated with one or more data storage devices (not shown). Moreover, the server(s) 1350 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 1350 offer applications or services that use IP/network resources. As examples, the server(s) 1350 may provide traffic management services, cloud analytics, content streaming services, immersive gaming experiences, social networking and/or microblogging services, and/or other like services. In addition, the various services provided by the server(s) 1350 may include initiating and controlling software and/or firmware updates for applications or individual components implemented by the UEs 1321 and IoT devices 1311. The server(s) 1350 can also be configured to support one or more communication services (e.g., Voice-over-Internet Protocol (VoIP) sessions, PTT sessions, group communication sessions, social networking services, etc.) for the UEs 1321 and IoT devices 1311 via the CN 1342.

The cloud 1344 may represent a cloud computing architecture/platform that provides one or more cloud computing services. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Some capabilities of cloud 1344 include application capabilities type, infrastructure capabilities type, and platform capabilities type. A cloud capabilities type is a classification of the functionality provided by a cloud service to a cloud service customer (e.g., a user of cloud 1344), based on the resources used. The application capabilities type is a cloud capabilities type in which the cloud service customer can use the cloud service provider's applications; the infrastructure capabilities type is a cloud capabilities type in which the cloud service customer can provision and use processing, storage or networking resources; and platform capabilities type is a cloud capabilities type in which the cloud service customer can deploy, manage and run customer-created or customer-acquired applications using one or more programming languages and one or more execution environments supported by the cloud service provider. Cloud services may be grouped into categories that possess some common set of qualities.

Some cloud service categories that the cloud 1344 may provide include, for example, Communications as a Service (CaaS), which is a cloud service category involving real time interaction and collaboration services; Compute as a Service (CompaaS), which is a cloud service category involving the provision and use of processing resources needed to deploy and run software; Database as a Service (DaaS), which is a cloud service category involving the provision and use of database system management services; Data Storage as a Service (DSaaS), which is a cloud service category involving the provision and use of data storage and related capabilities; Firewall as a Service (FaaS), which is a cloud service category involving providing firewall and network traffic management services; Infrastructure as a Service (IaaS), which is a cloud service category involving infrastructure capabilities type; Network as a Service (NaaS), which is a cloud service category involving transport connectivity and related network capabilities; Platform as a Service (PaaS), which is a cloud service category involving the platform capabilities type; Software as a Service (Saas), which is a cloud service category involving the application capabilities type; Security as a Service, which is a cloud service category involving providing network and information security (infosec) services; and/or other like cloud services.

In some embodiments, the cloud 1344 may represent a network such as the Internet, a local area network (LAN) or a wide area network (WAN) including proprietary and/or enterprise networks for a company or organization, or combinations thereof. The cloud 1344 may be a network that comprises computers, network connections among the computers, and software routines to enable communication between the computers over network connections. In this regard, the cloud 1344 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 1344 may be via a wired or a wireless connection using the various communication protocols discussed infra. More than one network may be involved in a communication session between the illustrated devices. Connection to the cloud 1344 may require that the computers execute software routines which enable, for example, the seven layers of the OSI model of computer networking or equivalent in a wireless (cellular) phone network. Cloud 1344 may be used to enable relatively long-range communication such as, for example, between the one or more server(s) 1350 and one or more UEs 1321 and IoT devices 1311. In some embodiments, the cloud 1344 may represent the Internet, one or more cellular networks, local area networks, or wide area networks including proprietary and/or enterprise networks, TCP/Internet Protocol (IP)-based network, or combinations thereof. In such embodiments, the cloud 1344 may be associated with network operator who owns or controls equipment and other elements necessary to provide network-related services, such as one or more base stations or access points, one or more servers for routing digital data or telephone calls (e.g., a core network or backbone network), etc. The backbone links 1355 may include any number of wired or wireless technologies, and may be part of a LAN, a WAN, or the Internet. In one example, the backbone links 1355 are fiber backbone links that couple lower levels of service providers to the Internet, such as the CN 1342 and cloud 1344.

In embodiments, the edge compute nodes 1336 may include or be part of an edge system 1335 (or edge network 1335). The edge system 1335 includes a collection of edge compute nodes 1336 and edge management systems (not shown by FIG. 13) necessary to run edge computing applications (e.g., MEC Apps 1436 of FIG. 14) within an operator network or a subset of an operator network. The edge compute nodes 1336 may also be referred to as "edge hosts 1336" or "edge servers 1336." The edge servers 1336 are physical computer systems that may include an edge platform (e.g., MEC platform 1437 of FIG. 14) and/or virtualization infrastructure (e.g., VI 1438 of FIG. 14), and provide compute, storage, and network resources to edge computing applications. Each of the edge servers 1336 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to intermediate nodes 1320 and/or endpoints 1310. The VI of the edge servers 1336 provide virtualized environments and virtualized resources for the edge hosts, and the edge computing applications may run as VMs and/or application containers on top of the VI. One example implementation of the edge system 1335 is a MEC system 1335, which is discussed in more detail infra with respect to FIG. 14. It should be understood that the disclosed MEC systems and services deployment examples are only one illustrative example of edge computing systems/networks 1335, and that the example embodiments discussed herein may be applicable to many other edge computing/networking technologies in various combinations and layouts of devices located at the edge of a network. Examples of such other edge computing/networking technologies that may implement the embodiments herein include Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used to practice the embodiments herein.

As shown by FIG. 13, each of the NANs 1331, 1332, and 1333 are co-located with edge compute nodes (or "edge servers") 1336a, 1336b, and 1336c, respectively. These implementations may be small-cell clouds (SCCs) where an edge compute node 1336 is co-located with a small cell (e.g., pico-cell, femto-cell, etc.), or may be mobile micro clouds (MCCs) where an edge compute node 1336 is co-located with a macro-cell (e.g., an eNB, gNB, etc.). The edge compute node 1336 may be deployed in a multitude of arrangements other than as shown by FIG. 13. In a first example, multiple NANs 1331-1333 are co-located or otherwise communicatively coupled with one edge compute node 1336. In a second example, the edge servers 1336 may be co-located or operated by RNCs, which may be the case for legacy network deployments, such as 3G networks. In a third example, the edge servers 1336 may be deployed at cell aggregation sites or at multi-RAT aggregation points that can be located either within an enterprise or used in public coverage areas. In a fourth example, the edge servers 1336 may be deployed at the edge of CN 1342. These implementations may be used in follow-me clouds (FMC), where cloud services running at distributed data centers follow the UEs 1321 as they roam throughout the network.

In any of the aforementioned embodiments and/or implementations, the edge servers 1336 provide a distributed computing environment for application and service hosting, and also provide storage and processing resources so that data and/or content can be processed in close proximity to subscribers (e.g., users of UEs 1321, 1311) for faster response times The edge servers 1336 also support multi-tenancy run-time and hosting environment(s) for applications, including virtual appliance applications that may be delivered as packaged VM images, middleware application and infrastructure services, content delivery services including content caching, mobile big data analytics, and computational offloading, among others. Computational offloading involves offloading computational tasks, workloads, applications, and/or services to the edge servers 1336 from the UEs 1311/1321, CN 1342, cloud 1344, and/or server(s) 1350, or vice versa. For example, a device application or client application operating in a UE 1321/1311 may offload application tasks or workloads to one or more edge servers 1336. In another example, an edge server 1336 may offload application tasks or workloads to one or more UE 1321/1311 (e.g., for distributed ML computation or the like).

Various aspects of the LPP embodiments may be performed by one or more server(s) 1350, by one or more NFs in the CN 1342, by cloud 1344 (or one or more cloud computing nodes within the cloud 1344), and/or by one or more edge compute nodes 1336. The collection or combination of systems or devices that perform the LPP embodiments discussed herein may be collectively referred to as an "LPP service," which is discussed in more detail with respect to FIG. 15.

Figure 14:
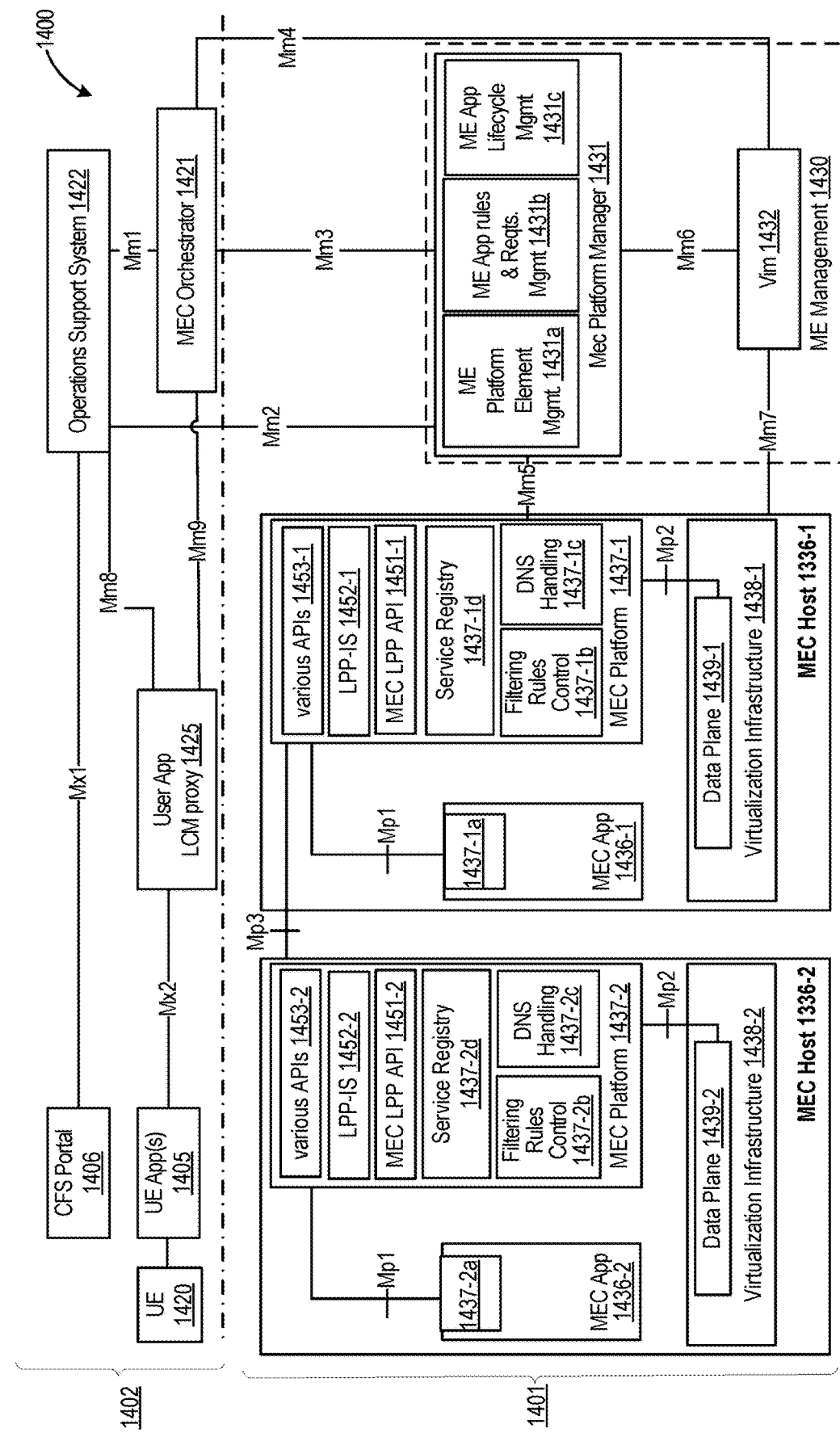
FIG. 14 depicts a block diagram for an example Multi-access Edge Computing (MEC) system architecture according to various embodiments.

FIG. 14 depicts a block diagram for an example Multi-access Edge Computing (MEC) system architecture 1400 according to various embodiments. As mentioned previously, the edge compute nodes 1336 of FIG. 13 may be implemented using MEC technologies depicted by FIG. 14. MEC offers application developers and content providers cloud-computing capabilities and an Information Technology (IT) service environment at the edge of the network. This environment is characterized by ultra-low latency and high bandwidth as well as real-time access to radio network information that can be leveraged by applications. MEC technology permits to flexible and rapid deployment of innovative applications and services towards mobile subscribers, enterprises and vertical segments. In particular, the MEC system 1400 allows applications to, inter alia, exchange data, provide data to aggregation points, and access to data in databases which provide an overview of the local situation derived from a multitude of sensors.

The illustrated logical connections between various entities of the MEC architecture 1400 may be access-agnostic and not dependent on a particular deployment. MEC enables implementation of MEC applications (MEC Apps) 1436-1 and 1436-2 (collectively referred to as "MEC Apps 1436" or the like) as software-only entities that run on top of a Virtualization Infrastructure (VI) 1438-1 and 1438-2 (collectively referred to as "VI 1438" or the like), which is located in or close to the network edge. A MEC app 1436 is an application that can be instantiated on a MEC host 1336 within the MEC system 1400 and can potentially provide or consume MEC services 1437a. The term "user application" in the context of MEC refers to an MEA 1436 that is instantiated in the MEC system 1400 in response to a request from a user (e.g., UE 1311, 1321) via a device application. FIG. 14 shows the general entities involved, and these entities can be grouped into multi-access edge system level 1402, multi-access edge host level 1401, and network level entities (not shown). The multi-access edge host level 1401 includes a MEC host 1336-1 and MEC host 1336-2 (which may be the same or similar to the MEC servers 1336 discussed previously, and are collectively referred to as "MEC host 1336" or the like) and Multi-access Edge (ME) management 1430, which provide functionality to run MEC Apps 1436 within an operator network or a subset of an operator network. The multi-access edge system level 1402 includes multi-access edge system level management 1402, UE 1420 (which may be the same or similar to the intermediate nodes 1320 and/or endpoints 1310 discussed herein), and third party entities. The network level (not shown) includes various external network level entities, such as a 3GPP network (e.g., CN 1342 of FIG. 13), a local area network (e.g., a LAN, WLAN, PAN, etc.), and an external network (e.g., CN 1342 and/or cloud 1344 of FIG. 13). The multi-access edge host level 1401 includes multi-access edge host level management and one or more MEC hosts 1336. The multi-access edge host level management may include various components that handle the management of the multi-access edge specific functionality of a particular MEC platform 1437, MEC host 1336, and the MEC Apps 1436 to be run. The MEC host 1336 includes the MEC platform 1437, MEC Apps 1436, and VI 1438.

The MEC system 1400 includes three groups of reference points, including "Mp" reference points regarding the multi-access edge platform functionality; "Mm" reference points, which are management reference points; and "Mx" reference points, which connect MEC entities to external entities. The interfaces/reference points in the MEC system 1400 may include IP-based connections, and may be used to provide Representational State Transfer (REST or RESTful) services, and the messages conveyed using the reference points/interfaces may be in XML, HTML, JSON, or some other desired format, such as those discussed herein. A suitable Authentication, Authorization, and Accounting (AAA) protocol, such as the radius or diameter protocols, may also be used for communicating over the reference points/interfaces in other embodiments.

The MEC host 1336 is an entity that contains an MEC platform 1437 and VI 1438 which provides compute, storage, and network resources for the purpose of running MEC Apps 1436. Each of the VIs 1438 includes a respective data plane (DP) 1439 (including DP 1439-1 and 1439-2) that executes respective traffic rules 1437-1b and 1437-2b (collectively referred to as "traffic rules 1437b") received by the MEC platform 1437, and routes the traffic among applications (e.g., MEC Apps 1436), MEC services 1437-1a and 1437-2a (collectively referred to as "MEC services 1437a"), DNS server/proxy (see e.g., via DNS handling entities 1437-1c and 1437-2c), 3GPP network, local networks, and external networks. The MEC DP 1438a may be connected with the (R)AN nodes 1331 and CN 1342 of FIG. 13, and/or may be connected with the AP 1333 of FIG. 13 via a wider network, such as the internet, an enterprise network, or the like. The other entities depicted and/or discussed herein may be the same or similar as those discussed with regard to FIG. 13.

The MEC platforms 1437-1 and 1437-2 (collectively referred to as "MEC platform 1437" or the like) within a MEC host 1336 may be a collection of essential functionality required to run MEC Apps 1436 on a particular VI 1438 and enable them to provide and consume MEC services 1437a, and that can provide itself a number of MEC services 1437a. The MEC platform 1437 can also provide various services and/or functions, such as offering an environment where the MEC Apps 1436 can discover, advertise, consume and offer MEC services 1437a (discussed infra), including MEC services 1437a available via other platforms when supported. The MEC platform 1437 may be able to allow authorized MEC Apps 1436 to communicate with third party servers located in external networks. The MEC platform 1437 may receive traffic rules from the MEC platform manager 1431, applications, or services, and instruct the data plane accordingly (see e.g., Traffic Rules Control 1437b). The MEC platform 1437 may send instructions to the DP 1438 within the VI 1438 via the Mp2 reference point. The Mp2 reference point between the MEC platform 1437 and the DP 1438 of the VI 1438 may be used to instruct the DP 1438 on how to route traffic among applications, networks, services, etc. In some implementations, the MEC platform 1437 may translate tokens representing UEs XP01 in the traffic rules into specific IP addresses. The MEC platform 1437 also receives DNS records from the MEC platform manager 1431 and configures a DNS proxy/server accordingly. The MEC platform 1437 hosts MEC services 1437a including the multi-access edge services discussed infra, and provide access to persistent storage and time of day information. Furthermore, the MEC platform 1437 may communicate with other MEC platforms 1437 of other MEC servers 1336 via the Mp3 reference point.

The VI 1438 may represent the totality of all hardware and software components which build up the environment in which MEC Apps 1436 and/or MEC platform 1437 are deployed, managed and executed. The VI 1438 may span across several locations, and the network providing connectivity between these locations is regarded to be part of the VI 1438. The physical hardware resources of the VI 1438 includes computing, storage and network resources that provide processing, storage and connectivity to MEC Apps 1436 and/or MEC platform 1437 through a virtualization layer (e.g., a hypervisor, VM monitor (VMM), or the like). The virtualization layer may abstract and/or logically partition the physical hardware resources of the MEC server 1336 as a hardware abstraction layer. The virtualization layer may also enable the software that implements the MEC Apps 1436 and/or MEC platform 1437 to use the underlying VI 1438, and may provide virtualized resources to the MEC Apps 1436 and/or MEC platform 1437, so that the MEC Apps 1436 and/or MEC platform 1437 can be executed.

The MEC Apps 1436 are applications that can be instantiated on a MEC host 1336 within the MEC system 1400 and can potentially provide or consume MEC services 1437*a*. The term "MEC service" refers to a service provided via a MEC platform 1437 either by the MEC platform 1437 itself or by a MEC APP 1436. MEC Apps 1436 may run as VM on top of the VI 1438 provided by the MEC server 1336, and can interact with the MEC platform 1437 to consume and provide the MEC services 1437*a*. The MEC Apps 1436 are instantiated on the VI 1438 of the MEC server 1336 based on configuration or requests validated by the ME management 1430. The MEC Apps 1436 can also interact with the MEC platform 1437 to perform certain support procedures related to the lifecycle of the MEC Apps 1436, such as indicating availability, preparing relocation of user state, etc. The MEC Apps 1436 may have a certain number of rules and requirements associated to them, such as required resources, maximum latency, required or useful services, etc. These requirements may be validated by the ME management 1430, and can be assigned to default values if missing. MEC services 1437-1*a* and 1437-2*a* (collectively referred to as "MEC services "1437*a*" or the like) are services provided and/or consumed either by the MEC platform 1437 and/or MEC Apps 1436. The service consumers (e.g., MEC Apps 1436 and MEC platform 1437) may communicate with particular MEC services 1437*a* over individual APIs (including MEC LPP API 1451-1, 1451-2 and various APIs 1453-1, 1453-2 in FIG. 14). When provided by an application, a MEC service 1437*a* can be registered in a list of services in the service registries 1437-1*d* and 1437-2*d* (collectively referred to as "service registry 1437*d*" or the like) to a respective the MEC platform 1437 over the Mp1 reference point. Additionally, the MEC Apps 1436 can subscribe to one or more services 1437*a* for which it is authorized over the Mp1 reference point. In various embodiments, one or more MEC Apps 1436 are configured to collect data for the LPP services discussed herein (e.g., LPPS 1500 of FIG. 15). In these embodiments, the MEC platform 1437 may operate these MEC Apps 1436 to perform the various functionalities of the LPP layer 1502 (or LPP engine) and/or one or more prediction layers 1525-1 to 1525-N of FIG. 15, and/or perform the various functionalities of the embodiments discussed infra with respect to the other figures in this disclosure.

The MEC system 1400 may support a feature called UserApps. When the MEC system 1400 supports the feature UserApps, the ME management 1430 may support the instantiation of MEC Apps 1436 (or user applications) on multiple MEC hosts 1336 following a single instantiation request, and when required by the operator in response to a request by the user. The application instance may need to fulfill a number of potential constraints predefined for the application 1405. Once instantiated, connectivity may be established between the UE 1420 and the application instance. Potential constraints may include latency, location, compute resources, storage resources, network capability, security conditions, and the like. As part of the user application (or MEC app 1436) instantiation, the MEC system 1400 will create an associated application context that the MEC system 1400 maintains for the lifetime of the user application (or MEC app 1436). The application context is a set of reference data about an application instance that is used to identify it, enable lifecycle management operations and associate it with its device application, The term "user context" in the context of MEC refers to application-specific runtime data maintained by a MEC app 1436, which is associated with a user of that application. The application context contains information specific to the application instance such as its unique identifier within the MEC system 1400 and the address (e.g., URI or the like) provided for clients (e.g., UE 1420) that are external to the MEC system 1400 to interact with the user application.

When the MEC system 1400 supports the feature UserApps, the system 1400 may, in response to a request by a user, support the establishment of connectivity between the UE 1420 and an instance of a specific MEC APP 1436 fulfilling the requirements of the MEC APP 1436 regarding the UE 1420. If no instance of the MEC APP 1436 fulfilling these requirements is currently running, the multi-access edge system management may create a new instance of the application 1405 on a MEC host 1336 that fulfils the requirements of the application 1405. Once instantiated, connectivity is established between the UE 1420 and the new MEC APP 1436 instance. Requirements of the application can include latency, location, compute resources, storage resources, network capability, security conditions, and the like. When the MEC system 1400 supports the UserApps feature, the system 1400 may support the on-boarding of MEC Apps 1436 during the execution of an instantiation request, may allow the establishment of connectivity between the UE 1420 and a specific instance of an MEC APP 1436, may support the capability to terminate the MEC App 1436 instance when no UE 1420 is connected to it anymore, and may support the termination of the MEC APP 1436 running on multiple MEC servers 1336 following a single termination request.

As shown by FIG. 14, the Mp1 reference point is between the MEC platform 1437 and the MEC Apps 1436. The Mp1 reference point may provide service registration 1437*d*, service discovery, and communication support for various services, such as the MEC services 1437-1*a* provided by MEC host 1336-1 and MEC services 1437-2*a* provided by MEC host 1336-2 (collectively referred to as "MEC services 1437*a*" or the like). In addition, the Mp1 interface may provide application availability, session state relocation support procedures, traffic rules and DNS rules activation, access to persistent storage and time of day information, and/or the like. The Mp1 reference point may be used for consuming and providing service specific functionality.

Examples of MEC services 1437*a* include Radio Network Information Service (RNIS), location services, and bandwidth management services. The RNIS, when available, provides authorized MEC Apps 1436 with radio network related information, and expose appropriate up-to-date radio network information to the MEC Apps 1436. The radio network information (RNI) may include, inter alia, radio network conditions, measurement and statistics information related to the user plane, information related to UEs 1420 served by the radio node(s) associated with the MEC host 1336 (e.g., UE context and radio access bearers), changes on information related to UEs 1420 served by the radio node(s) associated with the MEC host 1336, and/or the like. The RNI may be provided at the relevant granularity (e.g., per UE 1420, per cell, per period of time).

The service consumers (e.g., MEC Apps 1436 and MEC platform 1437) may communicate with the RNIS over an RNI API 1453 to obtain contextual information from a corresponding RAN. RNI may be provided to the service consumers via an access node (e.g., (R) AN nodes 1331, 1332, or AP 1333 of FIG. 13). The RNI API 1453 may support both query and subscription (e.g., a pub/sub) based mechanisms that are used over a Representational State Transfer (RESTful) API 1453 or over a message broker of the MEC platform 1437 (not shown by FIG. 14). A MEC APP 1436 may query information on a message broker via a transport information query procedure, wherein the transport information may be pre-provisioned to the MEC App 1436 via a suitable configuration mechanism. The various messages communicated via the RNI API 1453 may be in XML, JSON, Protobuf, or some other suitable format.

The RNI may be used by MEC Apps 1436 and MEC platform 1437 to optimize the existing services and to provide new types of services that are based on up to date information on radio conditions. As an example, a MEC APP 1436 may use RNI to optimize current services such as video throughput guidance. In throughput guidance, a radio analytics MEC APP 1436 may use MEC services to provide a backend video server with a near real-time indication on the throughput estimated to be available at the radio downlink interface in a next time instant. The throughput guidance radio analytics application 1436 computes throughput guidance based on the required radio network information it obtains from a multi-access edge service running on the MEC server 1336. RNI may be also used by the MEC platform 1437 to optimize the mobility procedures required to support service continuity, such as when a certain MEC APP 1436 requests a single piece of information using a simple request-response model (e.g., using RESTful mechanisms) while other MEC Apps 1436 subscribe to multiple different notifications regarding information changes (e.g., using a pub/sub mechanism and/or message broker mechanisms).

The location services (LS), when available, may provide authorized MEC Apps 1436 with location-related information, and expose such information to the MEC Apps 1436. With location related information, the MEC platform 1437 or one or more MEC Apps 1436 perform active device location tracking, location-based service recommendations, and/or other like services. The LS supports the location retrieval mechanism, e.g., the location is reported only once for each location information request. The LS supports a location subscribe mechanism, for example, the location is able to be reported multiple times for each location request, periodically or based on specific events, such as location change. The location information may include, inter alia, the location of specific UEs 1420 currently served by the radio node(s) associated with the MEC server 1336, information about the location of all UEs 1420 currently served by the radio node(s) associated with the MEC server 1336, information about the location of a certain category of UEs 1420 currently served by the radio node(s) associated with the MEC server 1336, a list of UEs 1420 in a particular location, information about the location of all radio nodes currently associated with the MEC server 1336, and/or the like. The location information may be in the form of a geolocation, a Global Navigation Satellite Service (GNSS) coordinate, a Cell identity (ID), and/or the like. The LS is accessible through the API defined in the Open Mobile Alliance (OMA) specification "RESTful Network API for Zonal Presence" OMA-TS-REST-NetAPI-ZonalPresence-V1-0-20160308-C. The Zonal Presence service utilizes the concept of "zone", where a zone lends itself to be used to group all radio nodes that are associated to a MEC host or MEC server 1336, or a subset thereof, according to a desired deployment. In this regard, the OMA Zonal Presence API 1453 provides means for MEC Apps 1436 to retrieve information about a zone, the access points associated to the zones and the users that are connected to the access points. In addition, the OMA Zonal Presence API 1453, allows authorized application to subscribe to a notification mechanism, reporting about user activities within a zone. In various embodiments, a MEC server 1336 may access location information or zonal presence information of individual UEs 1420 using the OMA Zonal Presence API 1453 to identify the relative location or positions of the UEs 1420.

The bandwidth management services (BWMS) provides for the allocation of bandwidth (BW) to certain traffic routed to and from MEC Apps 1436, and specify static/dynamic up/down BW resources, including BW size and BW priority. MEC Apps 1436 may use the BWMS to update/receive BW information to/from the MEC platform 1437. In some embodiments, different MEC Apps 1436 running in parallel on the same MEC server 1336 may be allocated specific static, dynamic up/down BW resources, including BW size and BW priority. The BWMS includes a BW management (BWM) API 1453 to allowed registered applications to statically and/or dynamically register for specific BW allocations per session/application. The BWM API 1453 includes HTTP protocol bindings for BWM functionality using RESTful services or some other suitable API mechanism.

Referring back to FIG. 14, multi-access edge management comprises multi-access edge system level management and the multi-access edge host level management 1430. The ME management 1430 comprises the MEC platform manager 1431 and the VI manager (VIM) 1432, and handles the management of MEC-specific functionality of a particular MEC server 1336 and the applications running on it. In some implementations, some or all of the multi-access edge management components may be implemented by one or more servers located in one or more data centers, and may use virtualization infrastructure that is connected with Network Functions Virtualization (NFV) infrastructure used to virtualize core network elements, or using the same hardware as the NFV infrastructure.

The MEC platform manager 1431 is responsible for managing the life cycle of applications including informing the multi-access edge orchestrator (MEC-O) 1421 of relevant application related events. The MEC platform manager 1431 may also provide MEP element management functions 1431a to the MEC platform 1437, manage MEC App rules and requirements 1431b including service authorizations, traffic rules, DNS configuration and resolving conflicts, and manage MEC APP 1436 lifecycles (MEALC mgmt 1431c). The MEC platform manager 1431 may also receive virtualized resources fault reports and performance measurements from the VIM 1432 for further processing.

The Mm5 reference point between the MEC platform manager 1431 and the MEC platform 1437 is used to perform platform configuration, configuration of the MEPE mgmt 1431*a*, the MERR mgmt 1431*b*, the MEALC mgmt 1431*c*, management of application relocation, etc.

The VIM 1432 may be an entity that allocates, manages and releases virtualized (compute, storage and networking) resources of the VI 1438, and prepares the VI 1438 to run a software image. To do so, the VIM 1432 may communicate with the VI 1438 over the Mm7 reference point between the VIM 1432 and the VI 1438. Preparing the VI 1438 may include configuring the VI 1438, and receiving/storing the software image. When supported, the VIM 1432 may provide rapid provisioning of applications, such as described in "Openstack++ for Cloudlet Deployments", available at http://reports-archive.adm.cs.cmu.edu/anon/2015/CMU-CS-15-123.pdf. The VIM 1432 may also collect and report performance and fault information about the virtualized resources, and perform application relocation when supported. For application relocation from/to external cloud environments, the VIM 1432 may interact with an external cloud manager to perform the application relocation, for example using the mechanism described in "Adaptive VM Handoff Across Cloudlets", and/or possibly through a proxy. Furthermore, the VIM 1432 may communicate with the MEC platform manager 1431 via the Mm6 reference point, which may be used to manage virtualized resources, for example, to realize the application lifecycle management. Moreover, the VIM 1432 may communicate with the MEC-O 1421 via the Mm4 reference point, which may be used to manage virtualized resources of the MEC server 1336, and to manage application images. Managing the virtualized resources may include tracking available resource capacity, etc.

The multi-access edge system level management includes the MEC-O 1421 as a core component, which has an overview of the complete MEC system 1400. The MEC-O 1421 may maintain an overall view of the MEC system 1400 based on deployed multi-access edge hosts 1336, available resources, available MEC services 1437*a*, and topology. The Mm3 reference point between the MEC-O 1421 and the MEC platform manager 1431 may be used for the management of the application lifecycle, application rules and requirements and keeping track of available MEC services 1437*a*. The MEC-O 1421 may communicate with the user application lifecycle management proxy (UALMP) 1425 via the Mm9 reference point in order to manage MEC Apps 1436 requested by UE application 1405.

The MEC-O 1421 may also be responsible for on-boarding of application packages, including checking the integrity and authenticity of the packages, validating application rules and requirements and if necessary adjusting them to comply with operator policies, keeping a record of on-boarded packages, and preparing the VIM(s) 1402 to handle the applications. The MEC-O 1421 may select appropriate MEC host(s) 1401 for application instantiation based on constraints, such as latency, available resources, and available services. The MEC-O 1421 may also trigger application instantiation and termination, as well as trigger application relocation as needed and when supported.

The Operations Support System (OSS) 1422 refers to the OSS of an operator that receives requests via the Customer Facing Service (CFS) portal 1406 (and over the Mx1 reference point) and from UE applications 1405 for instantiation or termination of MEC Apps 1436, and decides on the granting of these requests. The CFS portal 1406 (and the Mx1 interface) may be used by third-parties to request the MEC system 1400 to run applications 1406 in the MEC system 1400. Granted requests may be forwarded to the MEC-O 1421 for further processing. When supported, the OSS 1422 also receives requests from UE applications 1405 for relocating applications between external clouds and the MEC system 1400. The Mm2 reference point between the OSS 1422 and the MEC platform manager 1431 is used for the MEC platform manager 1431 configuration, fault and performance management. The Mm1 reference point between the MEC-O 1421 and the OSS 1422 is used for triggering the instantiation and the termination of multi-access edge applications 1436 in the MEC system 1400.

The UE app(s) 1405 (also referred to as "device applications" or the like) is one or more applications running in a device, computing system, etc. (e.g., UE 1420), that has the capability to interact with the MEC system 1400 via the user application lifecycle management proxy 1425. The UE app(s) 1405 may be, include, or interact with one or more client applications, which in the context of MEC, is application software running on a device, computing system, etc. that utilizes functionality provided by one or more specific MEC application(s) 1436. The user application lifecycle management proxy ("user app LCM proxy") 1425 may authorize requests from UE applications 1405 in the UE and interacts with the OSS 1422 and the MEC-O 1421 for further processing of these requests. The term "lifecycle management," in the context of MEC, refers to a set of functions required to manage the instantiation, maintenance and termination of a MEC application 1436 instance. The user app LCM proxy 1425 may interact with the OSS 1422 via the Mm8 reference point, and is used to handle UE applications 1405 requests for running applications in the MEC system 1400. A user application 1405 may be an MEC APP 1436 that is instantiated in the MEC system 1400 in response to a request of a user via an application running in the UE 1420 (e.g., UE application 1405). The user app LCM proxy 1425 allows UE applications 1405 to request on-boarding, instantiation, termination of user applications and when supported, relocation of user applications in and out of the MEC system 1400. It also allows informing the UE applications 1405 about the state of the user applications 1405. The user app LCM proxy 1425 is only accessible from within the mobile network, and may only be available when supported by the MEC system 1400. A UE application 1405 may use the Mx2 reference point between the user app LCM proxy 1425 and the UE application 1405 to request the MEC system 1400 to run an application in the MEC system 1400, or to move an application in or out of the MEC system 1400. The Mx2 reference point may only be accessible within the mobile network and may only be available when supported by the multi-access edge system.

In order to run an MEC App 1436 in the MEC system 1400, the MEC-O 1421 receives requests triggered by the OSS 1422, a third-party, or a UE application 1405. In response to receipt of such requests, the MEC-O 1421 selects a MEC server 1336 to host the MEC App 1436 for computational offloading. These requests may include information about the application to be run, and possibly other information, such as the location where the application needs to be active, other application rules and requirements, as well as the location of the application image if it is not yet on-boarded in the MEC system 1400.

In various embodiments, the MEC-O 1421 selects one or more MEC servers 1336 for computational intensive tasks. The selected one or more MEC servers 1336 may offload computational tasks of a UE application 1405 based on various operational parameters, such as network capabilities and conditions, computational capabilities and conditions, application requirements, and/or other like operational parameters. The application requirements may be rules and requirements associated to/with one or more MEC Apps 1436, such as deployment model of the application (e.g., whether it is one instance per user, one instance per host, one instance on each host, etc.); required virtualized resources (e.g., compute, storage, network resources, including specific hardware support); latency requirements (e.g., maximum latency, how strict the latency constraints are, latency fairness between users); requirements on location; multi-access edge services that are required and/or useful for the MEC Apps 1436 to be able to run; multi-access edge services that the MEC Apps 1436 can take advantage of, if available; connectivity or mobility support/requirements (e.g., application state relocation, application instance relocation); required multi-access edge features, such as VM relocation support or UE identity; required network connectivity (e.g., connectivity to applications within the multi-access edge system, connectivity to local networks, or to the Internet); information on the operator's MEC system deployment or mobile network deployment (e.g., topology, cost); requirements on access to user traffic; requirements on persistent storage; traffic rules 1437*b*; DNS rules 1437*c*; etc.

The MEC-O 1421 considers the requirements and information listed above and information on the resources currently available in the MEC system 1400 to select one or several MEC servers 1336 within the MEC system 1400 to host MEC Apps 1436 and/or for computational offloading. After one or more MEC servers 1336 are selected, the MEC-O 1421 requests the selected MEC host(s) 1336 to instantiate the application(s) or application tasks. The actual algorithm used to select the MEC servers 1336 depends on the implementation, configuration, and/or operator deployment. In various embodiments, the selection algorithm may be based on the task offloading embodiments discussed herein, for example, by taking into account network, computational, and energy consumption requirements for performing tasks of application tasks, as well as network functionalities, processing, and offloading coding/encodings, or differentiating traffic between various RATs. Under certain circumstances (e.g., UE mobility events resulting in increased latency, load balancing decisions, etc.), and if supported, the MEC-O 1421 may decide to select one or more new MEC servers 1336 to act as a master node, and initiates the transfer of an application instance or application-related state information from the one or more source MEC servers 1336 to the one or more target MEC servers 1336.

As mentioned previously, the MEC system architecture 1400 provides support for applications. In the context of FIG. 14, the UE app 1405 is an application instance running on a UE 1420, which may subscribe to LPP services/notifications from the LPPS 1500 and/or request and receive LPP services to/from the system. Additionally, the UE app 1405 is an application instance running on a UE 1420, which may be used by the LPPS 1500 to collect real-time and spatio-historical data from the UE 1420 (or from components therein). These application instances obtain or otherwise interact with a LPP service via MEC LPP API 1451*a* and 1451*b* (collectively referred to as "MEC LPP API 1451"). MEC hosts 1336 may be co-located with edge infrastructure (e.g., NANs 1331, 1332, and 1333 of FIG. 13) and may communicate with each other through the Mp3 interface.

In embodiments, LPP Information Services (LPP-IS) 1452-1 and 1452-2 (collectively referred to as "MEC LPP-IS 1452") permits information exposure pertinent to the support of link quality/performance prediction use cases to MEC app 1436 instances. The LPP-IS 1452 may be produced by the MEC platform 1437 or by the MEC Apps 1436. In the framework of LPPS 1500, the UE 1420 is hosting an LPP client application, and is connected to a certain MEC host 1336 and a related MEC APP 1436 operating within that MEC host 1336. In presence of multiple MEC hosts 1336, the LPP-IS 1452 permits exposure of LPP information between MEC Apps 1436 running on different MEC hosts 1336, and exposure of LPP information with remote systems/services via the LPP API 1451. The remote systems/services may be remote application server instances (e.g., server(s) 1350 of FIG. 13), which can be located outside the Edge system 1335 (e.g., private clouds owned by the operator or by the OEM such as cloud 1344) and may access the LPP notifications via the LPP API 1451.

LPP-IS 1452 also permits a single network operator to offer a LPP service(s) over a region that may span different countries and involve multiple networks, MEC systems 1400, and MEC app 1436 providers. For that purpose, the MEC LPP-IS 1452 includes the following functionalities.

In some aspects, the MEC platform 1437 can include a MEC LPP API 1451 and provide MEC LPP-IS 1452, which can include the following functionalities: (a) gathering of relevant UE information from an access network for purposes of performing UE authorization for LPP services (e.g., obtaining a list of LPP authorized UEs 1420, obtaining relevant information about the authorization based on UE subscription information/data, and obtaining UE configuration parameters such as a common set of radio link configuration parameters and/or UE capabilities, if available); (b) gathering of relevant radio link and/or backhaul link information from the access network for determining and providing LPPs to the UEs 1420; (c) exposure of the information obtained in (a)-(b) to MEC apps 1436 in the same MEC host 1336 or MEC apps 1436 in other MEC hosts 1336 via the MEC LPP API 1451; (d) for core network based implementations, enablement of MEC apps 1436 to communicate securely with the LPP-related core network functions (e.g., enabling communication between the MEC host and an "LPP control function" in the core network); (e) enablement of MEC apps 1436 in different MEC systems 1400 to communicate securely with each other; and (d) gathering and processing information available in other MEC hosts 1336 via one or more other MEC APIs 1453 (e.g., gathering and processing information obtained from the RNI API, LS API, BWM API, a WLAN API, and/or other APIs that may be implemented within the MEC platform 1437 such as those discussed herein) in order to predict radio network congestion, BW measurements/resources, UE 1420 location(s)/mobility, and provide suitable notifications (e.g., LPP notifications) to the UE 1420.

From that perspective, the LPP-IS 1452 is relevant to Mp1 and Mp3 reference points in the MEC architecture 1400. In particular, the relevant information is exposed to MEC apps 1436 via the Mp1 reference point, and the Mp3 reference point may enable the possibility to transfer this information between different MEC platforms 1437. The MEC LPP API 1451 provides information to MEC apps 1436 in a standardized way, which provides interoperability in multi-vendor scenarios. Nevertheless, MEC apps 1436 may communicate in a direct way (e.g., without the use of MEC platform 1437). Inter-system communication may be realized between MEC Orchestrators 1421. As an alternative, or, in addition to that, possible Mp3 enhancements (or new reference points between MEC systems 1400) may be defined.

In some aspects, the MEC host 1336-2 in FIG. 14 can also implement a MEC LPP API 1451-2, which can provide an interface to one or more of the apps instantiated within MEC host 5, such as MEC APP 1436-2b. In this regard, MEC host 1336-1 and MEC host 1336-2 can communicate with each other via the Mp3 interface as well as the MEC LPP APIs 1451-1, 1451-2. Additionally, one or more of the MEC apps 1436-1 instantiated within MEC host 1336-1 can communicate with one or more of the MEC apps 1436-2 instantiated within MEC host 1336-2 via the MEC LPP APIs 1451-1, 1451-2 as well as the Mp3 interface between the MEC host 1336-1 and MEC host 1336-2.

In some aspects, each of the MEC hosts 1336 can be owned/managed by a different mobile services operator (while it can be operated directly by a MEC vendor or a third party). In some aspects, MEC apps 1436 instantiated on MEC host 1336-1 and MEC host 1336-2 can be used to provide LPP-related services, and can be operated by the mobile services operator, by a MEC vendor, or by a third party (e.g., OEM, or OEM supplier, or system integrator).

In some aspects, the MEC LPP APIs 1451 can be provided as a general middleware service, providing information gathered from UEs 1420 and other network elements (e.g., NANs 1331, 1332, and/or 1333 of FIG. 13), and exposed as a service within the MEC hosts 1336 (e.g., as a RESTful API) for the higher layers (e.g., the MEC apps 1436 instantiated within the MEC hosts 1336). In some aspects, the MEC LPP APIs 1451 can be configured to gather information and data from various sensors. In this regard, the deployment of the MEC LPP APIs 1451 is ensuring continuity of the service across different mobile networks, for the same OEM (e.g., UE manufacturer) and/or mobile network operator (MNO).

In some embodiments, MEC apps 1436 can be configured to host and/or store LPP-related data and/or configuration parameters, such as collected measurement data, UE operational/performance data (e.g., application usage statistics, processor and/or memory utilization, and/or other like data such as those disused herein), UE capability information, and/or the like. The availability of this LPP-related data and/or configuration parameters also in absence of network coverage is ensured by the usage of an Mp3 interface (or another type of interface) between the MEC hosts 1336.

In some embodiments, MEC apps 1436 can be configured to host one or more prediction layers as discussed herein, such as a data collection layer (or UE feedback layer), cell load layer (or cell model layer), an intra-cell layer, a cell mobility layer (or cell transition layer), a geoposition layer (or geographical position layer), a network topology layer, and/or other like prediction layers. The various prediction layers may provide respective predicted performance metrics in absence of network coverage by the usage of an Mp3 interface (or another type of interface) between the MEC hosts 1336.

In the aforementioned embodiments, MEC app 1436-1 can be configured to connect to MEC host 1336-2 (through MEC LPP API 1451-2 in MEC host 2), and MEC app 1436-2 can be configured to connect to MEC host 1336-1 (through V2X MEC API 1451-1 in MEC host 1). In case of a multi-operator architecture, multiple MEC hosts 1336 can be configured to communicate with each other via the MEC LPP APIs 1451 and synchronize in order to transfer the relevant LPP-related data (e.g., real-time data and/or spatio-historical data) and/or predicted performance metrics so that they can be available across the multi-operator architecture in absence of network coverage e or during network infrastructure/equipment failures. In this way, the LPP service (e.g., LPPS 1500 of FIG. 15) can have access to the LPP-related data and/or the predicted performance metrics even when the UEs 1420 are not in network coverage or when failures or overload situations occur at different parts of the network.

In some embodiments, one or more MEC apps 1436 within a MEC host 1336 can be instantiated to perform functionalities of an LPP engine (e.g., LPP layer 1502 of FIG. 15), which may provide the LPP-IS 1452. Additionally, MEC hosts 1336 can use MEC LPP APIs 1451 to perform various LPP-IS 1452 functions. In particular, these one or more MEC apps 1436 can be instantiated within a MEC host 1336 to perform various aspects of the LPP embodiments discussed herein, as well as the following functionalities: obtaining LPP subscription information for UE 1420; determining whether the UE 1420 is authorized to obtain LPP notifications, which may or may not be in response to a request for LPP services; communicating LPP-related data and/or configuration parameters; and so forth.

Link Performance Prediction Embodiments

Figure 15:
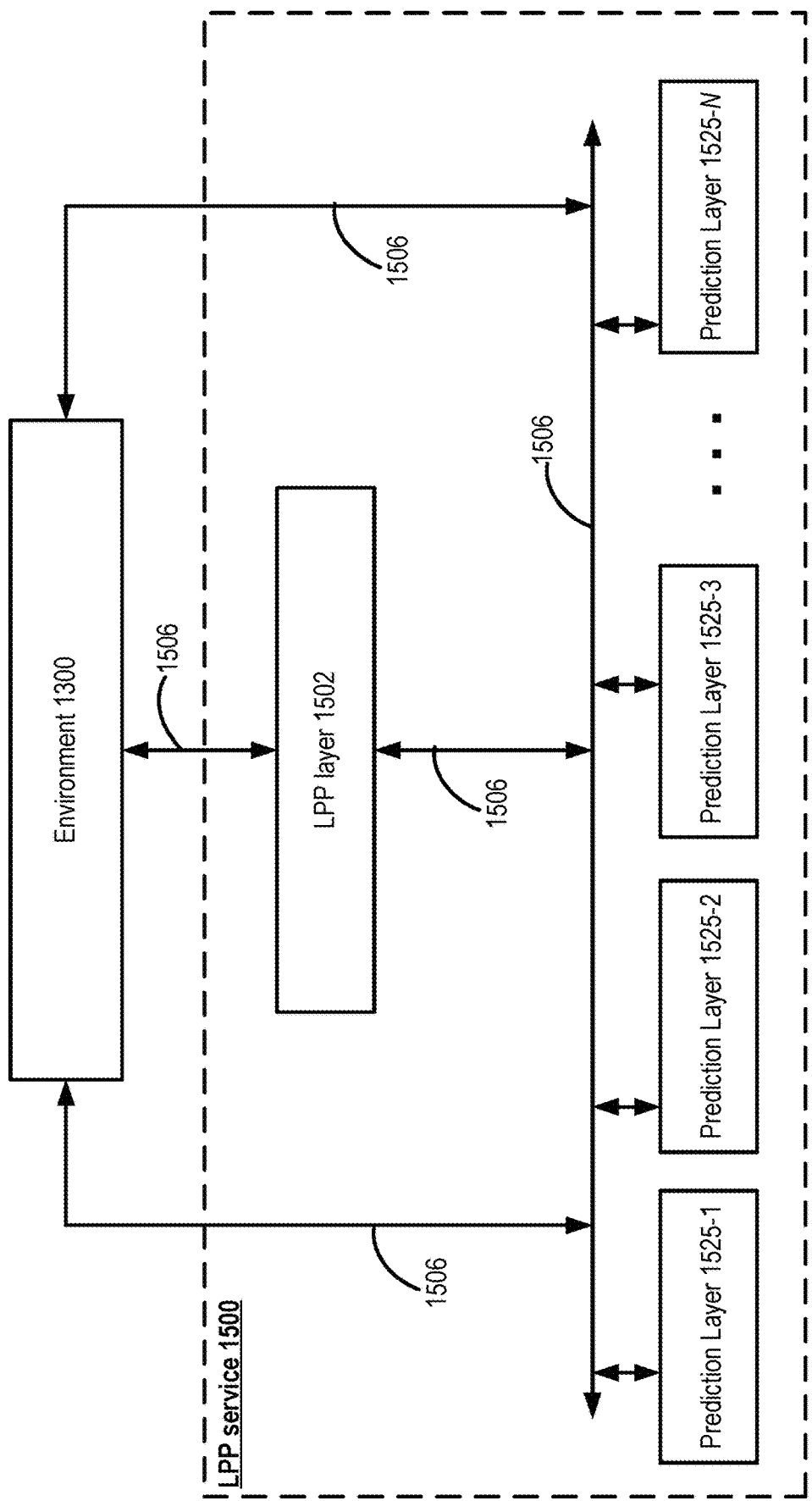
FIG. 15 illustrates example logical components and interaction points of an LPP service (LPPS) in accordance with various embodiments.

Referring now to FIG. 15, wherein example logical components and interaction points of an LPP service (LPPS) 1500, in accordance with various embodiments, is illustrated. As shown, for the illustrated embodiments, the LPPS 1500 includes an LPP layer 1502 and a plurality of prediction layers 1525-1 to 1525-N (collectively referred to as "prediction layers 1525" or the like). In the illustrated embodiment, the components of the LPPS 1500 interact with one or more elements in the edge computing environment 1300 discussed previously with respect to FIG. 13.

The LPPS 1500 predicts how network performance (e.g., performance of environment 1300) changes over time with a relatively high degree of confidence. For example, the LPPS 1500 is capable of predicting link performance in time and space, which allows applications, UEs 1311, 1321, and/or network infrastructure able to shift delay tolerant traffic in time and/or space in order to smooth out peak demand and improve overall network resource utilization. The ability to forecast and communicate link performance predictions can also help applications, UEs 1311, 1321, and/or network infrastructure modify their behavior to account for congested or otherwise sub-optimal network conditions.

In embodiments, the LPPS 1500 uses spatial and temporal (spatio-temporal) historical data and/or real-time data to predict link quality. The spatio-temporal historical data is data related to the performance experienced over multiple locations (e.g., space) and at multiple time instances (e.g., temporal). The spatio-temporal historical data provides ability to locate performance at specific location and time. Real-time data includes data/information such as live traffic status (e.g., vehicles on a given roadway or the like), abnormal events (e.g., natural disasters and the like), network load (e.g., resource utilization of NANs 1331, 1332, 1333, edge compute nodes 1336, and the like), radio conditions (e.g., amount of occupied radio resources, amount of signaling taking place over the radio links 1303, 1305, 1307, interference measurements, etc.), UE 1311, 1321 location (e.g., geographic position within a given cell), UE 1311, 1321 motion/mobility (e.g., speed and direction of travel within a given cell or between cells), and/or routing information (e.g., number and types of hops between source and destination nodes or the like), if known. The LPPS 1500 uses the historical and real-time data collected across a wide range of mobile devices (e.g., UEs 1311, 1321) and network elements (e.g., NANs 1331, 1332, and 1333, edge compute nodes 1336, core network elements in CN 1342, etc.), allowing the LPPS 1500 to build a view of the network performance that users and services will likely experience over time. Consumers (e.g., UEs 1311, 1321 and NANs 1331, 1332, 1333, application/service providers, etc.) can subscribe to predictions that have direct relevance to network performance and/or their service performance. The LPPS 1500 responds to the consumer indicating any significant changes in performance over time.

Each of the prediction layers 1525 provide functionality independent of functionality provided by other layers 1525, as well as different functionality of the LPP layer 1502. For example, the LPP layer 1502 may implement a data fusion engine (also referred to as an "LPP engine") (discussed in more detail infra), the prediction layer 1525-1 may implement one or more first ML models/algorithms to generate a first type of predicted performance metrics, the prediction layer 1525-2 may implement one or more second ML models/algorithms to generate a second type of predicted performance metrics, and so forth to the prediction layer 1525-N, which may implement one or more Nth ML models/algorithms to generate an Nth type of predicted performance metrics (where N is a number).

In various embodiments, each prediction layer 1525 runs one or more ML models to determine respective predicted performance metrics, and provides their respective predicted performance metrics to the LPP layer 1502. Machine learning algorithms build mathematical models, referred to as a "machine learning model" or simply "model", based on sample data, known as "training data", in order to make predictions or decisions without being explicitly programmed to perform such tasks. Generally, an ML algorithm is a computer program that learns from experience with respect to some task and/or some performance measure, and an ML model is an object or data structure created after an ML algorithm is trained with one or more training datasets. After training, the ML model may be used to make predictions on new datasets. Although the term "ML algorithm" refers to different concepts than the term "ML model," these terms as discussed herein may be used interchangeably for the purposes of the present disclosure. In embodiments, specific ML algorithms, or combinations of ML algorithms, are used at individual prediction layers 1525 to determine respective predicted performance metrics, and one or more layers 1525 may use different ML algorithms (or combinations of ML algorithms) than those used by other prediction layers 1525.

In some embodiments, at least one of the layers 1525 is responsible for collecting data from one or more UEs 1311/1321 and/or NANs 1331-1333 in environment 1300, which may be processed by that layer 1525 and provided to other layers 1525 for determining their respective predicted performance metrics. In such embodiments, the layers 1525 that are responsible for data collection may obtain data from applications, components, or the like at the data sources (e.g., the UEs 1311, 1321, NANs 1331-1333, etc.) that collect data from system software (e.g., operating systems, device drivers, firmware, utility applications, etc.) and/or various user/client applications operating on those devices via a suitable API, middleware, software glue, proxy applications, trusted applications, etc., and provide the collected data to the data collection layer(s) 1525. In some embodiments, these applications, components, etc., may be custom plug-ins configured to interact with, and collected data/metrics from the system software, other applications, etc.

The LPP layer 1502 obtains the predicted performance metrics from the prediction layers 1525 and fuses the predicted performance metrics together to obtain an LPP for an LPPS consumer (not shown by FIG. 15). The LPP layer 1502 may include any suitable technology to fuse the predicted performance metrics provided by the prediction layers 1525. Data fusion is a process of integrating and/or combining data collected from multiple sources at different spatial and temporal scales in order to make inferences about that data. In some embodiments, these "inferences" may be the link performance predictions, while in other embodiments, the LPP layer 1502 implements suitable ML model(s)/algorithm(s) to generate the link performance predictions based on the inferences.

For example, the LPP layer 1502 may be trained during a training phase using predetermined data inputs to establish model parameters (e.g., initial state distribution) and to associate at least some of the states with inferences having meaningful significance. The established model parameters are stored in memory (e.g., memory circuitry 1620 of FIG. 16 or the like). Then during an operational phase, the LPP layer 1502 performs data fusion on real (live) data from the prediction layers 1525, and in order to increase the accuracy of the model, continually modifies the established model parameters as necessary based on a comparison between a prediction and what is actually received.

In various embodiments, the LPP layer 1502 (or the LPP engine) is configured to perform Multi-Cell Multi-Layer (MCML) data fusion techniques. In such embodiments, the LPP layer 1502 takes data from one or more prediction layers 1525 and combines that data with data from one or more other prediction layers 1525 to derive the link performance prediction for corresponding LPPS consumers. In one MCML example, the LPP layer 1502 may take an output from a cell transition prediction layer, which is in the form of expected cells a UE 1311, 1321 will visit, and pairs that output with outputs provided by a cell load prediction layer to predict a performance of individual cells based on mobility of the UE 1311, 1321. In a second MCML example, network data and/or parameters (e.g., a mobile network associated with CN 1342 of FIG. 13), data from traffic and/or mobility patterns, subscriber information, and data from GPS are fed in to different prediction layers 1525 for training and prediction of performance metrics from those prediction layers 1525 are fused to predict final network performance at a particular time/date. As mentioned previously, each prediction layer 1525 can be trained with data from different sources (network, traffic, GPS, subscriber information).

In various embodiments, MCML data fusion accounts for different operational states, operational contexts, and/or mobility states. For example, as discussed in more detail infra, a cell transition prediction layer may be used to predict the cells that a UE 1311, 1321 will visit at particular time instances based on a current cell in which the UE 1311, 1321 is camping, a previous cell visited by the UE 1311, 1321, and travel direction and velocity measurements. When the UE 1311, 1321 is stationary (not moving), the link performance prediction is based on a current cell's behavior, and the LPP layer 1502 fuses the current cell's characteristics and cell load, including real-time and predicted future behavior(s) and/or load(s), to obtain the LPP. When the UE 1311, 1321 is moving in a relatively dense area (e.g., where cell sizes are relatively small, such as in a city), and the predicted cell behaviors and predicted cell load(s) of each cell predicted to be visited by the UE 1311, 1321 is combined (fused) together for the LPP. When the UE 1311, 1321 is moving in a relatively sparse area (e.g., where cell sizes are relatively large, such as in a rural area), the link performance prediction is based on intra-cell behavior(s) (e.g., predicted signal strength, signal quality, power changes, etc., within individual cells) for each cell predicted to be visited by the UE 1311, 1321, and the intra-cell behavior(s) of each predicted cell is combined (fused) with respective predicted cell behaviors and respective predicted cell load(s). When the UE 1311, 1321 is moving using a navigation application, the cell transition prediction layer predicts the cell transitions using a cell movement/mobility pattern determined from obtained route/journey data, navigation settings, and/or other information from the navigation application, and each cell predicted to be visited by the UE 1311, 1321 is combined (fused) with respective predicted cell behaviors and respective predicted cell load(s). In these embodiments, if network topology information and/or backhaul link performance predictions are available, then the predicted cell behavior(s) and/or load(s) may be combined (fused) with these additional network topology predictions and/or backhaul link predictions.

In some embodiments, MCML data fusion involves the LPP layer 1502 (or LPP engine) requesting, from the cell transition prediction layer for a UE 1311, 1321, a prediction of various cell that the UE 1311, 1321 may visit given a current cell. These predictions may be based on spatio-temporal history data associated with the UE 1311, 1321 (e.g., mobility data) and/or the current cell. The cell transition prediction layer returns data including the expected future cells the UE 1311, 1321 may visit, the expected probability of visiting each cell in a given region, a predicted time interval (or amount of time) for the UE 1311, 1321 to travel to each cell, and an predicted amount time that the UE 1311, 1321 will remain in each cell. Then, the LPP layer 1502 requests predicted cell/link characteristics and/or behaviors for each cell indicated by the cell transition prediction layer at the time interval the UE 1311, 1321 is expected to enter each cell and the amount of time the UE 1311, 1321 is predicted to be in each cell. The LPP layer 1502 combines (fuses) the returned predicted cell/link characteristics and/or behaviors for each cell to determine a predicted link performance (e.g., the LPP) given the current and future cell load as well as expected deviation(s). The LPP layer 1502 now knows the probability that the UE 1311, 1321 will enter or travel through a particular cell, the predicted amount of time the UE 1311, 1321 will take to enter the particular cell, the amount of predicted time to be spent in the particular cell, as well as the LPP for each cell at each time instance. The LPP layer 1502 then looks at a time window from a current time to some future time instance (e.g. 30 seconds, 1 minutes, 2 minutes, etc., from the current time depending on how steady the link is), and breaks this time window into time intervals (e.g. 1 second). The time interval for the UE 1311, 1321 to reach respective cells is added to the time window with respective characteristics/loads, and the probability that the UE 1311, 1321 will visit the respective cells. Then, the LPP layer 1502 runs through the time window, and filters out probabilities that are deemed to be too low for consideration. As an example, changes detected to be larger than a certain level (e.g., 5%, 10% deviation, etc.) may be filtered out. The determined LPP for each remaining portions of the time window may be sent to the UE 1311, 1321 or other LPPS consumer, taking into account the amount of delay and predicted location of the UE 1311, 1321 (or other LPPS consumer).

Additionally or alternatively, one or more other data fusion techniques may be used to combine or fuse the predicted performance metrics. Examples of these known data fusion techniques may include, but are not limited to, data association techniques (e.g., Nearest Neighbors, K-Means Probabilistic Data Association (PDA) and/or PDA Filter (PDAF), Principle Component Analysis (PCA), Joint Probabilistic Data Association (JPDA), Distributed JPDA (JPDA-D), Multiple Hypothesis Test (MHT), Distributed MHT (MHT-D), graphical modeling, and/or the like), state estimation techniques (e.g., maximum likelihood, maximum posterior, Kalman filter, distributed Kalman filter, particle filter, distributed particle filter, covariance intersection, covariance union, Optimal Theory, Regularization, Uncertainty Ellipsoids, and/or the like), decision fusion techniques (e.g., Bayesian methods (e.g., evidence theory, robust statistics, recursive operators, etc.), Dempster-Shafer Inference, Abductive Reasoning, Semantic methods, and/or the like), intelligent aggregation techniques (e.g., one or more ML techniques such as neural networks (including any neural network discussed herein), genetic algorithms, fuzzy logic, etc.), and/or any other suitable data fusion techniques.

The link performance predictions are used to generate the LPP notifications that the LPPS 1500 provides to LPPS consumers such as applications, UEs 1311/1321, and/or NANs 1331-1333, which allow the LPPS consumers to tailor their operations accordingly. The LPP notifications, in one embodiment, are conceptually similar to traffic notifications provided by a navigation application or vehicular driving applications. While the traffic notifications provide up-to-date information about current and forecasted traffic conditions, the LPP notifications provide information about current and forecasted link quality or performance.

In some embodiments, the LPPS 1500 may provide intelligent network management services to network operators. For example, network operators may use the LPP notifications to autonomously manage transmitter power, antenna direction, angle, and tilt; and other parameters of the NANs 1331, 1332, 1333. Additionally or alternatively, the link performance predictions in the LPP notifications may be fed into for Self-Organizing Network (SON) functions in LTE or 5G/NR implementations. In some embodiments, the LPPS 1500 may be used for network degradation control, which entails identifying instances of poor performance and troubleshooting. (e.g., identifying when equipment should be repaired or replaced).

In some embodiments, the LPPS 1500 may be used for efficient small cell backhaul planning. For example, the link performance predictions in the LPP notifications may be used to identify locations to deploy small cells (e.g., RAN nodes 1332, AP 1333, or the like) to enhance coverage and/or capacity while taking into account the associated backhaul and power requirements for such deployments. Additionally or alternatively, in some embodiments, the LPPS 1500 may be used for backhaul link resource allocation. In these embodiments, the link performance predictions may indicate the load or usage of different backhaul links at different time periods on different days, and network operators can reduce operating costs by powering down backhaul links which are expected to require low usage at particular times before powering them back up at predicted peak usage times.

By providing the LPP notifications to users, network operators, and service providers, network operators and service providers may tailor their applications/services to utilize network resources in a more efficient manner than using conventional technologies. As an example, individual NANs 1331, 1332, 1333 may schedule background traffic (e.g., paging, control signaling, heartbeat signaling, and/or other like traffic/signaling that takes place even when there is no user or application interaction with a UE 1311, 1321) for transmission during peaks in network performance. In this example, the peaks in network performance may be based on a predicted time and/or mobility when a UE 1311, 1321 will be proximate to a serving NAN 1331, 1332, 1333 or a predicted period during which the network should have sufficient capacity headroom.

The LPP notifications may also be used by network operators and service providers to improve Quality of Service (QOS) and/or Quality of Experience (QoE), which are traditionally associated with network performance metrics. Static network performance metrics only provide a partial, snapshot view of the QoS and/or QoE. Using the LPP notifications, network operators and service providers can adjust traffic routes, mode of operation, and/or other parameters to optimize QoS and QoE since they will have advance warning regarding any significant changes in expected network performance.

The LPPS 1500 itself may be an abstraction layer between service providers (e.g., operators/owners of server(s) 1350 of FIG. 13) and the underlying mobile access network (e.g., an owner/operator of CN 1342 and/or some or all of the NANs 1331, 1332) giving an abstracted view of the access network link quality, which allows service providers and/or application developers to make proactive decisions to improve QoS/QoE.

In a first example, a service provider is a content streaming service and/or platform that uses CDN edge compute nodes 1330 to stream content to UEs 1321. In this example, the service provider uses the LPP notifications to adapt streaming buffers operated by the CDN edge compute nodes 1330 to cover for poor coverage areas (e.g., coverage holes) that will likely be encountered by travelling UEs 1321. Using the LPP notifications from the LPPS 1500, the CDN edge compute nodes 1330 may pre-fetch and stream required content (e.g., for storage in a local buffer at the UEs 1321) prior to a UE 1321 entering or travelling through a poor coverage area (or coverage hole). Additionally or alternatively, content may be pre-fetched an loaded to CDN edge compute nodes 1330 along a predicted travel path/route of a UE 1321 (e.g., closer to the UE's 1321 anticipated point of consumption), and the amount of content streamed to the UE 1321 at different points along the predicted path/route may be based on predicted network performance at those different points.

In a second example, a service provider provides over-the-top (OTT) real-time services including, for example, television, messaging (e.g., instant messaging, online chats, etc.), and voice calling. In this example, the service provider uses the LPP notifications to provide advance warnings to users indicating when an OTT connection will likely be lost, and how long the connection may take to be reconnected.

In a third example, a service provider provides interactive map and navigation services, which provides to UEs 1321*a* turn-by-turn directions for a selected route. In this example, the service provider may use the LPP notifications to optimize the travel routes based on physical traffic (e.g., volume of vehicles travelling in a certain road or highway) and/or predicted network connectivity, which may be useful for semi-autonomous or fully-autonomous vehicle systems. Furthermore, these optimizations may be useful in industrial contexts, such as in "smart factories" or manufacturing plants, where mobile IoT devices 1311 can use LPP notifications for route optimization purposes.

In a fourth example, a mobile network operator (e.g., an owner/operator of CN 1342 and/or some or all of the NANs 1331, 1332) uses to guarantee a certain level of network performance (e.g., Service Level Guarantees) for enterprise-level customers. In this example, the mobile network operator may use the LPP notifications and/or the LPPS 1500 to quantify their network performance at varying levels of granularities showing their customers that they can provide a consistent high-quality QoS/QoE.

In some embodiments, the layers 1525/1502 may communicate with one another through one or more connectors 1506. The connectors 1506 may be software connectors that connect the various layers 1502/1525 of the LPPS 1500 to one another so each layer 1502/1525 does not need to know the underlying details of other layers 1502/1525. The connectors 1506 facilitate message passing/routing between individual layers 1502/1525, which may include encapsulating data from one layer 1502/1525 for consumption by an intended destination layer 1502/1525 or components thereof. As an example, the connectors 1506 may be an exogenous connector, which coordinates and controls a totality of interactions/communications of the layers 1502/1525 where the connectors 1506 perform the method or procedure calls on behalf of a requesting/calling layer 1502/1525. Additionally or alternatively, the connectors 1506 may be middleware or "software glue," which connects two or more separate components by translating or adapting instructions/commands obtained from one layer 1502/1525 into instructions/commands that can be understood by another layer 1502/1525. In these ways, individual layers 1525/1502 may be replaced with new/different layers 1525/1502 without requiring each remaining layer 1525/1502 to be updated to communicate with the new/different layers 1525/1502. Therefore, the LPPS 1500 may provide relatively easy abstraction since each layer 1525/1502 is loosely coupled from one another. Additionally, in some embodiments (e.g., where one or more of the layers 1525 are operated by different edge servers 1330), the connectors 1506 may operate on top of one or more communication protocols, such as those discussed herein.

In some embodiments, the LPPS 1500 may be implemented as a centralized service wherein the various prediction layers 1525 and/or the LPP layer 1502 are located in one or more servers in one or more server farms or data centers (e.g., individual servers 1350 of FIG. 13). In other embodiments, the LPPS 1500 may be implemented as an edge computing service wherein the various prediction layers 1525 and/or the LPP layer 1502 are located in one or more edge servers 1336 deployed at the edge of a network (e.g., CN 1342, cloud 1344, or the like). In one example implementation, the plurality of prediction layers 1525 and the LPP layer 1502 are operated by the cloud 1344 of FIG. 13, such as by individual cloud compute nodes in the cloud 1344. In another example implementation, each of the prediction layers 1525 are operated by individual edge compute nodes 1336, and the LPP layer 1502 is operated by the cloud 1344. In another example implementation, each of the prediction layers 1525 are distributed across multiple edge compute nodes 1336. In another example implementation, each edge compute node 1336 operates a respective LPPS 1500. In any of the aforementioned implementations, each prediction layer 1525 and the LPP layer 1502 may be operated in respective VMs and/or isolated user-space instances (e.g., Docker® containers, Kubernetes™ provided by the Cloud Native Computing Foundation™, Linux Containers (LXC), etc.) in one or more cloud servers and/or edge compute nodes 1336. Other implementations are possible in other embodiments.

Computing Devices, Systems, and Equipment

Figure 16:
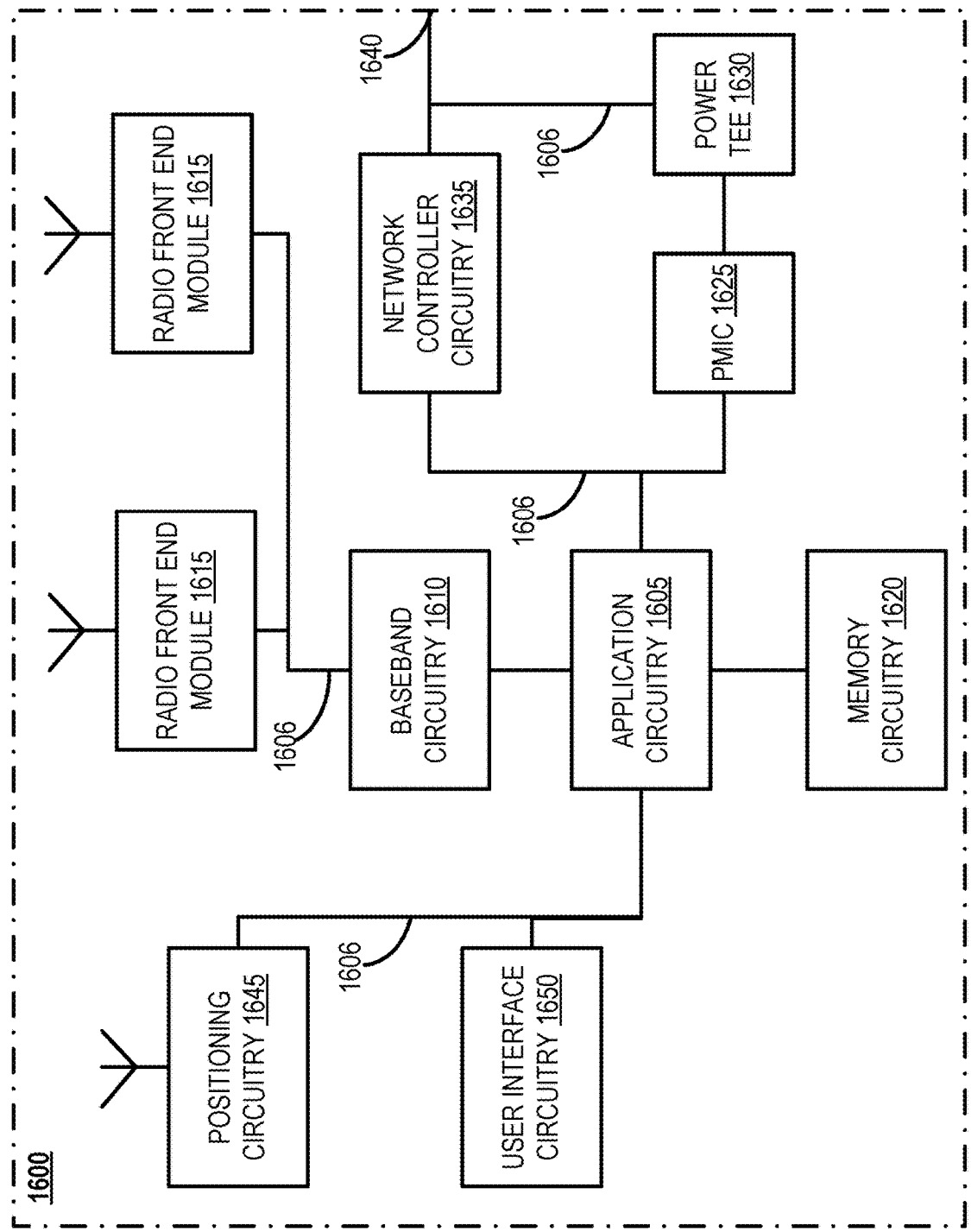
FIG. 16 illustrates an example of infrastructure equipment in accordance with various embodiments.

FIG. 16 illustrates an example of infrastructure equipment 1600 in accordance with various embodiments. The infrastructure equipment 1600 (or "system 1600") may be implemented as a base station, radio head, access network node (e.g., the edge nodes 1330 shown of FIG. 13), edge compute nodes 1336, server(s) 1350, and/or any other element/device discussed herein. In other examples, the system 1600 could be implemented in or by an intermediate node 1320 or endpoint 1310.

The system 1600 includes application circuitry 1605, baseband circuitry 1610, one or more radio front end modules (RFEMs) 1615, memory circuitry 1620, power management integrated circuitry (PMIC) 1625, power tee circuitry 1630, network controller circuitry 1635, network interface connector 1640, positioning circuitry 1645, and user interface 1650. In some embodiments, the device 1600 may include additional elements such as, for example, memory/storage, display, camera, sensor, or IO interface. In other embodiments, the components described below may be included in more than one device. For example, said circuitries may be separately included in more than one device for CRAN, CR, vBBU, or other like implementations.

Application circuitry 1605 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose IO, memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1605 may be coupled with or may include memory/storage elements and may be configured to execute instructions stored in the memory/storage to enable various applications or operating systems to run on the system 1600. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1605 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSPs), one or more FPGAs, one or more programmable logic devices (PLDs), one or more ASICs, one or more microprocessors or controllers, or any suitable combination thereof. In some embodiments, the application circuitry 1605 may comprise, or may be, a special-purpose processor/controller to operate according to the various embodiments herein. As examples, the processor(s) of application circuitry 1605 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 1600 may not utilize application circuitry 1605, and instead may include a special-purpose processor/controller to process IP data received from an EPC or 5GC, for example.

In some implementations, the application circuitry 1605 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more field-programmable gate arrays (FPGAs); PLDs (e.g., complex PLDs (CPLDs), high-capacity PLDs (HCPLDs), etc.) and the like; ASICs such as structured ASICs and the like; programmable SoCs (PSoCs); and/or the like. In such implementations, the circuitry of application circuitry 1605 may comprise logic blocks or logic fabric, and other interconnected resources that may be programmed to perform various functions, such as the procedures, methods, functions, etc. of the various embodiments discussed herein. In such embodiments, the circuitry of application circuitry 1605 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

In some implementations, such as implementations where subsystems of the edge nodes 1330, intermediate nodes 1320, and/or endpoints 1310 of FIG. 13 are individual software agents or AI agents, each agent is implemented in a respective hardware accelerator that are configured with appropriate bit stream(s) or logic blocks to perform their respective functions. In these implementations, processor(s) and/or hardware accelerators of the application circuitry 1605 may be specifically tailored for operating the agents and/or for machine learning functionality, such as a cluster of AI GPUs, tensor processing units (TPUs) developed by Google® Inc., a Real AI Processors (RAPS™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the hardware accelerator may be implemented as an AI accelerating co-processor, such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit within the HiSilicon Kirin 970 provided by Huawei®, and/or the like.

The baseband circuitry 1610 may be implemented, for example, as a solder-down substrate including one or more integrated circuits, a single packaged integrated circuit soldered to a main circuit board or a multi-chip module containing two or more integrated circuits. The baseband circuitry 1610 includes one or more processing devices (e.g., baseband processors) to carry out various protocol and radio control functions. Baseband circuitry 1610 may interface with application circuitry of system 1600 for generation and processing of baseband signals and for controlling operations of the RFEMs 1615. The baseband circuitry 1610 may handle various radio control functions that enable communication with one or more radio networks via the RFEMs 1615. The baseband circuitry 1610 may include circuitry such as, but not limited to, one or more single-core or multi-core processors (e.g., one or more baseband processors) or control logic to process baseband signals received from a receive signal path of the RFEMs 1615, and to generate baseband signals to be provided to the RFEMs 1615 via a transmit signal path. In various embodiments, the baseband circuitry 1610 may implement a real-time OS (RTOS) to manage resources of the baseband circuitry 1610, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 16, in one embodiment, the baseband circuitry 1610 includes individual processing device(s) to operate one or more wireless communication protocols (e.g., a "multi-protocol baseband processor" or "protocol processing circuitry") and individual processing device(s) to implement physical layer (PHY) functions. In this embodiment, the protocol processing circuitry operates or implements various protocol layers/entities of one or more wireless communication protocols. In a first example, the protocol processing circuitry may operate LTE protocol entities and/or 5G/NR protocol entities when the RFEMs 1615 are cellular radiofrequency communication system, such as millimeter wave (mmWave) communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the RFEMs 1615 are WiFi communication system. In the second example, the protocol processing circuitry would operate WiFi MAC and LLC functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 1610 and/or RFEMs 1615. The baseband circuitry 1610 may also support radio communications for more than one wireless protocol.

Continuing with the aforementioned embodiment, the baseband circuitry 1610 includes individual processing device(s) to implement PHY including HARQ functions, scrambling and/or descrambling, (en) coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions, etc. The modulation/demodulation functionality may include Fast-Fourier Transform (FFT), precoding, or constellation mapping/demapping functionality. The (en) coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

User interface circuitry 1650 may include one or more user interfaces designed to enable user interaction with the system 1600 or peripheral component interfaces designed to enable peripheral component interaction with the system 1600. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 1615 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 1615, which incorporates both mmWave antennas and sub-mmWave. The antenna array comprises one or more antenna elements, each of which is configured convert electrical signals into radio waves to travel through the air and to convert received radio waves into electrical signals. For example, digital baseband signals provided by the baseband circuitry 1610 is converted into analog RF signals (e.g., modulated waveform) that will be amplified and transmitted via the antenna elements of the antenna array including one or more antenna elements (not shown). The antenna elements may be omnidirectional, direction, or a combination thereof. The antenna elements may be formed in a multitude of arranges as are known and/or discussed herein. The antenna array may comprise microstrip antennas or printed antennas that are fabricated on the surface of one or more printed circuit boards. The antenna array may be formed in as a patch of metal foil (e.g., a patch antenna) in a variety of shapes, and may be coupled with the RF circuitry using metal transmission lines or the like.

The memory circuitry 1620 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 1620 may be implemented as one or more of solder down packaged integrated circuits, socketed memory modules and plug-in memory cards.

The memory circuitry 1620 is configured to store computational logic (or "modules") in the form of software, firmware, or hardware commands to implement the techniques described herein. The computational logic or modules may be developed using a suitable programming language or development tools, such as any programming language or development tool discussed herein. The computational logic may be employed to store working copies and/or permanent copies of programming instructions for the operation of various components of appliance infrastructure equipment 1600, an operating system of infrastructure equipment 1600, one or more applications, and/or for carrying out the embodiments discussed herein. The computational logic may be stored or loaded into memory circuitry 1620 as instructions for execution by the processors of the application circuitry 1605 to provide or perform the functions described herein. The various elements may be implemented by assembler instructions supported by processors of the application circuitry 1605 or high-level languages that may be compiled into such instructions. The permanent copy of the programming instructions may be placed into persistent storage devices of memory circuitry 1620 in the factory during manufacture, or in the field through, for example, a distribution medium (not shown), through a communication interface (e.g., from a distribution server), and/or over-the-air (OTA).

In some embodiments, the infrastructure equipment 1600 may be a NAN 1331-1333 that is configured to collect data for the LPP services 1500 discussed herein. In these embodiments, the memory circuitry 1620 may store one or more applications and/or software components including program code, instructions, modules, assemblies, packages, protocol stacks, software engine(s), firmware, etc., which when running on the infrastructure equipment 1600 (e.g., executed by application circuitry 1605), collect spatial-temporal data, and provides this information to one or more prediction layers 1505 in the LPPS 1500 via a suitable backhaul link via network controller circuitry 1635 and network interface connector 1640. As discussed in more detail infra, the spatial-temporal data such as operational parameters of the system 1600, signal measurements, and/or other like data as discussed herein, may be accessed using suitable APIs, Application Binary Interfaces (ABIs), middleware, drivers, configuration files, trusted application(s), etc., for accessing measurement data and/or other like information from the baseband circuitry and/or from network functions in the CN 1342. For example, these APIs, drivers, etc., may access measurement data of measurements directly measured by the infrastructure equipment 1600, measurements collected by UEs 1311, 1321 during minimization drive tests (MDTs), and/or measurement data collected by UEs 1311, 1321 and/or the infrastructure equipment 1600 measurements performed by the UEs 1311, 1321 for other purposes, such as measurements taken for cell selection, handovers, and/or the like. In another example, one or more APIs may be used to collect network load information from the CN 1342 (or one or more NFs within the CN 1342 or the like). In some embodiments, these applications, components, plug-ins, firmware, etc., may also subscribe to the LPPS 1500 to receive LPP notifications or "hints" from the LPPS 1500.

In other embodiments, the infrastructure equipment 1600 may be a server computer system that is configured to operate one or more prediction layers 1525-1 to 1525-N and/or the LPPS layer 1502 of FIG. 15. In these embodiments, the memory circuitry 1620 may store one or more applications and/or software components including program code, instructions, modules, assemblies, packages, protocol stacks, software engine(s), firmware, etc., which when running on the infrastructure equipment 1600 (e.g., executed by application circuitry 1605), perform various functions of the one or more prediction layers 1525-1 to 1525-N and/or the LPPS layer 1502.

The PMIC 1625 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1630 may provide for electrical power drawn from a network cable to provide both power supply and data connectivity to the infrastructure equipment 1600 using a single cable.

The network controller circuitry 1635 provides connectivity to a network using a standard network interface protocol such as Ethernet, Ethernet over GRE Tunnels, Ethernet over Multiprotocol Label Switching (MPLS), or some other suitable protocol, such as those discussed herein. Network connectivity may be provided to/from the infrastructure equipment 1600 via network interface connector 1640 using a physical connection, which may be electrical (commonly referred to as a "copper interconnect"), optical, or wireless. The network controller circuitry 1635 may include one or more dedicated processors and/or FPGAs to communicate using one or more of the aforementioned protocols. In some implementations, the network controller circuitry 1635 may include multiple controllers to provide connectivity to other networks using the same or different protocols. In various embodiments, the network controller circuitry 1635 enables communication with associated equipment and/or with a backend system (e.g., server(s) 1330 of FIG. 13), which may take place via a suitable gateway device.

The positioning circuitry 1645 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1645 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1645 may include a Micro-Technology for Positioning, Navigation, and Timing (Micro-PNT) IC that uses a master timing clock to perform position tracking/estimation without GNSS assistance. The positioning circuitry 1645 may also be part of, or interact with, the baseband circuitry 1610 and/or RFEMs 1615 to communicate with the nodes and components of the positioning network. The positioning circuitry 1645 may also provide position data and/or time data to the application circuitry 1605, which may use the data to synchronize operations with various other infrastructure equipment, or the like.

The components shown by FIG. 16 may communicate with one another using interface circuitry 1606 or interconnect (IX) 1606, which may include any number of bus and/or interconnect (IX) technologies such as industry standard architecture (ISA), extended ISA (EISA), inter-integrated circuit (I2C), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Intel® Common Express Link (CXL), Common Application Programming Interface (CAPI), OpenCAPI™, Intel® QuickPath interconnect (QPI), Ultra Path Interconnect (UPI), Intel® Omni-Path Architecture (OPA) IX, RapidIO™ system IXs, Cache Coherent Interconnect for Accelerators (CCIX), Gen-Z Consortium IXs, Open Coherent Accelerator Processor Interface (OpenCAPI) IX, a HyperTransport interconnect, NVLink provided by NVIDIA®, and/or any number of other IX technologies. The IX technology may be a proprietary bus, for example, used in an SoC based system, and/or any number of other IX technologies.

Figure 17:
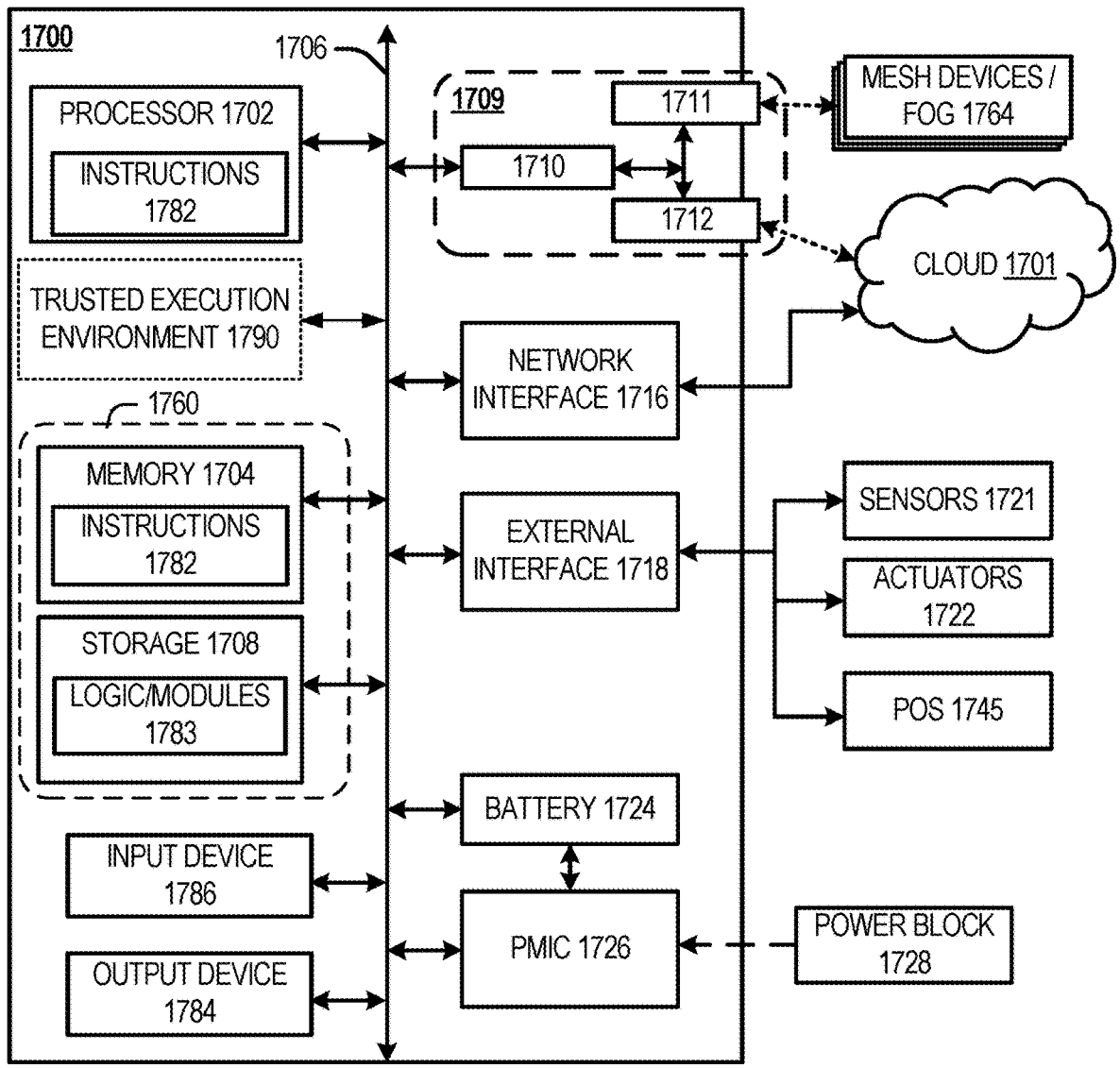
FIG. 17 illustrates an example of a platform in accordance with various embodiments.

FIG. 17 illustrates an example of a platform 1700 (also referred to as "system 1700," "device 1700," "appliance 1700," or the like) in accordance with various embodiments. In embodiments, the platform 1700 may be suitable for use as intermediate nodes 1320 and/or endpoints 1310 of FIG. 13, and/or any other element/device discussed herein with regard any other figure shown and described herein. Platform 1700 may also be implemented in or as a server computer system or some other element, device, or system discussed herein. The platform 1700 may include any combinations of the components shown in the example. The components of platform 1700 may be implemented as integrated circuits (ICs), portions thereof, discrete electronic devices, or other modules, logic, hardware, software, firmware, or a combination thereof adapted in the computer platform 1700, or as components otherwise incorporated within a chassis of a larger system. The example of FIG. 17 is intended to show a high level view of components of the computer platform 1700. However, some of the components shown may be omitted, additional components may be present, and different arrangement of the components shown may occur in other implementations.

The platform 1700 includes processor circuitry 1702. The processor circuitry 1702 includes circuitry such as, but not limited to one or more processor cores and one or more of cache memory, low drop-out voltage regulators (LDOs), interrupt controllers, serial interfaces such as serial peripheral interface (SPI), inter-integrated circuit (I2C) or universal programmable serial interface circuit, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports. In some implementations, the processor circuitry 1702 may include one or more hardware accelerators, which may be microprocessors, programmable processing devices (e.g., FPGA, ASIC, etc.), or the like. The one or more hardware accelerators may include, for example, computer vision, machine learning, and/or deep learning accelerators. In some implementations, the processor circuitry 1702 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of processor circuitry 1702 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAS, one or more PLDs, one or more ASICs, one or more baseband processors, one or more radio-frequency integrated circuits (RFIC), one or more microprocessors or controllers, or any suitable combination thereof. The processors (or cores) of the processor circuitry 1702 may be coupled with or may include memory/storage and may be configured to execute instructions stored in the memory/storage to enable various applications or operating systems to run on the platform 1700. In these embodiments, the processors (or cores) of the processor circuitry 1702 is configured to operate application software to provide a specific service to a user of the platform 1700. In some embodiments, the processor circuitry 1702 may be a special-purpose processor/controller to operate according to the various embodiments herein.

As examples, the processor circuitry 1702 may include an Intel® Architecture Core™ based processor, such as a Quark™, an Atom™, an i3, an i5, an i7, an i9, or an MCU-class processor, Pentium® processor(s), Xeon® processor(s), or another such processor available from Intel® Corporation, Santa Clara, California. However, any number other processors may be used, such as one or more of Advanced Micro Devices (AMD) Zen® Core Architecture, such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centriq™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor circuitry 1702 may be a part of a system on a chip (SoC), System-in-Package (SiP), a multi-chip package (MCP), and/or the like, in which the processor circuitry 1702 and other components are formed into a single integrated circuit, or a single package, such as the Edison™ or Galileo™ SoC boards from Intel® Corporation. Other examples of the processor circuitry 1702 are mentioned elsewhere in the present disclosure.

Additionally or alternatively, processor circuitry 1702 may include circuitry such as, but not limited to, one or more FPDs such as FPGAs and the like; PLDs such as CPLDs, HCPLDs, and the like; ASICs such as structured ASICs and the like; PSoCs; and the like. In such embodiments, the circuitry of processor circuitry 1702 may comprise logic blocks or logic fabric including and other interconnected resources that may be programmed to perform various functions, such as the procedures, methods, functions, etc. of the various embodiments discussed herein. In such embodiments, the circuitry of processor circuitry 1702 may include memory cells (e.g., EPROM, EEPROM, flash memory, static memory (e.g., SRAM, anti-fuses, etc.) used to store logic blocks, logic fabric, data, etc. in LUTs and the like.

The processor circuitry 1702 may communicate with system memory circuitry 1704 over an interconnect 1706 (e.g., a bus). Any number of memory devices may be used to provide for a given amount of system memory. As examples, the memory circuitry 1704 may be random access memory (RAM) in accordance with a Joint Electron Devices Engineering Council (JEDEC) design such as the DDR or mobile DDR standards (e.g., LPDDR, LPDDR2, LPDDR3, or LPDDR4), dynamic RAM (DRAM), and/or synchronous DRAM (SDRAM)). The memory circuitry 1704 may also include nonvolatile memory (NVM) such as high-speed electrically erasable memory (commonly referred to as "flash memory"), phase change RAM (PRAM), resistive memory such as magnetoresistive random access memory (MRAM), etc., and may incorporate three-dimensional (3D) cross-point (XPOINT) memories from Intel® and Micron®. The memory circuitry 1704 may also comprise persistent storage devices, which may be temporal and/or persistent storage of any type, including, but not limited to, non-volatile memory, optical, magnetic, and/or solid state mass storage, and so forth.

The individual memory devices of memory circuitry 1704 may be implemented as one or more of solder down packaged integrated circuits, socketed memory modules, and plug-in memory cards. The memory circuitry 1704 may be implemented as any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. Memory circuitry 1704. In embodiments, the memory circuitry 1704 may be disposed in or on a same die or package as the processor circuitry 1702 (e.g., a same SoC, a same SiP, or soldered on a same MCP as the processor circuitry 1702).

To provide for persistent storage of information such as data, applications, operating systems (OS), and so forth, a storage circuitry 1708 may also couple to the processor circuitry 1702 via the interconnect 1706. In an example, the storage circuitry 1708 may be implemented via a solid-state disk drive (SSDD). Other devices that may be used for the storage circuitry 1708 include flash memory cards, such as SD cards, microSD cards, xD picture cards, and the like, and USB flash drives. In low power implementations, the storage circuitry 1708 may be on-die memory or registers associated with the processor circuitry 1702. However, in some examples, the storage circuitry 1708 may be implemented using a micro hard disk drive (HDD). Further, any number of new technologies may be used for the storage circuitry 1708 in addition to, or instead of, the technologies described, such resistance change memories, phase change memories, holographic memories, or chemical memories, among others.

The storage circuitry 1708 stores computational logic 1783 (or "modules 1783") in the form of software, firmware, or hardware commands to implement the techniques described herein. The computational logic 1783 may be employed to store working copies and/or permanent copies of computer programs, or data to create the computer programs, for the operation of various components of platform 1700 (e.g., drivers, etc.), an operating system of platform 1700, one or more applications, and/or for carrying out the embodiments discussed herein. The computational logic 1783 may be stored or loaded into memory circuitry 1704 as instructions 1782, or data to create the instructions 1782, for execution by the processor circuitry 1702 to provide the functions described herein. The various elements may be implemented by assembler instructions supported by processor circuitry 1702 or high-level languages that may be compiled into such instructions (e.g., instructions 1782, or data to create the instructions 1782). The permanent copy of the programming instructions may be placed into persistent storage devices of storage circuitry 1708 in the factory or in the field through, for example, a distribution medium (not shown), through a communication interface (e.g., from a distribution server (not shown)), or over-the-air (OTA).

The instructions 1782 and/or modules 1783 (also referred to as "program code" or "programming instructions") provided via the memory circuitry 1704 and/or the storage circuitry 1708 of FIG. 17 are embodied as one or more non-transitory computer readable storage media (NTCRSM) 1760 including program code, a computer program product or data to create the computer program, with the computer program or data, to direct the processor circuitry 1702 of platform 1700 to perform electronic operations in the platform 1700, and/or to perform a specific sequence or flow of actions, for example, as described with respect to the flow-chart(s) and block diagram(s) of operations and functionality depicted by the other figures in this disclosure. In some embodiments, the programming instructions (or data to create the programming instructions) to be executed may be in a pre-configured form that may require configuration instructions to install or provision the programming instructions to an apparatus (such as any of the devices/components/systems described herein). When installed/provisioned, configured and executed, the programming instructions can complete or perform various programming operations associated with operating system functions, one or more applications, and/or aspects of the present disclosure (including various programming operations associated with the other figures in this disclosure.

In various embodiments, the instructions 1782 and/or modules 1783 may include, or may be, program code for one or more applications, components, plug-ins, firmware, etc., which when running on the system 1700, collect spatial-temporal data, and provides this information to one or more prediction layers 1505 in the LPPS 1500 via a suitable access network (e.g., a NAN 1331, 1332, 1333 and CN1342 or cloud 1344). As discussed in more detail infra, the spatial-temporal data such as operational parameters of the system 1500, signal measurements, and/or other like data as discussed herein, which may be accessed using suitable APIs, drivers, etc., (e.g., a modem driver for accessing signal measurements and/or other like information from the modem 1710). In some embodiments, these applications, components, plug-ins, firmware, etc., may also subscribe to the LPPS 1500 to receive LPP notifications or "hints" from the LPPS 1500.

In alternate embodiments, programming instructions (or data to create the instructions) may be disposed on multiple NTCRSM 1760. In alternate embodiments, programming instructions (or data to create the instructions) may be disposed on computer-readable transitory storage media, such as, signals. The instructions embodied by a machine-readable medium may further be transmitted or received over a communications network using a transmission medium via a network interface device utilizing any one of a number of transfer protocols (e.g., HTTP). Any combination of one or more computer usable or computer readable medium(s) may be utilized. The computer-usable or computer-readable medium may be, for example but not limited to, one or more electronic, magnetic, optical, electromagnetic, infrared, or semiconductor systems, apparatuses, devices, or propagation media. For instance, the NTCRSM 1760 may be embodied by devices described for the storage circuitry 1708 and/or memory circuitry 1704. More specific examples (a non-exhaustive list) of a computer-readable medium would include the following: an electrical connection having one or more wires, a portable computer diskette, a hard disk, a random access memory (RAM), a read-only memory (ROM), an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (or data to create the program code) as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code such as that described herein. In another example, the Program code (or data to create the program code) may be stored in a state in which they may be read by a computer, but require addition of a library (e.g., a dynamic link library), a software development kit (SDK), an application programming interface (API), etc. in order to execute the instructions on a particular computing device or other device. In another example, the program code (or data to create the program code) may need to be configured (e.g., settings stored, data input, network addresses recorded, etc.) before the program code (or data to create the program code) can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure (e.g., computational logic 1783, instructions 1782 discussed previously) may be written in any combination of one or more programming languages, scripting language, mark-up languages, and/or the like, such as Python, PyTorch, Ruby, Scala, Smalltalk, Java™, C++, C#, the "C" programming language, the Go (or "Golang") programming language, JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, JAMscript, and/or the like; a markup language such as Hypertext Markup Language (HTML), Extensible Markup Language (XML), Efficient XML Interchange (EXI), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code for carrying out operations of the present disclosure may also be written in any combination of the programming languages discussed herein. The program code may execute entirely on the system 1700, partly on the system 1700, as a stand-alone software package, partly on the system 1700 and partly on a remote computer or entirely on the remote computer or server. In the latter scenario, the remote computer may be connected to the system 1700 through any type of network, including a LAN or WAN, or the connection may be made to an external computer (e.g., through the Internet using an Internet Service Provider).

In an example, the instructions 1782 on the processor circuitry 1702 (separately, or in combination with the instructions 1782 and/or logic/modules 1783 stored in computer-readable storage media) may configure execution or operation of a trusted execution environment (TEE) 1790. The TEE 1790 operates as a protected area accessible to the processor circuitry 1702 to enable secure access to data and secure execution of instructions. In some embodiments, the TEE 1790 may be a physical hardware device that is separate from other components of the system 1700 such as a secure-embedded controller, a dedicated SoC, or a tamper-resistant chipset or microcontroller with embedded processing devices and memory devices. In other embodiments, the TEE 1790 may be implemented as secure enclaves, which are isolated regions of code and/or data within the memory of the system 1700. Only code executed within a secure enclave may access data within the same secure enclave, and the secure enclave may only be accessible using the secure application (which may be implemented by an application processor or a tamper-resistant microcontroller). Various implementations of the TEE 1790, and an accompanying secure area in the processor circuitry 1702 or the memory circuitry 1704 and/or storage circuitry 1708 may be provided, for instance, through use of Intel® Software Guard Extensions (SGX) or ARM® TrustZone® hardware security extensions; a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, the IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (IDRAC), and the like. Other aspects of security hardening, hardware roots-of-trust, and trusted or protected operations may be implemented in the device 1700 through the TEE 1790 and the processor circuitry 1702.

In other embodiments, the TEE 1790 may be implemented as secure enclaves, which are isolated regions of code and/or data within the processor and/or memory/storage circuitry of the system 1700. Only code executed within a secure enclave may access data within the same secure enclave, and the secure enclave may only be accessible using the secure application (which may be implemented by an application processor or a tamper-resistant microcontroller). Various implementations of the TEE 1790, and an accompanying secure area in the processor circuitry 1702 or the memory circuitry 1704 and/or storage circuitry 1708 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 1700 through the TEE 1790 and the processor circuitry 1702. In some embodiments, the memory 1704 and/or storage 1708 may be divided into isolated user-space instances such as containers, partitions, virtual environments (VEs), etc. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some embodiments, the memory 1704 and/or storage 1708 may be divided into one or more trusted memory regions for storing applications or software modules of the TEE 1790.

Although the instructions 1782 are shown as code blocks included in the memory circuitry 1704 and the computational logic 1783 is shown as code blocks in the storage circuitry 1708, it should be understood that any of the code blocks may be replaced with hardwired circuits, for example, built into an FPGA, ASIC, or some other suitable circuitry. For example, where processor circuitry 1702 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The memory circuitry 1704 and/or storage circuitry 1708 may store program code of an operating system (OS), which may be a general purpose OS or an OS specifically written for and tailored to the computing platform 1700. For example, the OS may be Unix or a Unix-like OS such as Linux e.g., provided by Red Hat Enterprise, Windows 10™ provided by Microsoft Corp., macOS provided by Apple Inc.®, or the like. In another example, the OS may be a mobile OS, such as Android provided by Google Inc., iOS provided by Apple Inc., Windows 10 Mobile provided by Microsoft Corp., KaiOS provided by KaiOS Technologies Inc., or the like. In another example, the OS may be a real-time OS (RTOS), such as Apache Mynewt provided by the Apache Software Foundation®, Windows 10 For IoT provided by Microsoft Corp., Micro-Controller Operating Systems ("MicroC/OS" or "uC/OS") provided by Micrium, Inc., FreeRTOS, VxWorks provided by Wind River Systems, Inc., PikeOS provided by Sysgo AG®, Android Things provided by Google Inc., QNX® RTOS provided by BlackBerry Ltd., or any other suitable RTOS, such as those discussed herein.

The OS may include one or more drivers that operate to control particular devices that are embedded in the platform 1700, attached to the platform 1700, or otherwise communicatively coupled with the platform 1700. The drivers may include individual drivers allowing other components of the platform 1700 to interact or control various IO devices that may be present within, or connected to, the platform 1700. For example, the drivers may include a display driver to control and allow access to a display device, a touchscreen driver to control and allow access to a touchscreen interface of the platform 1700, sensor drivers to obtain sensor readings of sensor circuitry 1721 and control and allow access to sensor circuitry 1721, actuator drivers to obtain actuator positions of the actuators 1722 and/or control and allow access to the actuators 1722, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from TEE 1790.

The components may communicate over the IX 1706. The IX 1706 may include any number of technologies, including ISA, extended ISA, I²C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, and/or any number of other IX technologies. The IX 1706 may be a proprietary bus, for example, used in a SoC based system.

The interconnect 1706 couples the processor circuitry 1702 to the communication circuitry 1709 for communications with other devices. The communication circuitry 1709 is a hardware element, or collection of hardware elements, used to communicate over one or more networks (e.g., cloud 1701) and/or with other devices (e.g., mesh devices/fog 1764). The communication circuitry 1709 includes baseband circuitry 1710 (or "modem 1710") and radiofrequency (RF) circuitry 1711 and 1712.

The baseband circuitry 1710 includes one or more processing devices (e.g., baseband processors) to carry out various protocol and radio control functions. Baseband circuitry 1710 may interface with application circuitry of platform 1700 (e.g., a combination of processor circuitry 1702, memory circuitry 1704, and/or storage circuitry 1708) for generation and processing of baseband signals and for controlling operations of the RF circuitry 1711 or 1712. The baseband circuitry 1710 may handle various radio control functions that enable communication with one or more radio networks via the RF circuitry 1711 or 1712. The baseband circuitry 1710 may include circuitry such as, but not limited to, one or more single-core or multi-core processors (e.g., one or more baseband processors) or control logic to process baseband signals received from a receive signal path of the RF circuitry 1711 and/or 1712, and to generate baseband signals to be provided to the RF circuitry 1711 or 1712 via a transmit signal path. In various embodiments, the baseband circuitry 1710 may implement a real-time OS (RTOS) to manage resources of the baseband circuitry 1710, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 17, in one embodiment, the baseband circuitry 1710 includes individual processing device(s) to operate one or more wireless communication protocols (e.g., a "multi-protocol baseband processor" or "protocol processing circuitry") and individual processing device(s) to implement PHY functions. In this embodiment, the protocol processing circuitry operates or implements various protocol layers/entities of one or more wireless communication protocols. In a first example, the protocol processing circuitry may operate LTE protocol entities and/or 5G/NR protocol entities when the communication circuitry 1709 is a cellular radiofrequency communication system, such as millimeter wave (mmWave) communication circuitry or some other suitable cellular communication circuitry. In the first example, the protocol processing circuitry 1702 would operate MAC, RLC, PDCP, SDAP, RRC, and NAS functions. In a second example, the protocol processing circuitry may operate one or more IEEE-based protocols when the communication circuitry 1709 is WiFi communication system. In the second example, the protocol processing circuitry would operate WiFi MAC and LLC) functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 1710 and/or RF circuitry 1711 and 1712. The baseband circuitry 1710 may also support radio communications for more than one wireless protocol.

Continuing with the aforementioned embodiment, the baseband circuitry 1710 includes individual processing device(s) to implement PHY including HARQ functions, scrambling and/or descrambling, (en) coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions, etc. The modulation/demodulation functionality may include Fast-Fourier Transform (FFT), pre-coding, or constellation mapping/demapping functionality. The (en) coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

The communication circuitry 1709 also includes RF circuitry 1711 and 1712 to enable communication with wireless networks using modulated electromagnetic radiation through a non-solid medium. Each of the RF circuitry 1711 and 1712 include a receive signal path, which may include circuitry to convert analog RF signals (e.g., an existing or received modulated waveform) into digital baseband signals to be provided to the baseband circuitry 1710. Each of the RF circuitry 1711 and 1712 also include a transmit signal path, which may include circuitry configured to convert digital baseband signals provided by the baseband circuitry 1710 to be converted into analog RF signals (e.g., modulated waveform) that will be amplified and transmitted via an antenna array including one or more antenna elements (not shown). The antenna array may be a plurality of microstrip antennas or printed antennas that are fabricated on the surface of one or more printed circuit boards. The antenna array may be formed in as a patch of metal foil (e.g., a patch antenna) in a variety of shapes, and may be coupled with the RF circuitry 1711 or 1712 using metal transmission lines or the like.

The RF circuitry 1711 (also referred to as a "mesh transceiver") is used for communications with other mesh or fog devices 1764. The mesh transceiver 1711 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of RF circuitry 1711, configured for a particular wireless communication protocol, may be used for the connections to the mesh devices 1764. For example, a WLAN unit may be used to implement WiFi™ communications in accordance with the IEEE 802.11 standard. In addition, wireless wide area communications, for example, according to a cellular or other wireless wide area protocol, may occur via a WWAN unit.

The mesh transceiver 1711 may communicate using multiple standards or radios for communications at different ranges. For example, the platform 1700 may communicate with close/proximate devices, e.g., within about 10 meters, using a local transceiver based on BLE, or another low power radio, to save power. More distant mesh devices 1764, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

The RF circuitry 1712 (also referred to as a "wireless network transceiver," a "cloud transceiver," or the like) may be included to communicate with devices or services in the cloud 1701 via local or wide area network protocols. The wireless network transceiver 1712 includes one or more radios to communicate with devices in the cloud 1701. The cloud 1701 may be the same or similar to cloud 1344 discussed previously. The wireless network transceiver 1712 may be a LPWA transceiver that follows the IEEE 802.15.4, or IEEE 802.15.4g standards, among others, such as those discussed herein. The platform 1700 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4 specification may be used.

In one example implementation, the communication circuitry 1709 may be, or may include, a software defined radio (SDR) in which RF operating parameters including, but not limited to, frequency range, modulation type, and/or output power can be set or altered by software, and/or the technique by which this is achieved. Additionally or alternatively, the communication circuitry 1709 may be, or may include, a software defined multiradio (SDMR), which is a device or technology where multiple radio technologies (or RATs) coexist and share their wireless transmission and/or reception capabilities, including but not limited to regulated parameters, by operating them under a common software system. In either of these example implementations, each of the transceivers 1711 and 1712 may be radio applications, which are software application executing in a SDR or SDMR. Radio applications are typically designed to use certain RF band(s) using agreed-to schemes for multiple access, modulation, channel and data coding, as well as control protocols for all radio layers needed to maintain user data links between adjacent radio equipment, which run the same radio application.

Any number of other radio communications and protocols may be used in addition to the systems mentioned for the mesh transceiver 1711 and wireless network transceiver 1712, as described herein. For example, the radio transceivers 1711 and 1712 may include an LTE or other cellular transceiver that uses spread spectrum (SPA/SAS) communications for implementing high-speed communications. Further, any number of other protocols may be used, such as WiFi® networks for medium speed communications and provision of network communications. The transceivers 1711 and 1712 may include radios that are compatible with, and/or may operate according to any one or more of the following radio communication technologies and/or standards including but not limited to those discussed herein.

Network interface circuitry/controller (NIC) 1716 may be included to provide wired communication to the cloud 1701 or to other devices, such as the mesh devices 1764 using a standard network interface protocol. The standard network interface protocol may include Ethernet, Ethernet over GRE Tunnels, Ethernet over Multiprotocol Label Switching (MPLS), Ethernet over USB, or may be based on other types of network protocols, such as Controller Area Network (CAN), Local Interconnect Network (LIN), DeviceNet, ControlNet, Data Highway+, PROFIBUS, or PROFINET, among many others. Network connectivity may be provided to/from the platform 1700 via NIC 1716 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The NIC 1716 may include one or more dedicated processors and/or FPGAs to communicate using one or more of the aforementioned network interface protocols. In some implementations, the NIC 1716 may include multiple controllers to provide connectivity to other networks using the same or different protocols. For example, the platform 1700 may include a first NIC 1716 providing communications to the cloud over Ethernet and a second NIC 1716 providing communications to other devices over another type of network.

The interconnect 1706 may couple the processor circuitry 1702 to an external interface 1718 (also referred to as "IO interface circuitry" or the like) that is used to connect external devices or subsystems. The external devices include, inter alia, sensor circuitry 1721, actuators 1722, and positioning circuitry 1745. The sensor circuitry 1721 may include devices, modules, or subsystems whose purpose is to detect events or changes in its environment and send the information (sensor data) about the detected events to some other a device, module, subsystem, etc. Examples of such sensors 1721 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like), depth sensors, ambient light sensors, ultrasonic transceivers; microphones; etc.

The external interface 1718 connects the platform 1700 to actuators 1722, allow platform 1700 to change its state, position, and/or orientation, or move or control a mechanism or system. The actuators 1722 comprise electrical and/or mechanical devices for moving or controlling a mechanism or system, and converts energy (e.g., electric current or moving air and/or liquid) into some kind of motion. The actuators 1722 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1722 may include one or more electro-mechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The platform 1700 may be configured to operate one or more actuators 1722 based on one or more captured events and/or instructions or control signals received from a service provider and/or various client systems.

The positioning circuitry 1745 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1745 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1745 may include a Micro-Technology for Positioning, Navigation, and Timing (Micro-PNT) IC that uses a master timing clock to perform position tracking/estimation without GNSS assistance. The positioning circuitry 1745 may also be part of, or interact with, the communication circuitry 1709 to communicate with the nodes and components of the positioning network. The positioning circuitry 1745 may also provide position data and/or time data to the application circuitry, which may use the data to synchronize operations with various infrastructure (e.g., radio base stations), for turn-by-turn navigation, or the like.

In some examples, various IO devices may be present within, or connected to, the platform 1700, which are referred to as input device circuitry 1786 and output device circuitry 1784 in FIG. 17. The input device circuitry 1786 and output device circuitry 1784 include one or more user interfaces designed to enable user interaction with the platform 1700 and/or peripheral component interfaces designed to enable peripheral component interaction with the platform 1700. Input device circuitry 1786 may include any physical or virtual means for accepting an input including, inter alia, one or more physical or virtual buttons (e.g., a reset button), a physical keyboard, keypad, mouse, touchpad, touchscreen, microphones, scanner, headset, and/or the like.

The output device circuitry 1784 may be included to show information or otherwise convey information, such as sensor readings, actuator position(s), or other like information. Data and/or graphics may be displayed on one or more user interface components of the output device circuitry 1784. Output device circuitry 1784 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1700. The output device circuitry 1784 may also include speakers or other audio emitting devices, printer(s), and/or the like. In some embodiments, the sensor circuitry 1721 may be used as the input device circuitry 1786 (e.g., an image capture device, motion capture device, or the like) and one or more actuators 1722 may be used as the output device circuitry 1784 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a universal serial bus (USB) port, an audio jack, a power supply interface, etc.

A battery 1724 may be coupled to the platform 1700 to power the platform 1700, which may be used in embodiments where the platform 1700 is not in a fixed location. The battery 1724 may be a lithium ion battery, a lead-acid automotive battery, or a metal-air battery, such as a zinc-air battery, an aluminum-air battery, a lithium-air battery, a lithium polymer battery, and/or the like. In embodiments where the platform 1700 is mounted in a fixed location, the platform 1700 may have a power supply coupled to an electrical grid. In these embodiments, the platform 1700 may include power tee circuitry to provide for electrical power drawn from a network cable to provide both power supply and data connectivity to the platform 1700 using a single cable.

Power management integrated circuitry (PMIC) 1726 may be included in the platform 1700 to track the state of charge (SoCh) of the battery 1724, and to control charging of the platform 1700. The PMIC 1726 may be used to monitor other parameters of the battery 1724 to provide failure predictions, such as the state of health (SoH) and the state of function (SoF) of the battery 1724. The PMIC 1726 may include voltage regulators, surge protectors, power alarm detection circuitry. The power alarm detection circuitry may detect one or more of brown out (under-voltage) and surge (over-voltage) conditions. The PMIC 1726 may communicate the information on the battery 1724 to the processor circuitry 1702 over the interconnect 1706. The PMIC 1726 may also include an analog-to-digital (ADC) convertor that allows the processor circuitry 1702 to directly monitor the voltage of the battery 1724 or the current flow from the battery 1724. The battery parameters may be used to determine actions that the platform 1700 may perform, such as transmission frequency, mesh network operation, sensing frequency, and the like. As an example, the PMIC 1726 may be a battery monitoring integrated circuit, such as an LTC5020 or an LTC2990 from Linear Technologies, an ADT7488A from ON Semiconductor of Phoenix Arizona, or an IC from the UCD90xxx family from Texas Instruments of Dallas, TX.

A power block 1728, or other power supply coupled to a grid, may be coupled with the PMIC 1726 to charge the battery 1724. In some examples, the power block 1728 may be replaced with a wireless power receiver to obtain the power wirelessly, for example, through a loop antenna in the platform 1700. A wireless battery charging circuit, such as an LTC5020 chip from Linear Technologies of Milpitas, California, among others, may be included in the PMIC 1726. The specific charging circuits chosen depend on the size of the battery 1724, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Software Distribution Embodiments

Figure 18:
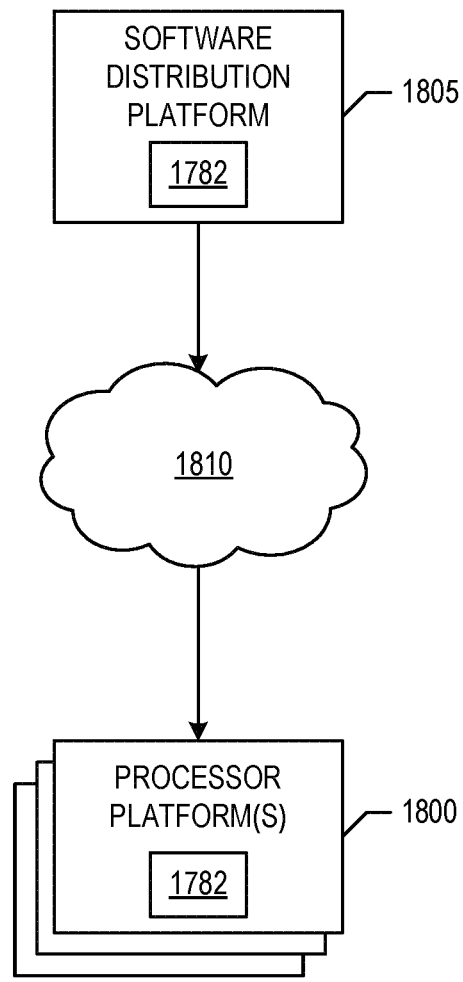
FIG. 18 illustrates an example software distribution platform to distribute software in accordance with certain embodiments.

FIG. 18 illustrates an example software distribution platform 1805 to distribute software, such as the example computer readable instructions 1782 of FIG. 17, to one or more devices, such as example processor platform(s) 1800 and/or example connected edge devices described throughout this disclosure. The example software distribution platform 1805 may be implemented by any computer server, data facility, cloud service, etc., capable of storing and transmitting software to other computing devices (e.g., third parties, example connected edge devices described throughout this disclosure). Example connected edge devices may be customers, clients, managing devices (e.g., servers), third parties (e.g., customers of an entity owning and/or operating the software distribution platform 1805). Example connected edge devices may operate in commercial and/or home automation environments. In some examples, a third party is a developer, a seller, and/or a licensor of software such as the example computer readable instructions 1782 of FIG. 17. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 18, the software distribution platform 1805 includes one or more servers and one or more storage devices. The storage devices store the computer readable instructions 1782, which may implement the video processing functionality described throughout this disclosure. The one or more servers of the example software distribution platform 1805 are in communication with a network 1810, which may correspond to any one or more of the Internet and/or any of the example networks described throughout this disclosure. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 1782 from the software distribution platform 1805. For example, software comprising the computer readable instructions 1782 may be downloaded to the example processor platform(s) 1800 (e.g., example connected edge devices), which is/are to execute the computer readable instructions 1782 to implement the functionality described throughout this disclosure. In some examples, one or more servers of the software distribution platform 1805 are communicatively connected to one or more security domains and/or security devices through which requests and transmissions of the example computer readable instructions 1782 must pass. In some examples, one or more servers of the software distribution platform 1805 periodically offer, transmit, and/or force updates to the software (e.g., the example computer readable instructions 1782 of FIG. 17) to ensure improvements, patches, updates, etc. are distributed and applied to the software at the end user devices.

Examples

Illustrative examples of the technologies described throughout this disclosure are provided below. Embodiments of these technologies may include any one or more, and any combination of, the examples described below. In some embodiments, at least one of the systems or components set forth in one or more of the preceding figures may be configured to perform one or more operations, techniques, processes, and/or methods as set forth in the following examples.

Example 1 includes a method of predicting radio link performance, comprising: determining a current path of a mobile device, wherein the current path is determined based on radio signals between the mobile device and a base station, and wherein the current path indicates a sequence of positions of the mobile device over a current time window; predicting, based on the current path, a future path of the mobile device, wherein the future path indicates a sequence of predicted future positions of the mobile device over a future time window; and generating a link performance prediction (LPP) for the mobile device based on the future path and a base station coverage map, wherein: the base station coverage map indicates a radio signal quality across a base station coverage area of the base station, wherein the base station coverage area is represented as a three-dimensional (3D) coordinate space; and the LPP indicates a predicted performance of a radio link between the mobile device and the base station during the future time window.

Example 2 includes the method of Example 1, wherein: the base station coverage map represents a plurality of 3D regions within the base station coverage area as a plurality of points within the 3D coordinate space, wherein each point within the 3D coordinate space represents a corresponding 3D region within the base station coverage area; and the base station coverage map further indicates a corresponding radio signal quality at each of the plurality of 3D regions.

Example 3 includes the method of Example 2, wherein the 3D coordinate space is based on: a Cartesian coordinate system; or a spherical coordinate system.

Example 4 includes the method of Example 2, further comprising generating the base station coverage map, wherein generating the base station coverage map comprises: collecting radio signal measurements across the base station coverage area; determining, based on the radio signal measurements, the corresponding radio signal quality at each of the plurality of 3D regions within the base station coverage area; and generating the base station coverage map based on the corresponding radio signal quality at each of the plurality of 3D regions within the base station coverage area.

Example 5 includes the method of Example 2, wherein: the current path of the mobile device further indicates: a current position of the mobile device; and a current direction of travel of the mobile device; and the future path of the mobile device further indicates: a next position of the mobile device, wherein the mobile device is predicted to transition from the current position to the next position.

Example 6 includes the method of Example 5, wherein: the current path of the mobile device comprises: a first sequence of points within the 3D coordinate space, wherein the first sequence of points comprises a current point indicating the current position of the mobile device; and a direction vector within the 3D coordinate space, wherein the direction vector indicates the current direction of travel of the mobile device; and the future path of the mobile device comprises a second sequence of points within the 3D coordinate space, wherein the second sequence of points comprises a next point indicating the next position of the mobile device.

Example 7 includes the method of Example 6, wherein predicting, based on the current path, the future path of the mobile device comprises: predicting, based on the first sequence of points and the direction vector, the second sequence of points.

Example 8 includes the method of Example 7, wherein predicting, based on the first sequence of points and the direction vector, the second sequence of points comprises: predicting the second sequence of points using a predictive model, wherein the predictive model is trained to infer the second sequence of points from the first sequence of points and the direction vector, wherein the predictive model is trained based on a set of previous mobile device paths through the base station coverage area.

Example 9 includes the method of Example 8, wherein the predictive model comprises a recurrent neural network (RNN) model.

Example 10 includes the method of Example 9, wherein the RNN model comprises a long short-term memory (LSTM) model.

Example 11 includes the method of Example 7, wherein predicting, based on the first sequence of points and the direction vector, the second sequence of points comprises: predicting the next point based on the current point and the direction vector, wherein the mobile device is predicted to transition from the current point to the next point.

Example 12 includes the method of Example 11, wherein predicting the next point based on the current point and the direction vector comprises: determining, based on the current point and the direction vector, a set of potential transition points in the 3D coordinate space; and predicting the next point from the set of potential transition points.

Example 13 includes the method of Example 12, wherein the set of potential transition points comprises: one or more adjacent points relative to the current point; and one or more non-adjacent points relative to the current point, wherein the one or more non-adjacent points are identified based on one or more previous mobile device transitions from the current point to the one or more non-adjacent points.

Example 14 includes the method of Example 12, wherein predicting the next point from the set of potential transition points comprises: predicting the next point using a predictive model, wherein the predictive model is trained to infer the next point from the current point and the set of potential transition points, wherein the predictive model is trained based on a set of previous mobile device paths through the base station coverage area.

Example 15 includes the method of Example 14, wherein the predictive model comprises a Markov model.

Example 16 includes the method of Example 15, wherein the Markov model comprises an All-K-Order Markov model.

Example 17 includes the method of Example 1, wherein generating the LPP for the mobile device based on the future path and the base station coverage map comprises: determining, based on the base station coverage map, a corresponding radio signal quality along the future path of the mobile device; and generating the LPP based on the corresponding radio signal quality along the future path of the mobile device.

Example 18 includes the method of any of Examples 1-17, wherein the mobile device comprises a user equipment (UE) device or a mobile station.

Example 19 includes the method of any of Examples 1-17, wherein the base station comprises a millimeter wave (mmWave) base station.

Example 20 includes the method of Example 19, wherein the mmWave base station comprises a gNodeB.

Example 21 includes the method of any of Examples 1-17, wherein the base station comprises a network access node or a wireless access point.

Example 22 includes the method of any of Examples 1-17, wherein the base station is associated with a radio access network (RAN).

Example 23 includes an apparatus comprising means to implement the method of any of Examples 1-22.

Example 24 includes an apparatus comprising logic, modules, or circuitry to implement the method of any of Examples 1-22.

Example 25 includes an apparatus comprising processing circuitry, interface circuitry, and communication circuitry to implement the method of any of Examples 1-22.

Example 26 includes an apparatus comprising: one or more processors and one or more computer-readable media comprising instructions that, when executed by the one or more processors, cause the one or more processors to implement the method of any of Examples 1-22.

Example 27 includes one or more non-transitory computer-readable media comprising instructions to cause an electronic device, upon execution of the instructions by one or more processors of the electronic device, to implement the method of any of Examples 1-22.

Example 28 includes a computer program comprising instructions, wherein execution of the program by a processing element is to cause the processing element to implement the method of any of Examples 1-22.

Example 29 includes a wireless communication system comprising nodes to implement the method of any of Examples 1-22.

Example 30 includes a radio access network comprising nodes to implement the method of any of Examples 1-22.

Example 31 includes an access point comprising circuitry to implement the method of any of Examples 1-22.

Example 32 includes a base station comprising circuitry to implement the method of any of Examples 1-22.

Example 33 includes a gNodeB comprising circuitry to implement the method of any of Examples 1-22.

Example 34 includes a cloud computing system, cloud server, or cloud node comprising circuitry to implement the method of any of Examples 1-22.

Example 35 includes an edge computing system, edge server, or edge node comprising circuitry to implement the method of any of Examples 1-22.

Example 36 includes an edge cloud system, edge cloud server, or edge cloud node comprising circuitry to implement the method of any of Examples 1-22.

Example 37 includes a multi-access edge computing (MEC) system, MEC server, or MEC node comprising circuitry to implement the method of any of Examples 1-22.

Example 38 includes a link performance prediction (LPP) server comprising circuitry to implement the method of any of Examples 1-22.

Example 39 includes a content delivery server or network comprising circuitry to implement the method of any of Examples 1-22.

Example 40 includes a media streaming device or server comprising circuitry to implement the method of any of Examples 1-22.

Example 41 includes a mobile device comprising circuitry to implement the method of any of Examples 1-22.

Example 42 includes a user equipment device comprising circuitry to implement the method of any of Examples 1-22.

Example 43 includes a client computing device or end user device comprising circuitry to implement the method of any of Examples 1-22.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A device for predicting radio link performance, comprising:
communication circuitry; and
processing circuitry to:
receive, via the communication circuitry, a link performance prediction (LPP) request from a requesting entity, wherein the LPP request is a request to predict a performance of a radio link between a mobile device and a base station during a future time window;
determine a current path of the mobile device, wherein the current path is determined based on radio signals between the mobile device and the base station, and wherein the current path indicates a sequence of positions of the mobile device over a current time window;
predict, based on the current path, a future path of the mobile device, wherein the future path indicates a sequence of predicted future positions of the mobile device over the future time window;
generate a link performance prediction (LPP) response for the mobile device based on the future path and a base station coverage map, wherein:
the base station coverage map indicates a radio signal quality across a base station coverage area of the base station, wherein the base station coverage area is represented in a three-dimensional (3D) coordinate space, wherein a plurality of 3D regions within the base station coverage area are represented as a plurality of points within the 3D coordinate space; and the LPP response indicates a predicted performance of the radio link between the mobile device and the base station during the future time window; and send, via the communication circuitry, the LPP response to the requesting entity.

2. The device of claim 1, wherein the 3D coordinate space is based on:
a Cartesian coordinate system; or
a spherical coordinate system.

3. The device of claim 1, wherein:
the current path of the mobile device comprises:
a first sequence of points within the 3D coordinate space, wherein the first sequence of points comprises a current point indicating a current position of the mobile device; and
a direction vector within the 3D coordinate space, wherein the direction vector indicates a current direction of travel of the mobile device;
the future path of the mobile device comprises a second sequence of points within the 3D coordinate space, wherein the second sequence of points comprises a next point indicating a next position of the mobile device, wherein the mobile device is predicted to transition from the current position to the next position; and
the processing circuitry to predict, based on the current path, the future path of the mobile device is further to:
predict, based on the first sequence of points and the direction vector, the second sequence of points.

4. The device of claim 3, wherein the processing circuitry to predict, based on the first sequence of points and the direction vector, the second sequence of points is further to:
predict the second sequence of points using a predictive model, wherein the predictive model is trained to infer the second sequence of points from the first sequence of points and the direction vector, wherein the predictive model is trained based on a set of previous mobile device paths through the base station coverage area.

5. The device of claim 3, wherein the processing circuitry to predict, based on the first sequence of points and the direction vector, the second sequence of points is further to:
determine, based on the current point and the direction vector, a set of potential transition points in the 3D coordinate space; and
predict the next point from the set of potential transition points using a predictive model, wherein the predictive model is trained to infer the next point from the current point and the set of potential transition points based on a set of previous mobile device paths through the base station coverage area.

6. The device of claim 5, wherein the set of potential transition points comprises:
one or more adjacent points relative to the current point; and
one or more non-adjacent points relative to the current point, wherein the one or more non-adjacent points are identified based on one or more previous mobile device transitions from the current point to the one or more non-adjacent points.

7. The device of claim 1, wherein the processing circuitry to generate the LPP response for the mobile device based on the future path and the base station coverage map is further to:

determine, based on the base station coverage map, a corresponding radio signal quality along the future path of the mobile device; and
generate the LPP response based on the corresponding radio signal quality along the future path of the mobile device.

8. The device of claim 1, wherein:
the mobile device comprises a user equipment (UE) device; and
the base station comprises a millimeter wave (mmWave) base station associated with a radio access network (RAN).

9. At least one non-transitory machine-accessible storage medium having instructions stored thereon, wherein the instructions, when executed on processing circuitry, cause the processing circuitry to:
receive, via communication circuitry, a link performance prediction (LPP) request from a requesting entity, wherein the LPP request is a request to predict a performance of a radio link between a mobile device and a base station during a future time window;
determine a current path of the mobile device, wherein the current path is determined based on radio signals between the mobile device and the base station, and wherein the current path indicates a sequence of positions of the mobile device over a current time window;
predict, based on the current path, a future path of the mobile device, wherein the future path indicates a sequence of predicted future positions of the mobile device over the future time window;
generate a link performance prediction (LPP) response for the mobile device based on the future path and a base station coverage map, wherein:
the base station coverage map indicates a radio signal quality across a base station coverage area of the base station, wherein the base station coverage area is represented as a three-dimensional (3D) coordinate space; and
the LPP response indicates a predicted performance of the radio link between the mobile device and the base station during the future time window; and
send, via the communication circuitry, the LPP response to the requesting entity.

10. The at least one non-transitory machine-accessible storage medium of claim 9, wherein: the base station coverage map represents a plurality of 3D regions within the base station coverage area as a plurality of points within the 3D coordinate space, wherein each point within the 3D coordinate space represents a corresponding 3D region within the base station coverage area; and the base station coverage map further indicates a corresponding radio signal quality at each of the plurality of 3D regions.

11. The at least one non-transitory machine-accessible storage medium of claim 10, wherein the 3D coordinate space is based on: a Cartesian coordinate system; or a spherical coordinate system.

12. The at least one non-transitory machine-accessible storage medium of claim 10, wherein: the current path of the mobile device further indicates: a current position of the mobile device; and a current direction of travel of the mobile device; and the future path of the mobile device further indicates: a next position of the mobile device, wherein the mobile device is predicted to transition from the current position to the next position.

13. The at least one non-transitory machine-accessible storage medium of claim 12, wherein: the current path of the mobile device comprises: a first sequence of points within the 3D coordinate space, wherein the first sequence of points comprises a current point indicating the current position of the mobile device; and a direction vector within the 3D coordinate space, wherein the direction vector indicates the current direction of travel of the mobile device; the future path of the mobile device comprises a second sequence of points within the 3D coordinate space, wherein the second sequence of points comprises a next point indicating the next position of the mobile device; and the instructions that cause the processing circuitry to predict, based on the current path, the future path of the mobile device further cause the processing circuitry to: predict, based on the first sequence of points and the direction vector, the second sequence of points.

14. The at least one non-transitory machine-accessible storage medium of claim 13, wherein the instructions that cause the processing circuitry to predict based on the first sequence of points and the direction vector, the second sequence of points further cause the processing circuitry to: predict the second sequence of points using a predictive model, wherein the predictive model is trained to infer the second sequence of points from the first sequence of points and the direction vector, wherein the predictive model is trained based on a set of previous mobile device paths through the base station coverage area.

15. The at least one non-transitory machine-accessible storage medium of claim 14, wherein the predictive model comprises a recurrent neural network (RNN) model or a long short-term memory (LSTM) model.

16. The at least one non-transitory machine-accessible storage medium of claim 13, wherein the instructions that cause the processing circuitry to predict based on the first sequence of points and the direction vector, the second sequence of points further cause the processing circuitry to: determine, based on the current point and the direction vector, a set of potential transition points in the 3D coordinate space; and predict the next point from the set of potential transition points, wherein the mobile device is predicted to transition from the current point to the next point.

17. The at least one non-transitory machine-accessible storage medium of claim 16, wherein the set of potential transition points comprises: one or more adjacent points relative to the current point; and one or more non-adjacent points relative to the current point, wherein the one or more non-adjacent points are identified based on one or more previous mobile device transitions from the current point to the one or more non-adjacent points.

18. The at least one non-transitory machine-accessible storage medium of claim 16, wherein the instructions that cause the processing circuitry to predict the next point from the set of potential transition points further cause the processing circuitry to: predict the next point using a predictive model, wherein the predictive model is trained to infer the next point from the current point and the set of potential transition points, wherein the predictive model is trained based on a set of previous mobile device paths through the base station coverage area.

19. The at least one non-transitory machine-accessible storage medium of claim 18, wherein the predictive model comprises a Markov model.

20. The at least one non-transitory machine-accessible storage medium of claim 9, wherein the instructions that cause the processing circuitry to generate the LPP response for the mobile device based on the future path and the base station coverage map further cause the processing circuitry to: determine, based on the base station coverage map, a corresponding radio signal quality along the future path of the mobile device; and generate the LPP response based on the corresponding radio signal quality along the future path of the mobile device.

21. The at least one non-transitory machine-accessible storage medium of claim 9, wherein: the mobile device comprises a user equipment (UE) device; and the base station comprises a millimeter wave (mmWave) base station associated with a radio access network (RAN).

22. A method of predicting radio link performance, comprising:
receiving, via communication circuitry, a link performance prediction (LPP) request from a requesting entity, wherein the LPP request is a request to predict a performance of a radio link between a mobile device and a base station during a future time window;
determining a current path of the mobile device, wherein the current path is determined based on radio signals between the mobile device and the base station, and wherein the current path indicates a sequence of positions of the mobile device over a current time window;
predicting, based on the current path, a future path of the mobile device, wherein the future path indicates a sequence of predicted future positions of the mobile device over the future time window;
generating a link performance prediction (LPP) response for the mobile device based on the future path and a base station coverage map, wherein:
the base station coverage map indicates a radio signal quality across a base station coverage area of the base station, wherein the base station coverage area is represented in a three-dimensional (3D) coordinate space, wherein a plurality of 3D regions within the base station coverage area are represented as a plurality of points within the 3D coordinate space; and
the LPP response indicates a predicted performance of the radio link between the mobile device and the base station during the future time window; and
sending, via the communication circuitry, the LPP response to the requesting entity.

23. The method of claim 22, wherein:
the current path of the mobile device comprises:
a first sequence of points within the 3D coordinate space, wherein the first sequence of points comprises a current point indicating a current position of the mobile device; and
a direction vector within the 3D coordinate space, wherein the direction vector indicates a current direction of travel of the mobile device;
the future path of the mobile device comprises a second sequence of points within the 3D coordinate space, wherein the second sequence of points comprises a next point indicating a next position of the mobile device, wherein the mobile device is predicted to transition from the current position to the next position; and
predicting, based on the current path, the future path of the mobile device comprises:
predicting, based on the first sequence of points and the direction vector, the second sequence of points.

24. The method of claim 23, wherein predicting, based on the first sequence of points and the direction vector, the second sequence of points comprises:
determining, based on the current point and the direction vector, a set of potential transition points in the 3D coordinate space, wherein the set of potential transition points comprises:

one or more adjacent points relative to the current point; and one or more non-adjacent points relative to the current point, wherein the one or more non-adjacent points are identified based on one or more previous mobile device transitions from the current point to the one or more non-adjacent points; and predicting the next point from the set of potential transition points, wherein the mobile device is predicted to transition from the current point to the next point.

25. The method of claim 22, wherein:

the mobile device comprises a user equipment (UE) device; and the base station comprises a millimeter wave (mmWave) base station associated with a radio access network (RAN).

* * * * *